(12) United States Patent
Tsuzuki

(10) Patent No.: US 7,540,266 B2
(45) Date of Patent: Jun. 2, 2009

(54) ROTARY-TO-LINEAR ACTUATOR, LINEAR MOTION SHAFT MECHANISM, VARIABLE VALVE ACTUATION MECHANISM AND VARIABLE VALVE ENGINE

(75) Inventor: Motohiro Tsuzuki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 323 days.

(21) Appl. No.: 11/590,808

(22) Filed: Nov. 1, 2006

(65) Prior Publication Data
US 2007/0137614 A1 Jun. 21, 2007

(30) Foreign Application Priority Data
Nov. 2, 2005 (JP) ............................. 2005-320196

(51) Int. Cl.
*F01L 1/14* (2006.01)
(52) U.S. Cl. .................. 123/90.16; 123/90.15; 123/345; 123/90.31
(58) Field of Classification Search .............. 123/90.15, 123/90.16, 90.17, 90.18, 90.27, 90.31, 90.11, 123/345, 346, 347, 348; 251/129.01, 129.15, 251/129.16
See application file for complete search history.

(56) References Cited

U.S. PATENT DOCUMENTS 7,100,553 B2 * 9/2006 Suzuki et al. ............ 123/90.16
7,424,872 B2 * 9/2008 Fuwa et al. ............... 123/90.15

FOREIGN PATENT DOCUMENTS

| JP | A 10-196757 | 7/1998 |
|----|-------------|--------|
| JP | A 2001-263015 | 9/2001 |
| JP | A 2003-041977 | 2/2003 |

* cited by examiner

*Primary Examiner*—Ching Chang
(74) *Attorney, Agent, or Firm*—Oliff & Berridge, PLC

(57) ABSTRACT

A linear motion shaft mechanism having a control shaft 35 linearly movable along an axial direction and a rotary-to-linear actuator 7 causing the control shaft 35 to move linearly. The actuator 7 includes a sun shaft 81 for transmitting linear motion to the control shaft 35, and a conversion mechanism 8 that converts rotational motion to linear motion and causes the sun shaft 81 to move linearly. The linear motion shaft mechanism includes a load applying portion. When a direction in which the sun shaft 81 is displaced from the conversion mechanism 8 toward the control shaft 35 is defined as a reference direction, the load applying portion causes a thrust load acting in the reference direction to act on the sun shaft 81 from the control shaft 35.

14 Claims, 30 Drawing Sheets

Cross-Section along Line DA-DA

Cross-Section along Line DB-DB

Cross-Section along Line DC-DC

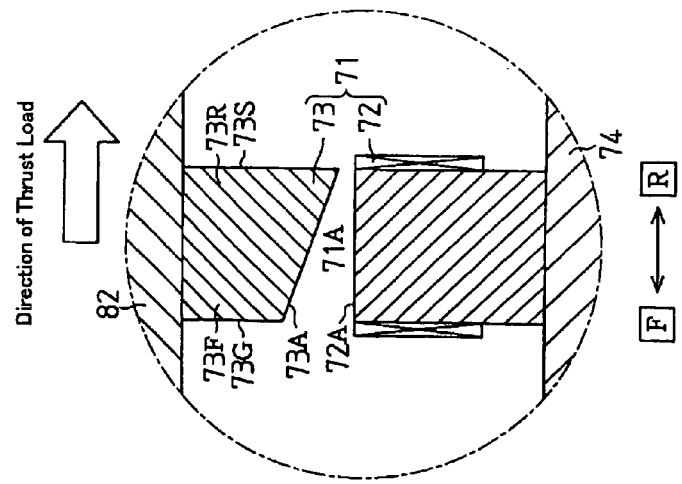
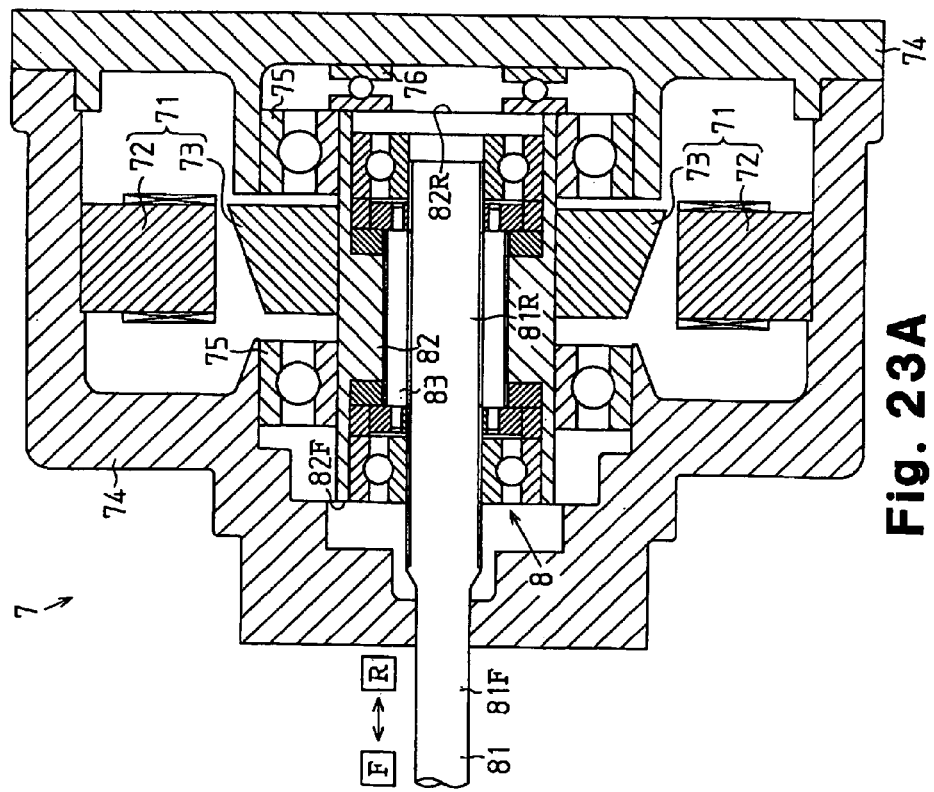

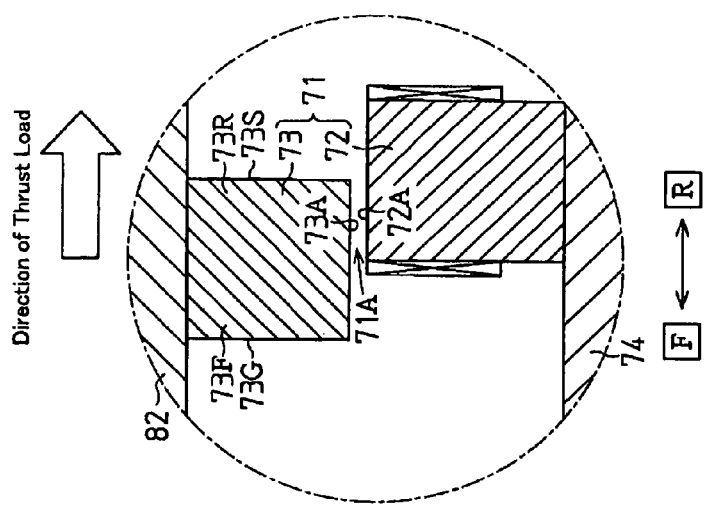
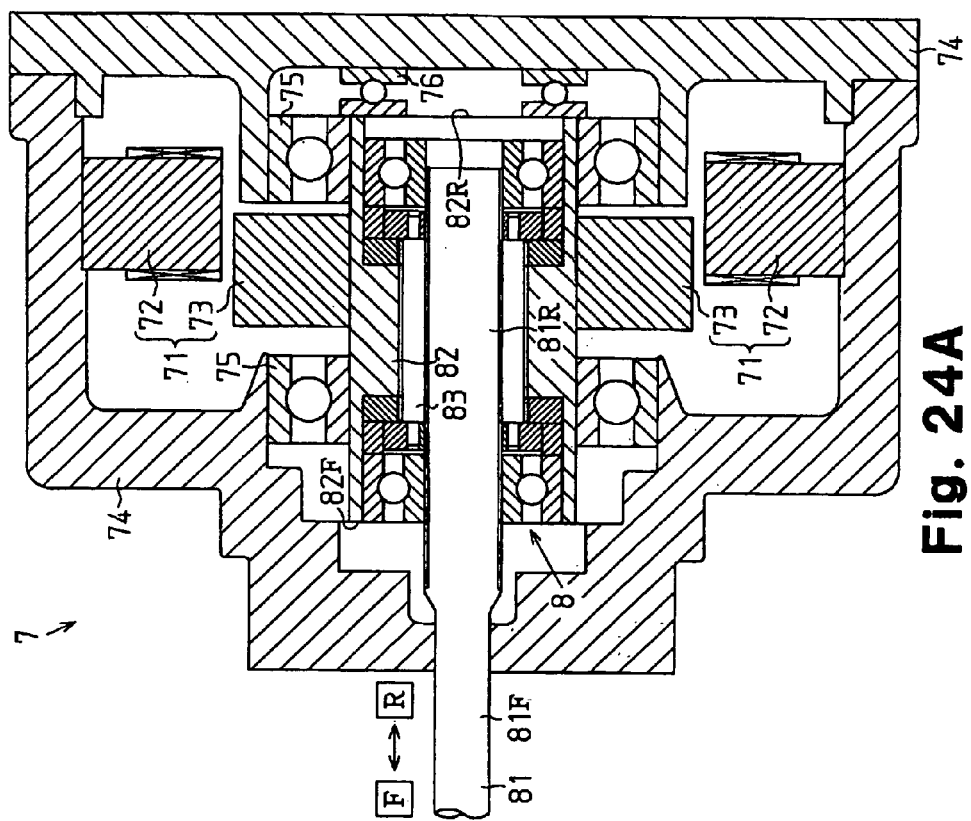
Fig. 24A
Fig. 24B

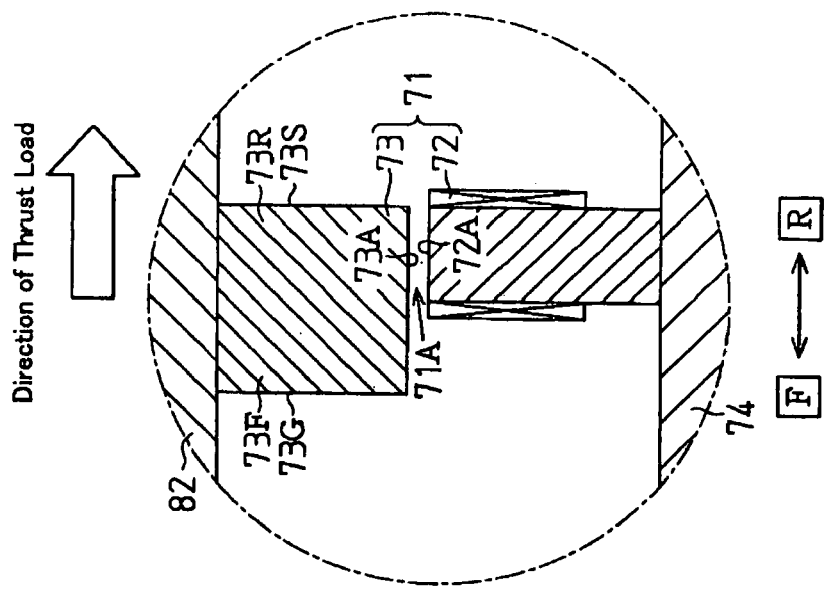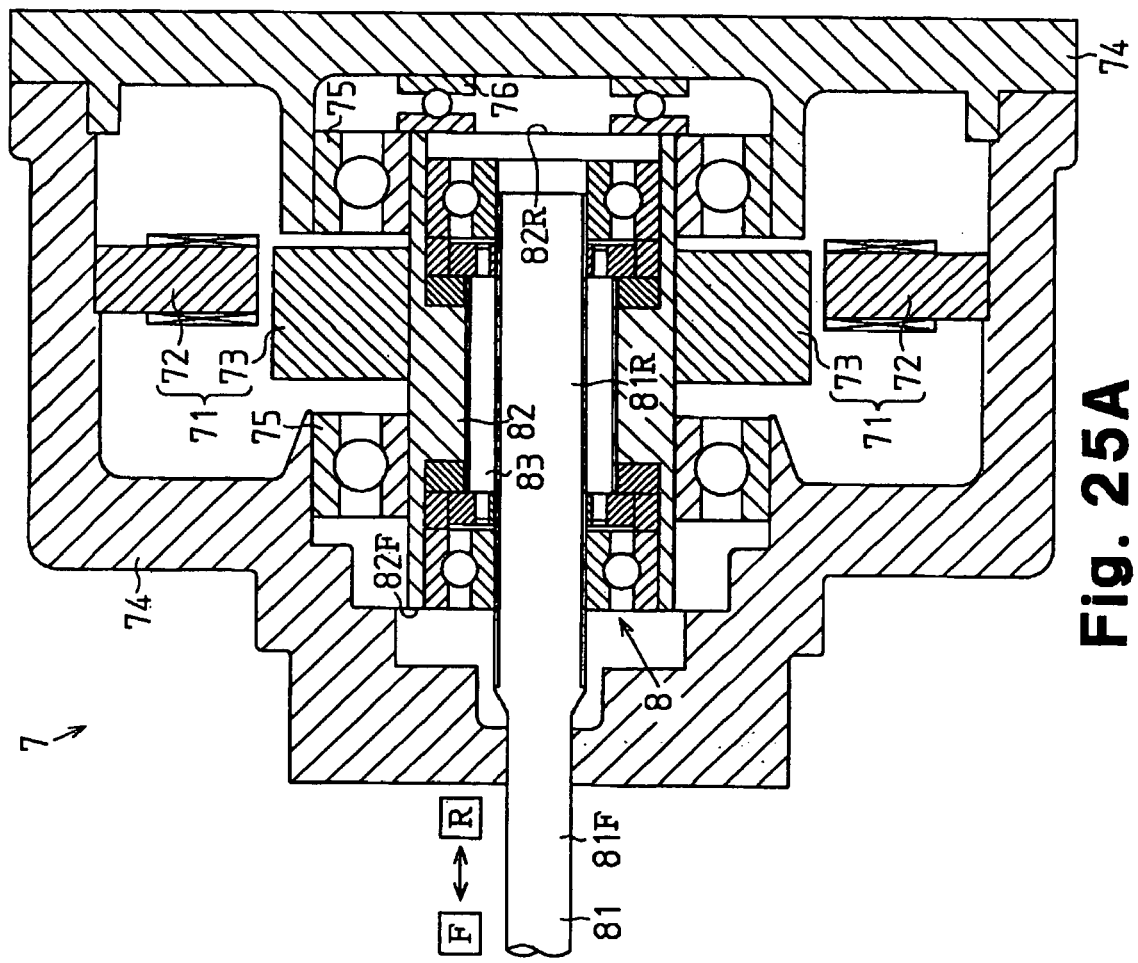
Fig. 25A
Fig. 25B

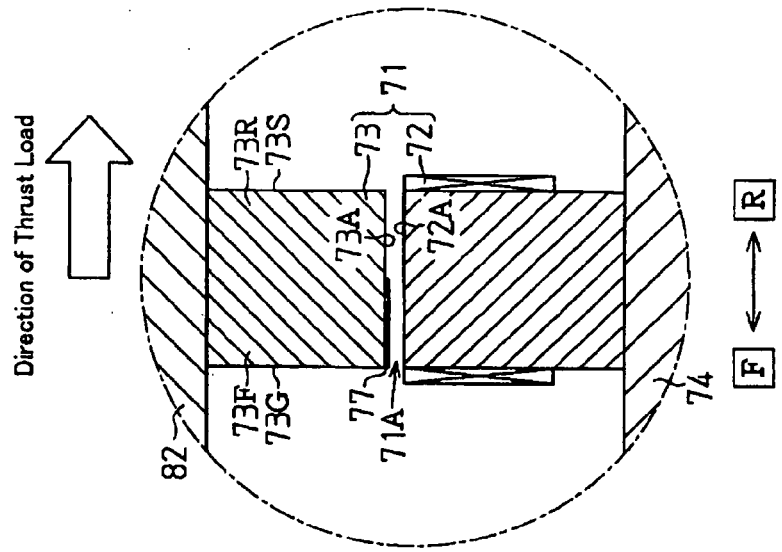

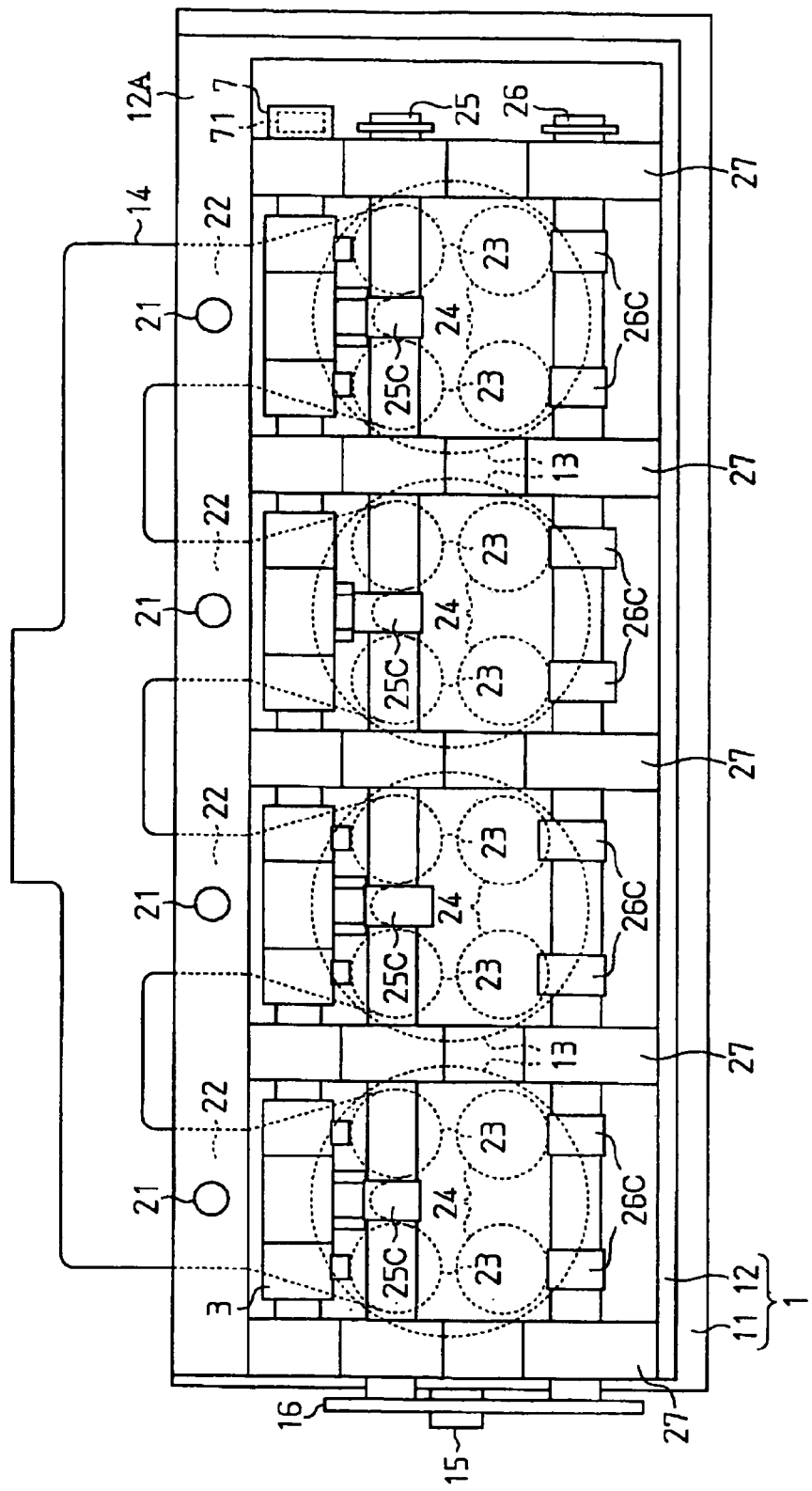

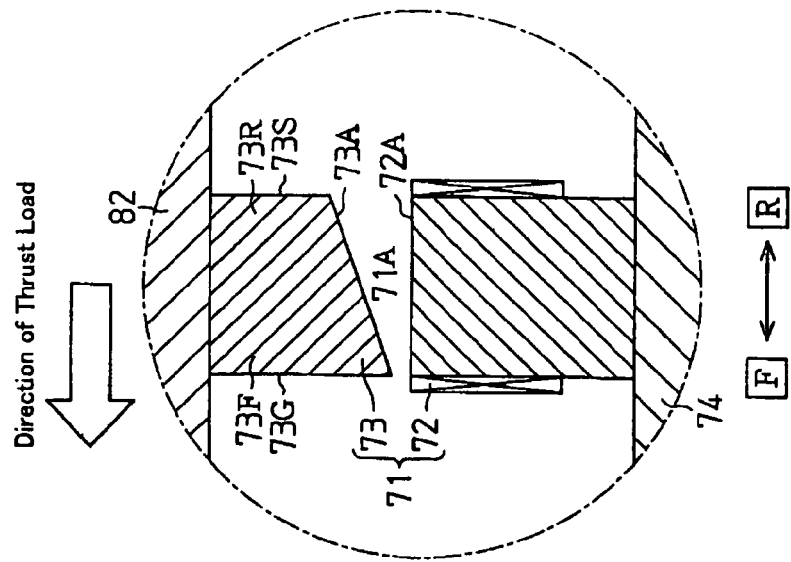
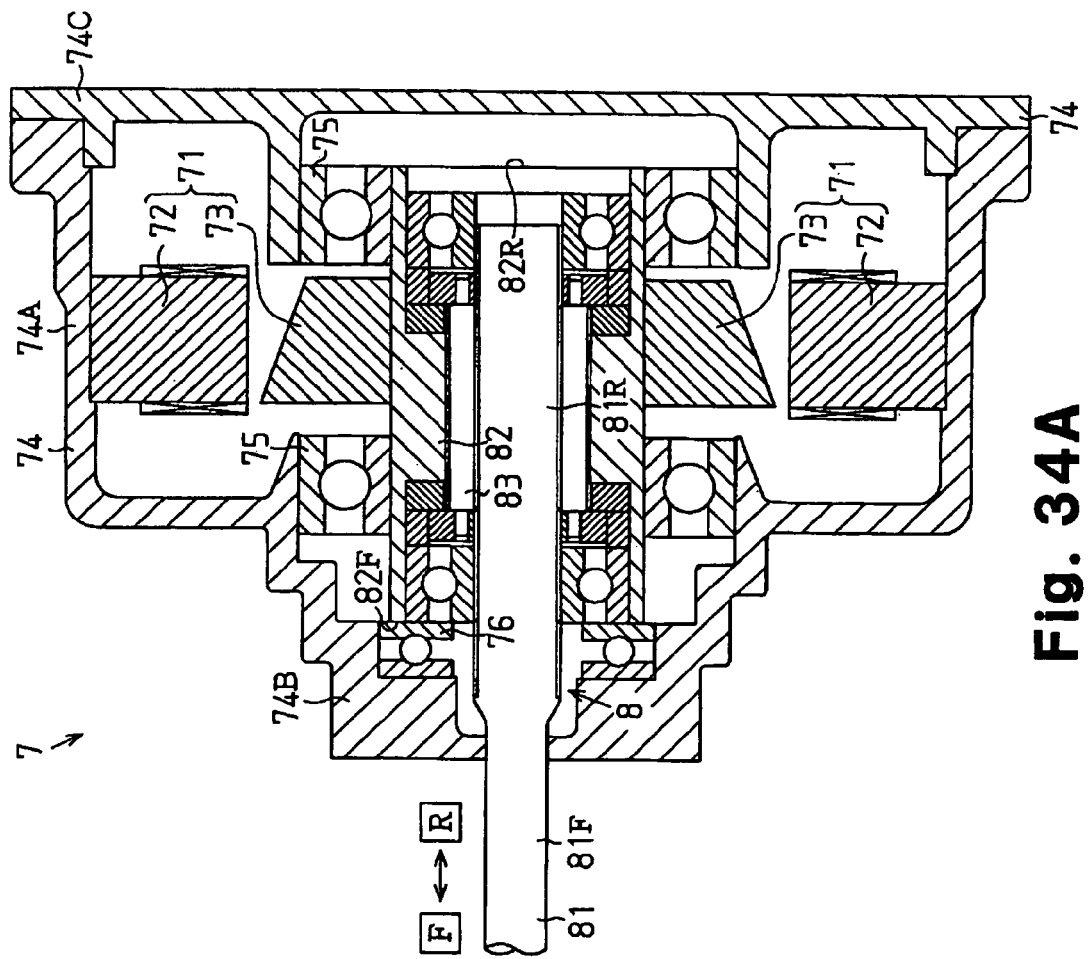
Fig. 34A
Fig. 34B

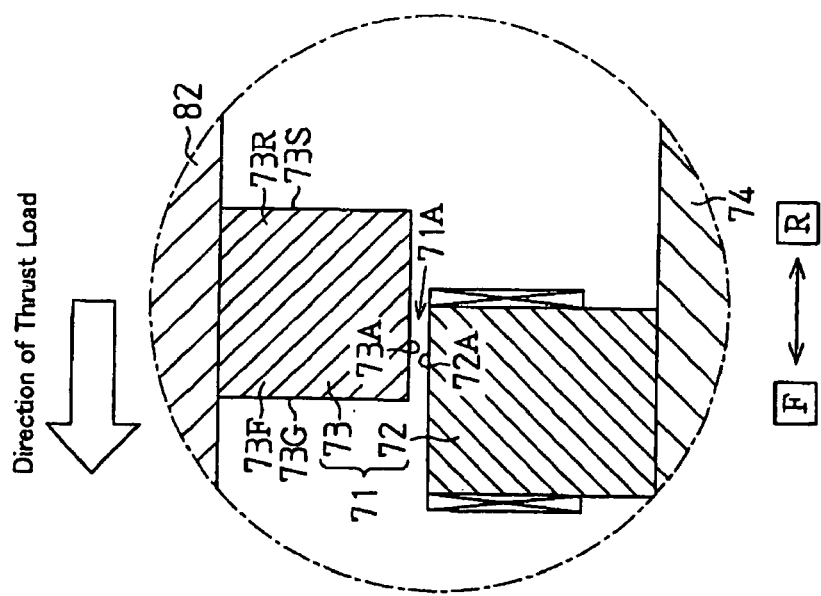
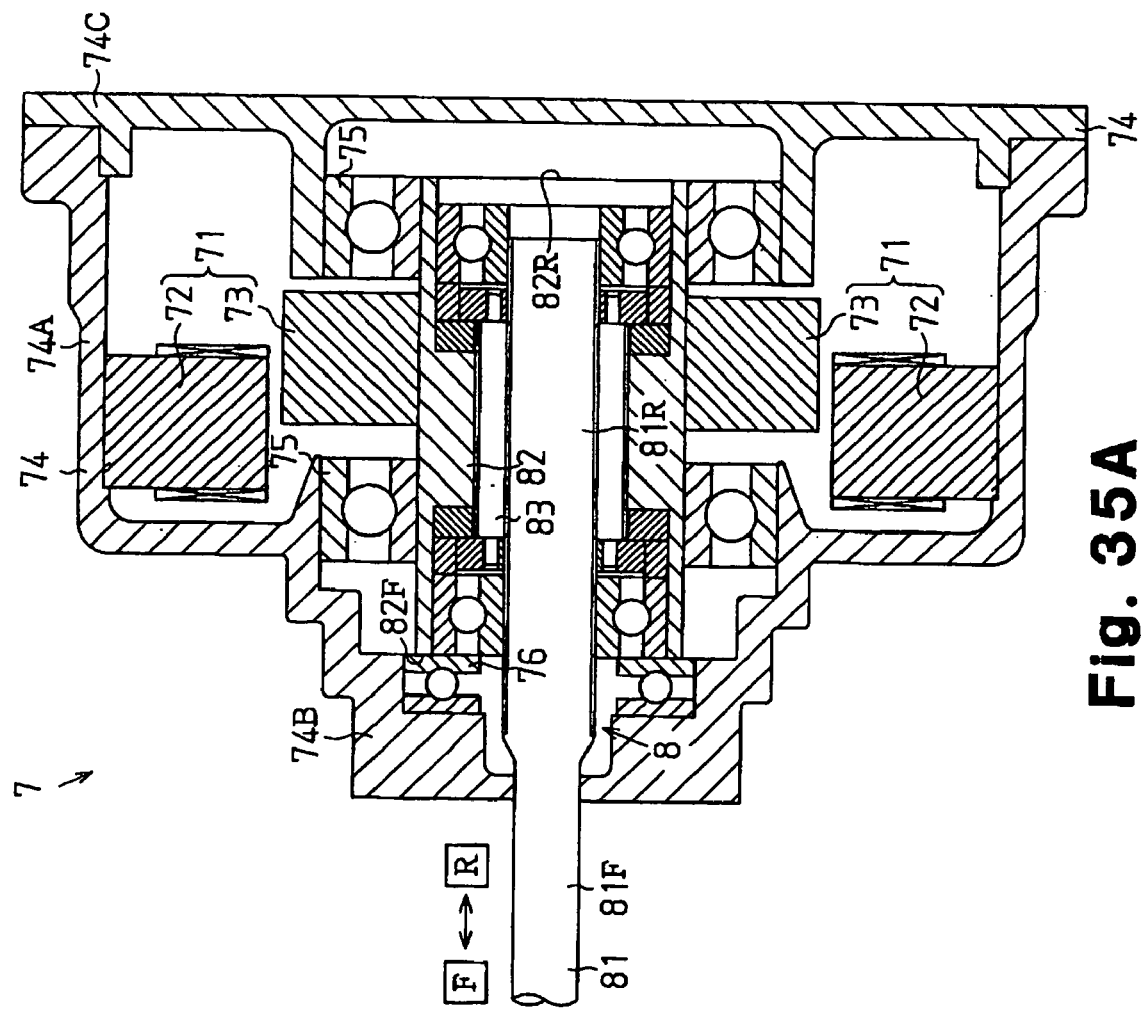
Fig. 35A
Fig. 35B

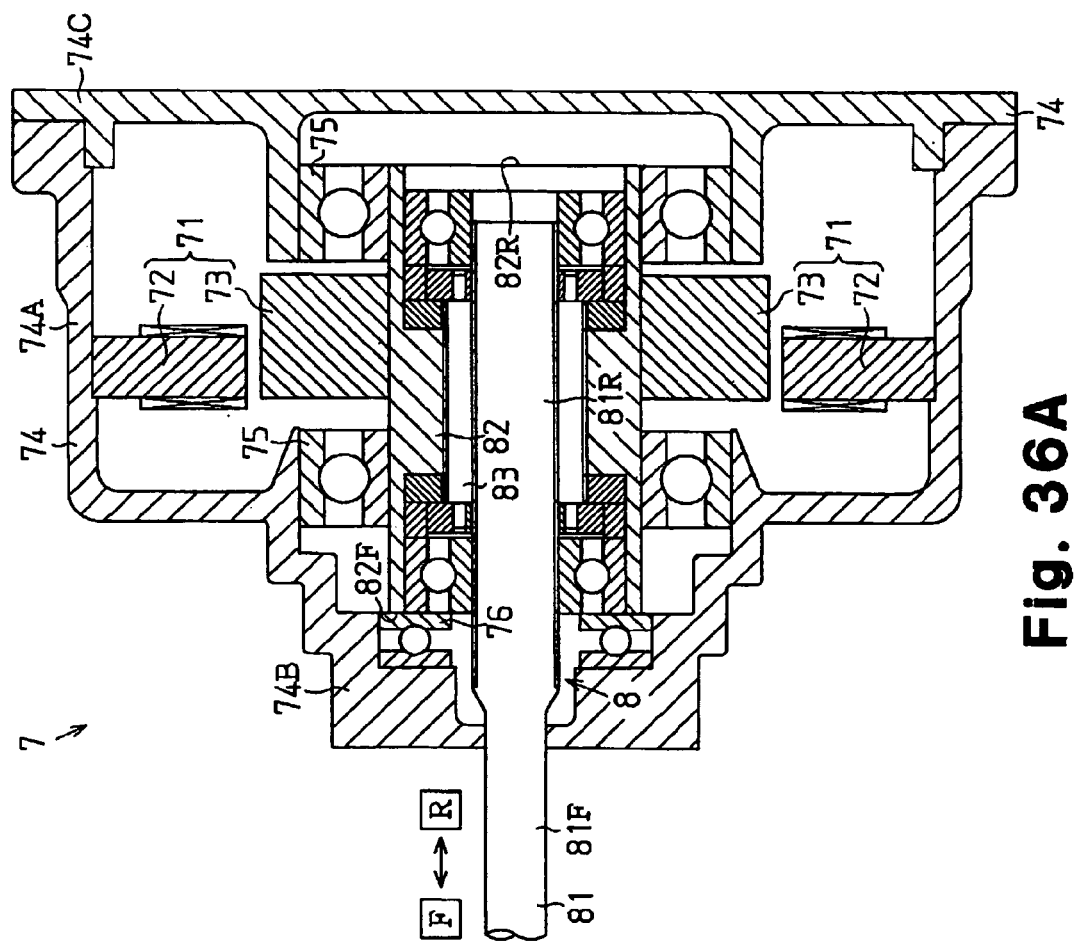
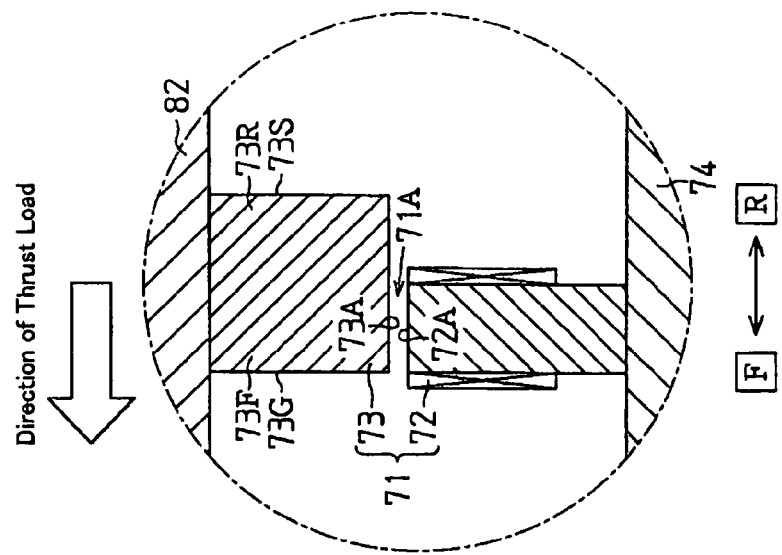
Fig. 36A
Fig. 36B

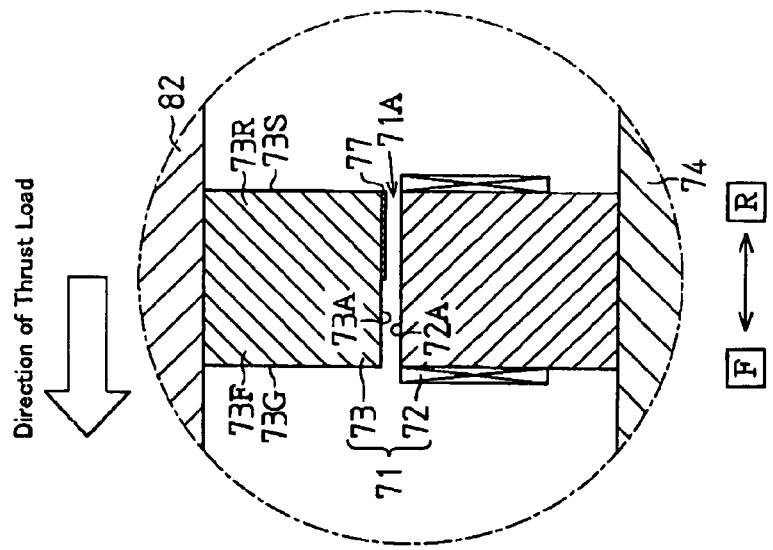
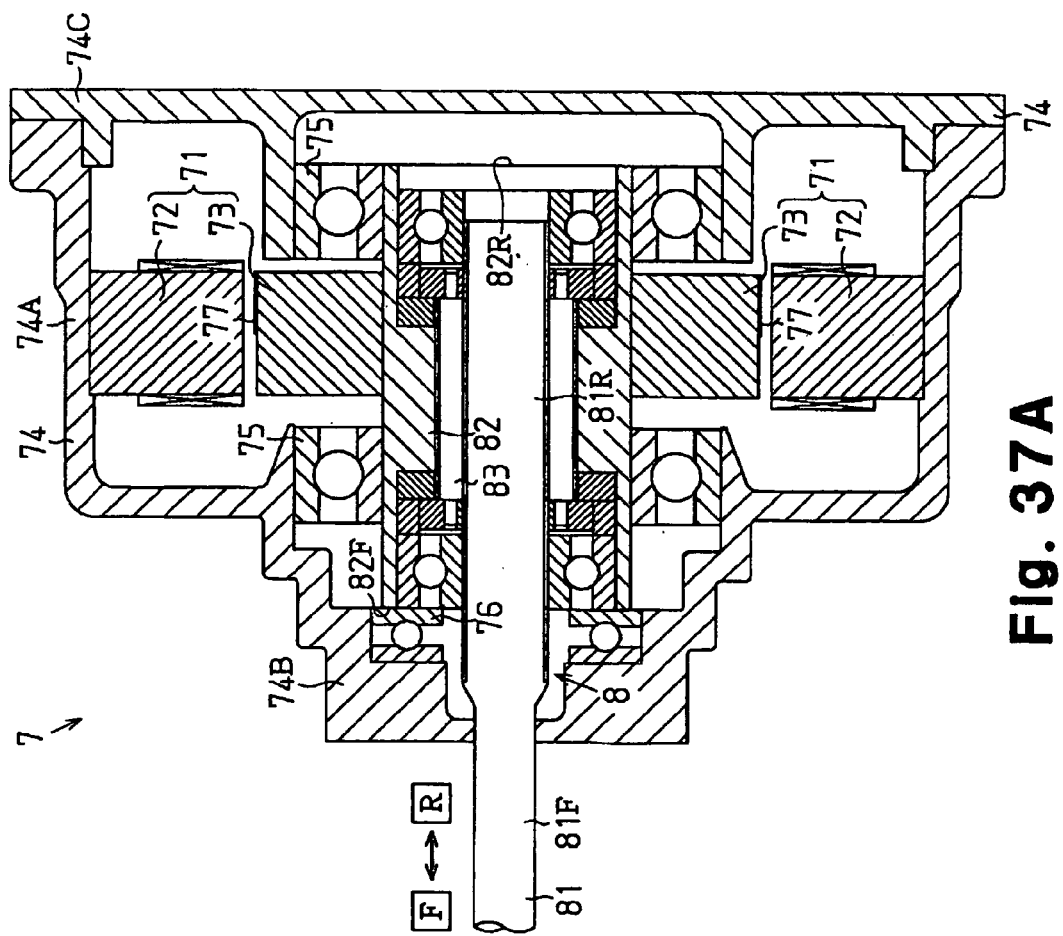
Fig. 37B
Fig. 37A

ROTARY-TO-LINEAR ACTUATOR, LINEAR MOTION SHAFT MECHANISM, VARIABLE VALVE ACTUATION MECHANISM AND VARIABLE VALVE ENGINE

BACKGROUND OF THE INVENTION

The present invention relates to a rotary-to-linear actuator for converting rotational motion into linear motion and outputting it, a linear motion shaft mechanism for making a drive shaft operate through the linear motion inputted from the rotary-to-linear actuator, a variable valve actuation mechanism for changing the valve parameters of the same valve by the linear motion inputted from the rotary-to-linear actuator by making one of intake valve and exhaust valve as an engine valve and an engine in which the variable valve actuation mechanism is mounted.

A rotary-to-linear actuator has a rotary-to-linear conversion mechanism for converting rotational motion inputted into linear motion and outputting it and a motor for inputting the rotational motion to this rotary-to-linear conversion mechanism. A rotary-to-linear conversion mechanism includes the combination of a ring shaft for moving a rotational motion through the motor, a sun shaft which is disposed interior of the ring shaft and functions as an outputting shaft of the motion conversion mechanism, and a plurality of planetary shafts which are disposed between the ring shaft and the sun shaft and are engaged with a screw of the ring shaft and a screw of the sun shaft (see Japanese Laid-Open Patent Publication No. 10-196757).

In these rotary-to-linear actuators, when the ring shaft performs rotational motion through the motor, the sun shaft is to perform the linear motion through this planetary motion as well as the planetary shafts perform the planetary motion around the sun shaft.

The above-described rotary-to-linear actuator can be applied to a linear motion shaft mechanism equipped with a drive shaft which is capable of performing the linear motion. As a linear motion shaft mechanism, for example, a variable valve actuation mechanism of an engine described in Japanese Laid-Open Patent Publication No. 2003-41977 is known. In the case where the above-described rotary-to-linear actuator is applied to this variable valve actuation mechanism, the valve parameters of an engine can be changed by performing the displacement of a camshaft through the linear motion of the sun shaft.

(A) In the case where a rotary-to-linear actuator is applied to the linear motion shaft mechanism, there is fear that the lowering of the life of the actuator is caused by promoting the abrasion of the respective components of the rotary-to-linear conversion mechanism, which is caused by the oscillation of the sun shaft.

The present invention has been completed by considering these circumstances, and an object of the present invention is to provide a rotary-to-linear actuator which can suppress the oscillation of the output shaft, a linear motion shaft mechanism, a variable valve actuation mechanism, and a variable valve engine.

(B) In a rotary-to-linear actuator, in order to precisely perform the conversion from the rotational motion to the linear motion by the rotary-to-linear conversion mechanism, it is necessary to regulate the thrust displacement of the ring shaft. Then, it is also considered that the ring shaft is supported by the housing body of a rotary-to-linear actuator in a axial direction, however, in this case, since it is required that the thickness of the outer wall of the housing body is sufficiently large because it is subjected to the thrust load of the ring shaft, it is difficult to achieve the miniaturization of an actuator.

SUMMARY OF THE INVENTION

The present invention has been completed by considering these circumstances, and an object of the present invention is to provide a linear motion shaft mechanism having a structure which can realize the miniaturization of a rotary-to-linear actuator while guaranteeing appropriate operation of a rotary-to-linear conversion mechanism, and a variable valve engine.

In accordance with a first aspect of the present invention, a linear motion shaft mechanism having a drive shaft linearly movable along an axial direction and a rotary-to-linear actuator causing the drive shaft to move linearly is provided. The actuator includes an output shaft for transmitting linear motion to the drive shaft, and a conversion mechanism that converts rotational motion to linear motion and causes the output shaft to move linearly. The linear motion shaft mechanism includes a load applying portion. When a direction in which the output shaft is displaced from the conversion mechanism toward the drive shaft is defined as a reference direction, the load applying portion causes a thrust load acting in the reference direction to act on the output shaft from the drive shaft.

In accordance with a second aspect of the present invention, a variable valve actuation mechanism having a valve actuation mechanism main body and a rotary-to-linear actuator is provided. The valve actuation mechanism main body changes a valve parameter of an engine valve, which is either an intake valve or an exhaust valve, through linear motion of a drive shaft along an axial direction. The rotary-to-linear actuator causes the drive shaft to move linearly. The valve actuation mechanism main body includes a control shaft functioning as the drive shaft, a slider gear that is displaced while being interlocked with the control shaft, an input gear, and an output gear. The input gear rotates the slide gear by torque transmitted from a camshaft of the engine valve. The output gear causes the engine valve to move linearly along an axial direction through the rotation of the slider gear. The slider gear has an input helical spline and an output helical spline. The input helical spline is engaged with a helical spline formed on the input gear, and the output helical spline is engaged with a helical spline formed on the output gear. The helix direction of the tooth trace of the input helical spline is opposite to the helix direction of the tooth trace of the output helical spline. The input gear includes a gear main body having the helical spline and an input arm that moves integrally with the gear main body when receiving torque of the camshaft. The output gear includes a gear main body having the helical spline and an output arm that moves integrally with the gear main body by rotation of the slider gear, thereby causing the engine valve to move linearly. The actuator includes an output shaft for transmitting linear motion to the control shaft, and a conversion mechanism that converts rotational motion of a motor to linear motion and causes the output shaft to move linearly along the axial direction. The variable valve actuation mechanism: changes the valve parameter in accordance with a difference of relative rotational phase between the input arm and the output arm about the control shaft; changes the difference of relative rotational phase between the input arm and the output arm by changing relative positions of the slider gear and the input and output gears in the axial direction; and changes relative positions of the slider gear and the input and output gears in the axial direction through linear motion of the control shaft. One of the input helical spline and the output helical spline is formed as a gear of left hand helix, and the other is formed as a gear of right hand helix. When a moving direction of the control shaft in which relative rotation of the input gear and the output gear increases the difference of relative rotational phase between the input arm and the output arm is defined as a reference direction, a front end of the control shaft in the reference direction is connected to the output shaft of the actuator.

In accordance with a third aspect of the present invention, a rotary-to-linear actuator applied to a linear motion shaft mechanism having a driveshaft is provided. The drive shaft is linearly movable along an axial direction. The actuator includes an output shaft transmitting linear motion to the drive shaft, a conversion mechanism that converts rotational motion to linear motion and causes the output shaft to move linearly, and a load applying portion. When a direction in which the output shaft is displaced from the driveshaft toward the conversion mechanism is defined as a reference direction, the load applying portion causes, in the conversion mechanism, a thrust load acting in the reference direction to act on the output shaft.

In accordance with a fourth aspect of the present invention, a variable valve engine having a variable valve actuation mechanism that changes a valve parameter of an engine valve that is one of an intake valve and an exhaust valve is provided. The variable valve actuation mechanism includes a valve actuation mechanism main body that changes a valve parameter of the valve through linear motion of a drive shaft along an axial direction, and a rotary-to-linear actuator that causes the output shaft to move linearly. The valve actuation mechanism main body includes a control shaft functioning as the drive shaft, a slider gear that is displaced while being interlocked with the control shaft, an input gear, and an output gear. The input gear rotates the slide gear by torque transmitted from a camshaft of the engine valve. The output gear causes the engine valve to move linearly along an axial direction through the rotation of the slider gear. The slider gear has an input helical spline and an output helical spline. The input helical spline is engaged with a helical spline formed on the input gear, and the output helical spline is engaged with a helical spline formed on the output gear. The helix direction of the tooth trace of the input helical spline is opposite to the helix direction of the tooth trace of the output helical spline. The input gear includes a gear main body having the helical spline and an input arm that moves integrally with the gear main body when receiving torque of the camshaft. The output gear includes a gear main body having the helical spline and an output arm that moves integrally with the gear main body by rotation of the slider gear, thereby causing the engine valve to move linearly. The actuator includes an output shaft for transmitting linear motion to the control shaft, a conversion mechanism that converts rotational motion to linear motion and causes the output shaft to move linearly along the axial direction, and a casing body incorporating the conversion mechanism. The variable valve engine: changes the valve parameter in accordance with a difference of relative rotational phase between the input arm and the output arm about the control shaft; changes the difference of relative rotational phase between the input arm and the output arm by changing relative positions of the slider gear and the input and output gears in the axial direction; and changes relative positions of the slider gear and the input and output gears in the axial direction through linear motion of the control shaft. One of the input helical spline and the output helical spline is formed as a gear of left hand helix, and the other is formed as a gear of right hand helix. When a moving direction of the control shaft in which relative rotation of the input gear and the output gear increases the difference of relative rotational phase between the input arm and the output arm is defined as a reference direction, a front end of the control shaft in the reference direction is connected to the output shaft of the actuator. Among outer walls forming the casing body in the actuator, an outer wall supporting the output shaft is defined as a front face outer wall. The front face outer wall is fixed to a cylinder head.

In accordance with a fifth aspect of the present invention, a linear motion shaft mechanism having a drive shaft linearly movable along an axial direction, a mechanism main body supporting the drive shaft, and a rotary-to-linear actuator causing the drive shaft to move linearly is provided. The actuator includes an output shaft for transmitting linear motion to the drive shaft, a conversion mechanism that converts rotational motion to linear motion and causes the output shaft to move linearly along the axial direction, and a casing body incorporating the conversion mechanism. The linear motion shaft mechanism includes a load applying portion. When a direction in which the output shaft is displaced from the conversion mechanism toward the drive shaft is defined as a reference direction, the load applying portion causes a thrust load acting in the reference direction to act on the conversion mechanism. Among outer walls forming the casing body in the actuator, an outer wall supporting the output shaft is defined as a front face outer wall. The front face outer wall is fixed to the mechanism main body.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 23(A) and 23(B) are cross-sectional views showing a rotary-to-linear actuator according to a third embodiment of the present embodiment, taken along the axis of a sun shaft;

FIGS. 24(A) and 24(B) are cross-sectional views showing a rotary-to-linear actuator according to a fourth embodiment of the present embodiment, taken along the axis a sun shaft;

FIGS. 25(A) and 25(B) are cross-sectional views showing a rotary-to-linear actuator according to a fifth embodiment of the present invention, taken along the axis of a sun shaft;

FIGS. 26(A) and 26(B) are cross-sectional views showing a rotary-to-linear actuator according to a sixth embodiment of the present invention, taken along the axis of a sun shaft;

FIG. 27 is a diagram schematically showing a variable valve engine according to a seventh embodiment of the present invention

FIGS. 34(A) and 34(B) are cross-sectional views showing a rotary-to-linear actuator according to a fifteenth embodiment of the present invention, taken along the axis of a sun shaft;

FIGS. 35(A) and 35(B) are cross-sectional views showing a rotary-to-linear actuator according to a sixteenth embodiment of the present invention, taken along the axis of a sun shaft;

FIGS. 36(A) and 36(B) are cross-sectional views showing a rotary-to-linear actuator according to a seventeenth embodiment of the present invention, taken along the axis of a sun shaft; and FIGS. 37(A) and 37(B) are cross-sectional views showing a rotary-to-linear actuator according to an eighteenth embodiment of the present invention, taken along the axis of a sun shaft.

DETAILED DESCRIPTION OF THE PREFERRED EMBODIMENTS

First Embodiment

In the present embodiment, the present invention is embodied as a variable valve engine capable of suppressing the oscillation of the output shaft of a rotary-to-linear actuator.

<Structure of the Engine>

Figure 1:
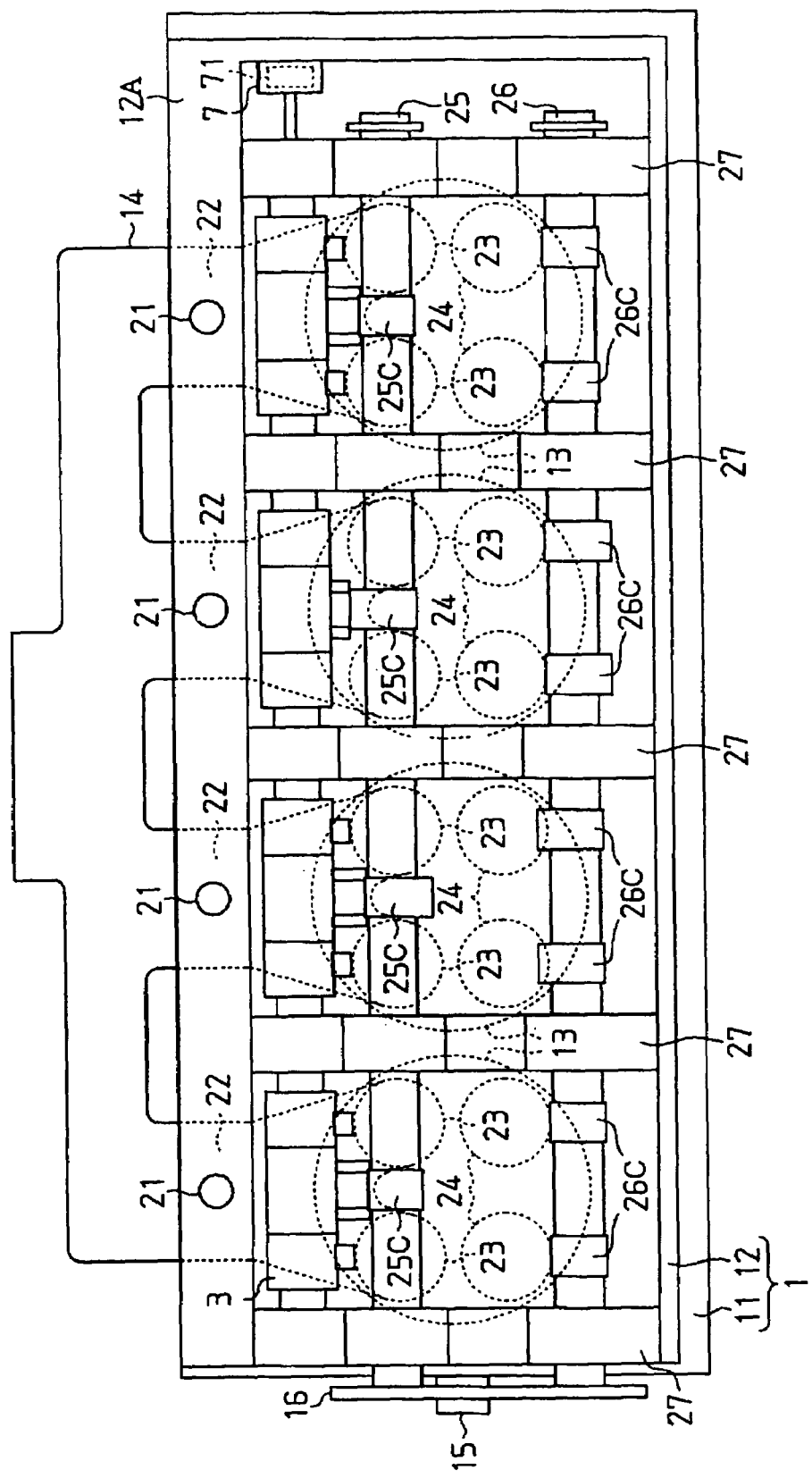
FIG. 1 is a diagram schematically showing a variable valve engine according to a first embodiment of the present invention.

In FIG. 1, the structure of a cylinder head of a variable valve engine as viewed from above is shown. In the present embodiment, a 4-cylinder in-line engine is discussed, however, the present invention may be applied to any type of engines.

The engine 1 includes the combination of a cylinder block 11 and a cylinder head 12. In the cylinder block 11, a plurality of cylinders 13 are formed. In the combustion chamber within each respective cylinders 13, the air-fuel mixture of fuel which has been injected into intake ports 22 of the cylinder head 12 through injectors 21 and air which has been supplied to the intake port 22 via an intake manifold 14 is supplied. A crankshaft 15 converts the linear motion of the pistons by the combustion of the air-fuel mixture into the rotational motion and outputs it.

In the cylinder head 12, intake valves 23 for opening and closing intake ports 22 of the cylinders 13 with respect to the combustion chambers and exhaust valves 24 for opening and closing exhaust ports of the cylinders 13 with respect to the combustion chambers are provided. The intake valve 23 is opened and closed via the cam (intake cam 25C) and the valve spring of the intake camshaft 25. The exhaust valve 24 is opened and closed via the cam (exhaust cam 26C) and the valve spring of an exhaust camshaft 26. The intake camshaft 25 and the exhaust camshaft 26 are supported by cam carriers 27 which are integrally formed with the cylinder head 12. Then, it is rotated by torque of the crankshaft 15 which is transmitted via a timing chain 16.

The engine 1 is equipped with a variable valve actuation mechanism 3 for changing the valve duration (inlet valve duration INCAM) of the intake valve 23. The variable valve actuation mechanism 3 includes the valve actuation mechanism main body 31 disposed to the position adjoining to the intake camshaft 25 and a rotary-to-linear actuator 7 for transmitting the linear motion into the component of the valve actuation mechanism main body 31. Then, the inlet valve duration INCAM is changed by the rotation of the motor 71 embedded in the rotary-to-linear actuator 7. The inlet valve duration INCAM indicates the rotation angle of the crankshaft 15 during the period that each intake valve 23 moves from the position nearest to the valve closing position to the position nearest to the valve opening position.

The engine 1 is integrally controlled through an electronic control unit.

The electronic control unit includes the central computation process unit for carrying out the computation process relating to the engine control, a read only memory in which programs and maps required for engine control has been previously stored, a random access memory for temporarily storing the calculation results and the like of the central computation process unit, an input port for the purpose of inputting a signal from the exterior and an output port and the like for the purpose of outputting a signal to the exterior. To the input port of the electronic control unit, various types of sensors such as crank position sensor, an aero flowmeter and the like are connected. Moreover, to the output port of the electronic control device, a variety of kinds of drive circuits such as a drive circuit of the injector 21, a drive circuit of the motor 71 and the like are connected.

<Structure of Variable Valve Actuation Mechanism>

The structure of the variable valve actuation mechanism 3 will be explained with reference to FIGS. 2-15. A rough structure of the variable valve actuation mechanism 3 will be explained in [1], process for changing a valve duration by an electronic control device will be explained in [2], the structure of the major portion of the variable valve actuation mechanism 3 will be explained in [3], the process for operating the variable valve actuation mechanism 3 will be explained in [4] and [5], and the relationship between the operational state and the valve duration of the variable valve actuation mechanism 3 will be explained in [6], respectively.

[1] "Whole Structure of Variable Valve Actuation Mechanism"

The schematic structure of the variable valve actuation mechanism 3 will be explained with reference to FIGS. 2 and 3.

Figure 2:
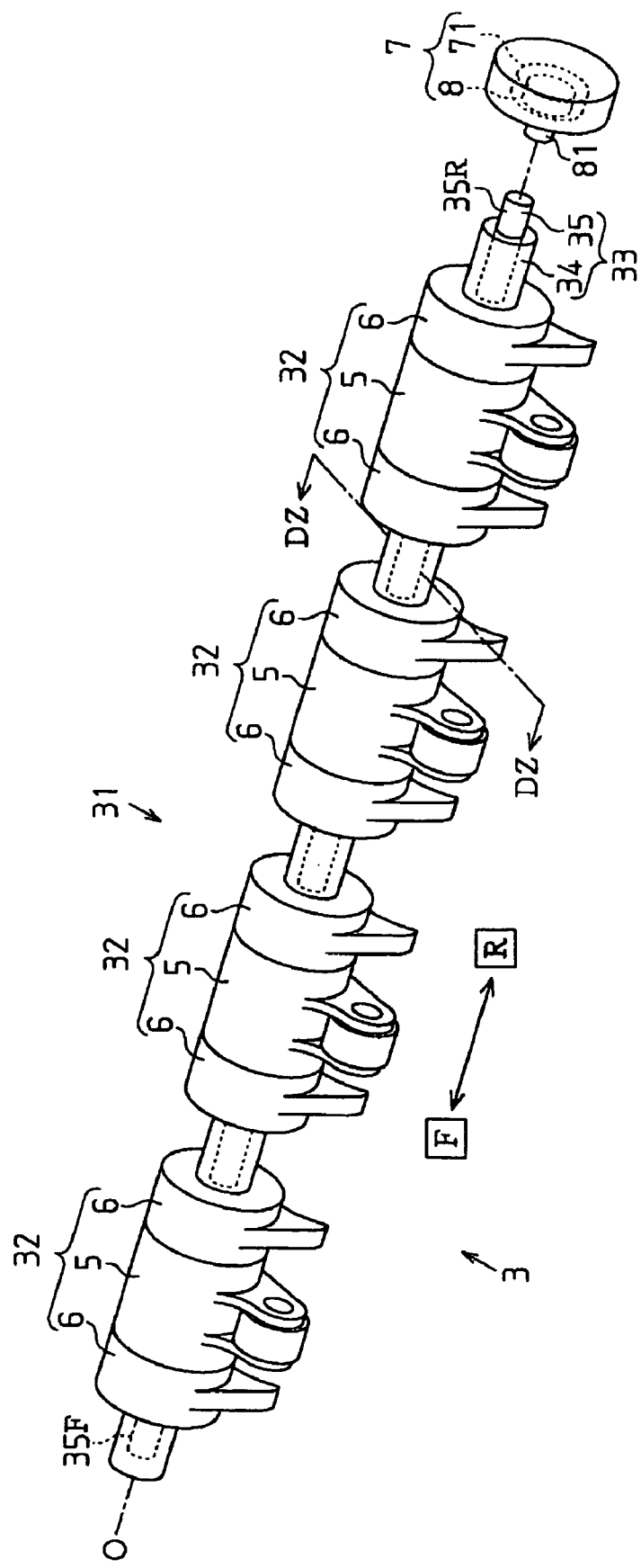
FIG. 2 is a perspective view showing its whole structure of a variable valve actuation mechanism of the first embodiment.

FIG. 2 shows a perspective structure of the variable valve actuation mechanism 3.

Figure 3:
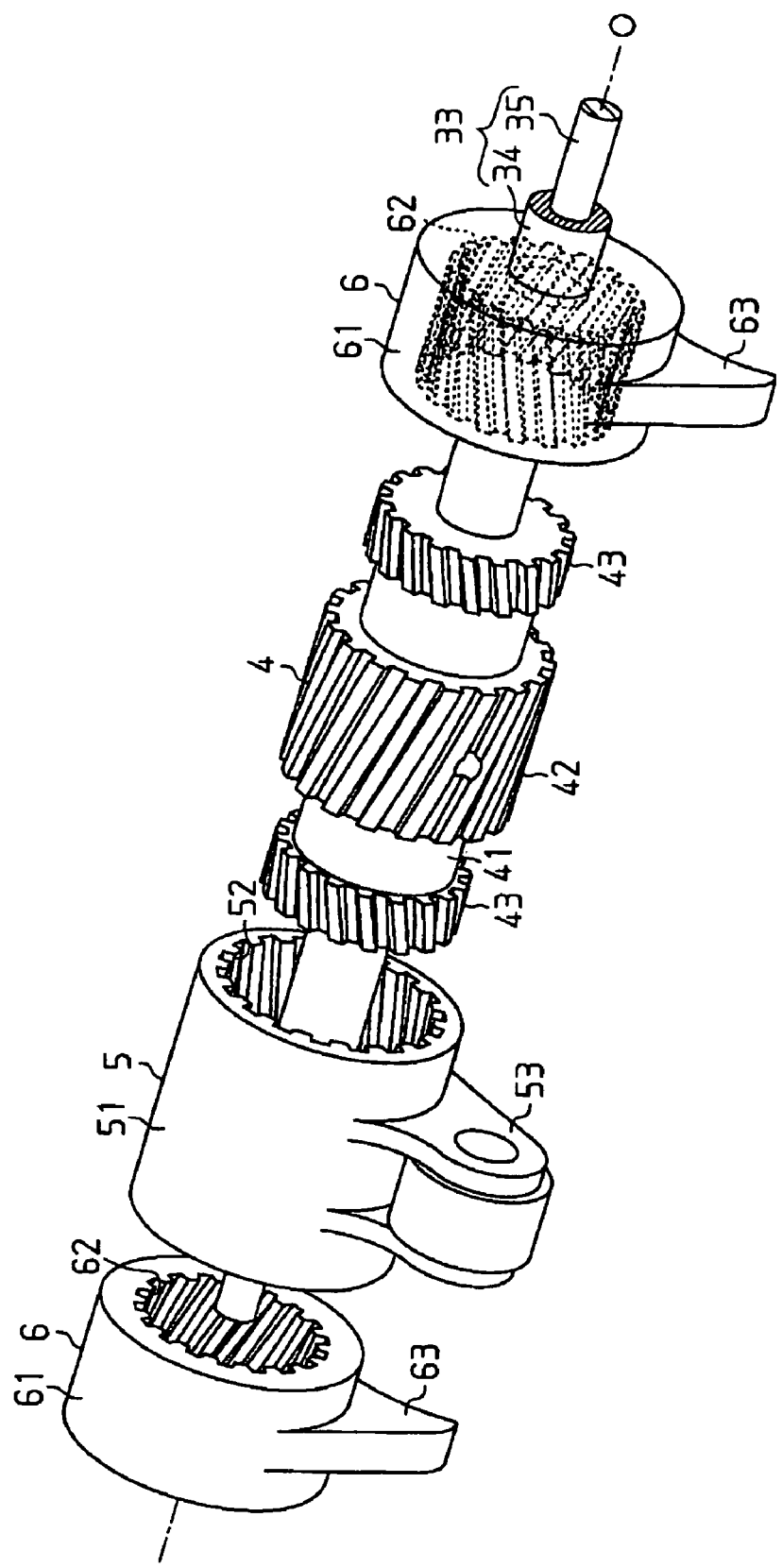
FIG. 3 is an exploded perspective view showing the structure of a valve lift mechanism in the variable valve actuation mechanism of the first embodiment.

FIG. 3 shows its exploded perspective structure of a valve lift mechanism of the variable valve actuation mechanism 3.

With reference to FIG. 2, a schematic structure of the variable valve actuation mechanism 3 will be explained below.

The valve actuation mechanism main body 31 is constituted by the combination of a plurality of valve lift mechanisms 32 which are provided corresponding to the respective cylinders 13 and a slide shaft mechanism 33 for supporting the respective valve lift mechanisms 32. Moreover, the respective components (a rocker shaft 34, a control shaft 35, the slider gears 4, the input gears 5, and the output gears 6) are combined so that the respective center lines are matched. That is, these respective components have the common center line O.

The slide shaft mechanism 33 includes the combination of the rocker shaft 34 which is fixed with the cylinder head 12 (cam carrier 27) in a state where the rotational motion and linear motion are impossible and the control shaft 35 which is disposed within the rocket shaft 34 in a state where the linear motion is possible along an axial direction.

Each valve lift mechanism 32 consists of the combination of the slider gear 4 which is possible to perform the linear motion interlocking with the control shaft 35, an input gear 5 and output gears 6 which are engaged with the slider gear 4 via the helical spline. The input gear 5 and the output gears 6 relatively rotate with one another accompanying the linear motion of the slider gear 4.

In the valve actuation mechanism main body 31, the rotational motion and the linear motion of the respective components are allowed or limited as follows: The rotational motion is referred to the motion in the circumferential direction around the center line O. Moreover, the linear motion is referred to the motion in the axial direction along the center line O.

(a) As for the rocker shaft 34, both of the rotational motion and the linear motion are impossible.

(b) As for the control shaft 35, the rotational motion is impossible and the linear motion is possible.

(c) As for each slider gear 4, both of the rotational motion and the linear motion are possible.

(d) As for each input gear 5, the rotational motion is possible and the linear motion is impossible.

(e) As for each output gear 6, the rotational motion is possible and the linear motion is impossible.

The rotary-to-linear actuator 7 converts the rotational motion of the motor 71 into the linear motion by a rotary-to-linear conversion mechanism 8 and outputs it. That is, the output shaft (a sun shaft 81) is linearly moved by the rotational motion of the motor 71. The sun shaft 81 of the rotary-to-linear actuator 7 is connected to the end portion of one of the control shaft 35 (a shaft second end portion 35R).

In the present embodiment, concerning the moving direction of the control shaft 35, the direction that the intake air valve duration INCAM is smaller is defined as the forward direction F, and the direction that the intake air valve duration INCAM is larger is defined as the reverse direction R. Moreover, in the control shaft 35, the end portion which is positioned on the side of the forward direction F is referred to as a shaft first end portion 35F, and the end portion which is positioned on reverse direction R is referred to as the shaft second end portion 35R.

[2] "Process for Changing Valve Duration by Electronic Control Unit"

The electronic control unit changes the intake air valve duration INCAM by performing the displacement of the control shaft 35 by means of the control of the rotary-to-linear actuator 7. Specifically, the control of the rotary-to-linear actuator 7 is performed as follows.

When there is a requirement that the intake air valve duration INCAS be made smaller, the rotary-to-linear actuator 7 is driven so that the control shaft 35 is displaced toward the forward direction F.

When there is a requirement that the intake air valve duration INCAM be made larger, the rotary-to-linear actuator 7 is driven so that the control shaft 35 is displaced toward the reverse direction R.

Figure 4:
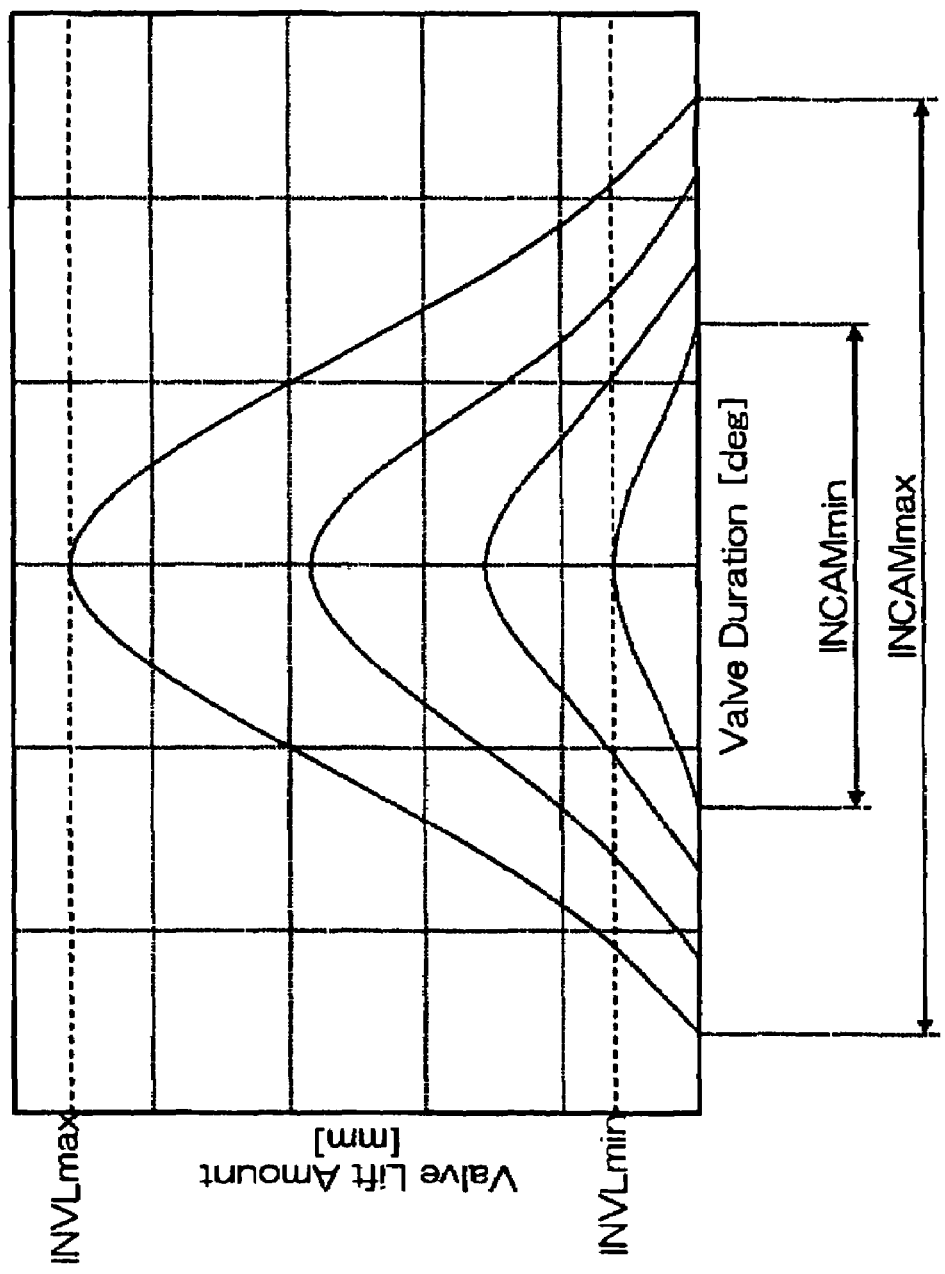
FIG. 4 is a graph showing the changing tendency of the valve duration and the maximum valve lift amount by the variable valve actuation mechanism of the first embodiment.

In the engine 1, as shown in FIG. 4, the maximum valve lift amount of each intake valve 23 (the intake air maximum valve lift amount INVL) is changed as well as the intake air valve duration INCAM by the operation of the variable valve actuation mechanism 3. The intake air valve duration INCAM and the intake air maximum valve lift amount INVL change as shown in (a) and (b) below according to the operation of the control shaft 35. Moreover, the intake air maximum valve lift amount INVL indicates the displacement amount of each intake valve 23 at the time when the intake valve 23 moves from the position nearest to the valve closing position to the position nearest to the valve opening position.

(a) When the control shaft 35 moves toward the forward direction F, the intake air valve duration INCAM and the intake air maximum valve lift amount INVT change in the direction of decrease. Then, when the control shaft 35 moved in the forward direction F to the maximum, the intake air valve duration INCAM is set at the smallest valve duration (the minimum intake air valve duration INCAMmin) as well as the intake air maximum valve lift amount INVL is set at the smallest maximum valve lift amount (the lowermost intake air maximum valve lift amount INCAMmin).

(b) When the control shaft 35 moves toward the reverse direction R, the intake air valve duration INCAM and the intake air maximum valve lift amount INVT change in the direction of increase. Then, when the control shaft 35 moved in the reverse direction R to the maximum, the intake air valve duration INCAM is set at the largest valve duration (the maximum intake air valve duration INCAMmax) as well as the intake air maximum valve lift amount INVL is set at the largest maximum valve lift amount (the uppermost intake air maximum valve lift amount INCAMmas).

[3] "Structure of Valve Actuation Mechanism Main Body"

With reference to FIGS. 5-11, the structure of the valve actuation mechanism main body 31 will be explained below. In the variable valve actuation mechanism 3, since the structure of the portions corresponding to the respective cylinders 13 are common, in FIGS. 5-10 and FIG. 11, only the structure of the portion corresponding to one cylinder 13 is shown.

Figure 5:
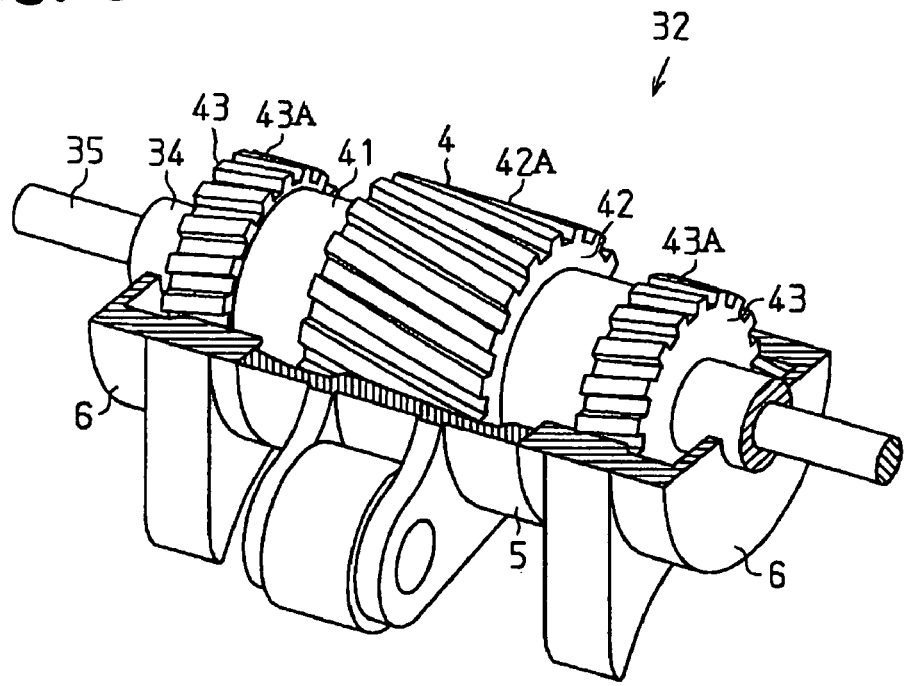
FIG. 5 is a perspective view showing the valve lift mechanism which constitutes the variable valve actuation mechanism of the first embodiment, with a part removed.
Figure 6:
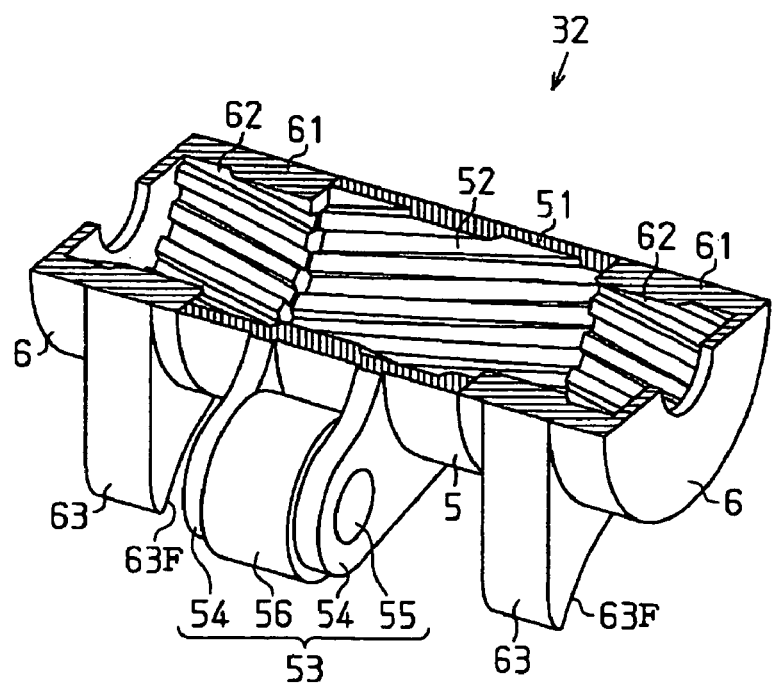
FIG. 6 is a perspective view showing the valve lift mechanism which constitutes the variable valve actuation mechanism of the first embodiment, with the slide shaft mechanism removed from the state shown in FIG. 5.

With reference to FIGS. 5 and 6, the structure of each valve lift mechanism 32 will be explained below.

FIG. 5 shows the perspective structure of the valve actuation mechanism main body 31, with parts of the input gear 5 and the output gear 6 is removed.

FIG. 6 shows the perspective structure of the valve actuation mechanism main body 31, with the slide shaft mechanism 33 and the slider gear 4 removed from the state shown in FIG. 5.

In the main body of the slider gear 4 (a slider gear main body 41), a slider gear input portion 42 and slider gear output portions 43 are integrally formed. In the slider gear input portion 42, a helical spline of the right hand helix (an input spline 42A) is formed. In each slider gear output portion 43, a helical spline of the left hand helix (an output spline 43A) is formed. That is, the input spline 42A and the output splines 43A are formed so that the helix direction of the tooth trace are formed at the opposite positions with respect to the center line O of the control shaft 35.

In the main body of the input gear 5 (an input gear main body 51), a helical spline (an input spline 52) which is engaged with the input spline 42A of the slider gear 4 is formed. On the outer circumferential face of the input gear main body 51, an input arm 53 which is in contact with an intake cam 25C is provided. The input arm 53 includes a pair of arms 54 which are integrally formed with the input gear main body 51 and a roller 56 which rotates around a shaft 55.

In the main body of each output gear 6 (an output gear main body 61), a helical spline (an output spline 62) which is engaged with the output spline 43A of the slider gear 4 is formed. On the outer circumferential surface of each output gear main body 61, an output arm 63 which is integrally formed is provided. In the output arm 63, a cam surface 63F which is curved in a concave shape is formed.

Figure 7:
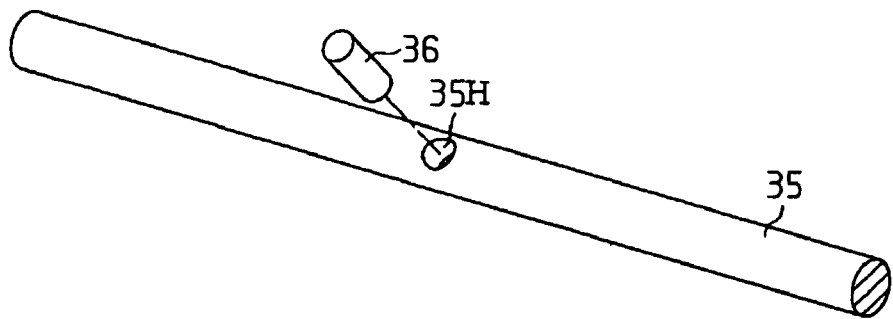
FIG. 7 is a perspective view showing the structure of a control shaft constituting the variable valve actuation mechanism of the first embodiment.
Figure 8:
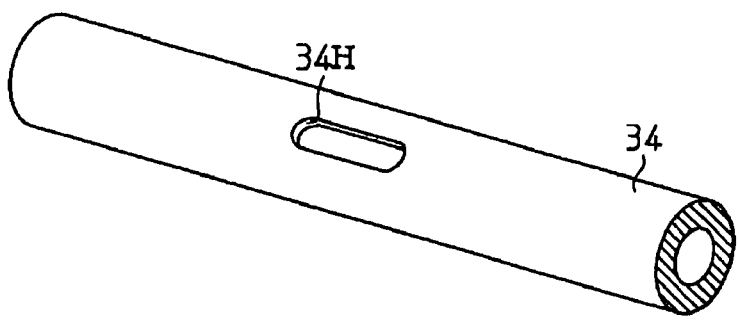
FIG. 8 is a perspective view showing the structure of a rocker shaft which constitutes the variable valve actuation mechanism of the first embodiment.
Figure 9:
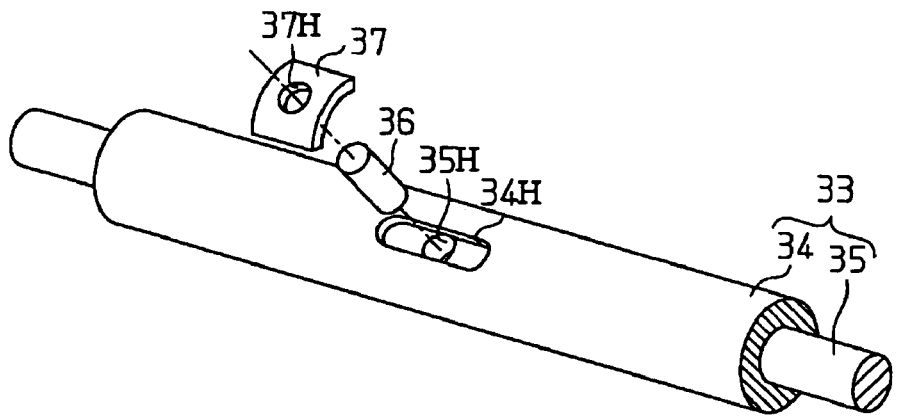
FIG. 9 is a perspective view showing the structure of the slide shaft mechanism which constitutes the variable valve actuation mechanism of the first embodiment.

With reference to FIGS. 7 to 9, the structure of the slide shaft mechanism 33 will be explained below.

FIG. 7 shows the perspective structure of the control shaft 35.

FIG. 8 shows the perspective structure of the rocker shaft 34.

FIG. 9 shows the perspective structure of the slide shaft mechanism 33.

In the control shaft 35, a connect pin 36 for interlocking the slider gear 4 with the linear motion of the control shaft 35. The connect pin 36 is fitted into a pin insertion hole 35H of the control shaft 35. In the control shaft 35 of the present embodiment, four pin insertion holes 35H are formed corresponding to the respective cylinders 13.

In the rocker shaft 34, a pin movement hole 34H for allowing the linear motion of the connect pin 36 is formed. The connect pin 36 is fitted into the pin insertion hole 35H of the control shaft 35 via the pin movement hole 34H.

In the slide shaft mechanism 33, a bushing 37 for fixing the relative positions of the control shaft 35 and the slider gear 4 in the axial direction is mounted on the connect pin 36. Owing to this, the control shaft 35, the connect pin 36 and the bushing 37 integrally and linearly move.

Figure 10:
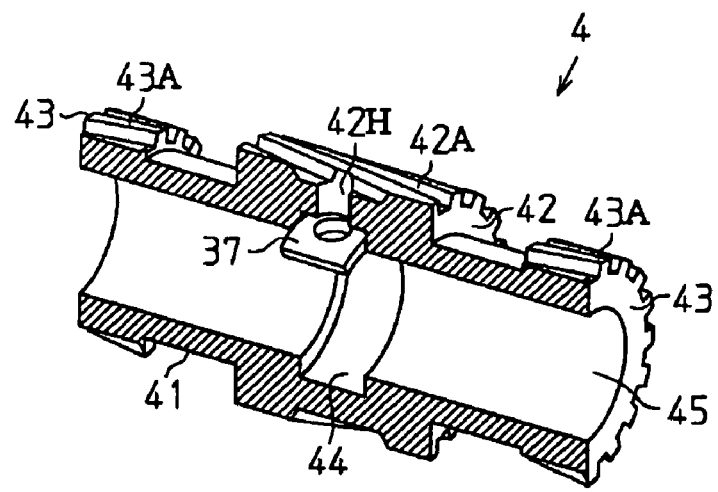
FIG. 10 is a cross-sectional view showing the slide shaft mechanism which constitutes the variable valve actuation mechanism of the first embodiment.
Figure 11:
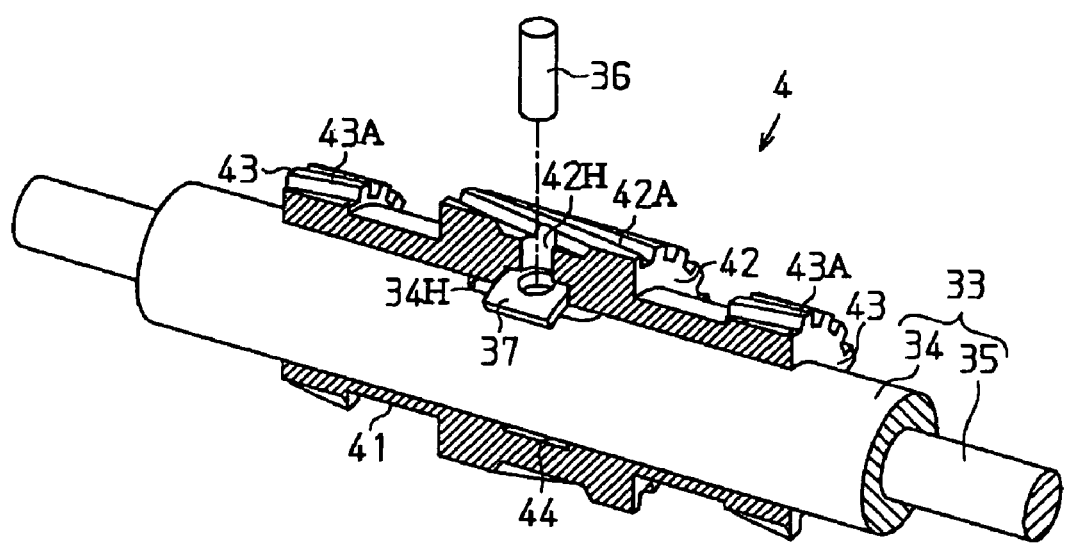
FIG. 11 is a perspective view showing the slider gear which constitutes the variable valve actuation mechanism of the first embodiment, with which the slide shaft mechanism is combined.

With reference to FIGS. 10 and 11, the installing structure of the valve lift mechanism 32 and the slide shaft mechanism 33 will be explained below.

FIG. 10 shows the cross-sectional structure of the slider gear 4.

FIG. 11 shows the state where the slide shaft mechanism 33 is combined with the slider gear 4 in a state shown in FIG. 10.

In a pin groove 44 of the slider gear 4, a bushing 37 is disposed. In the slider gear 4 in this state, the slider gear 4, the rocker shaft 34 and the control shaft 35 are combined by inserting the rocker shaft 34 and the control shaft 35 into a shaft insertion hole 45 of the slider gear main body 41.

The connect pin 36 is fitted into a pin insertion hole 35H of the control shaft 35 via a pin insertion hole 42H of the slider gear 4 and a pin insertion hole 37H of the bushing 37. Owing to this, the control shaft 35, the connect pin 36, the bushing 37 and the slider gear 4 integrally and linearly move.

[4] "Operation Mode 1 of Variable Valve Actuation Mechanism"

Figure 12:
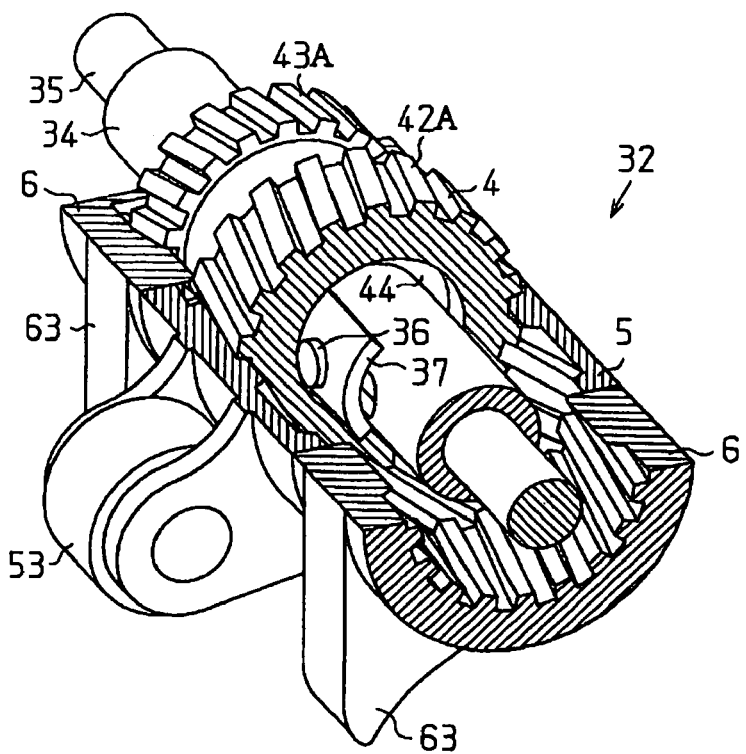
FIG. 12 is a perspective view showing the valve lift mechanism which constitutes the variable valve actuation mechanism of the first embodiment, with a part removed.
Figure 13:
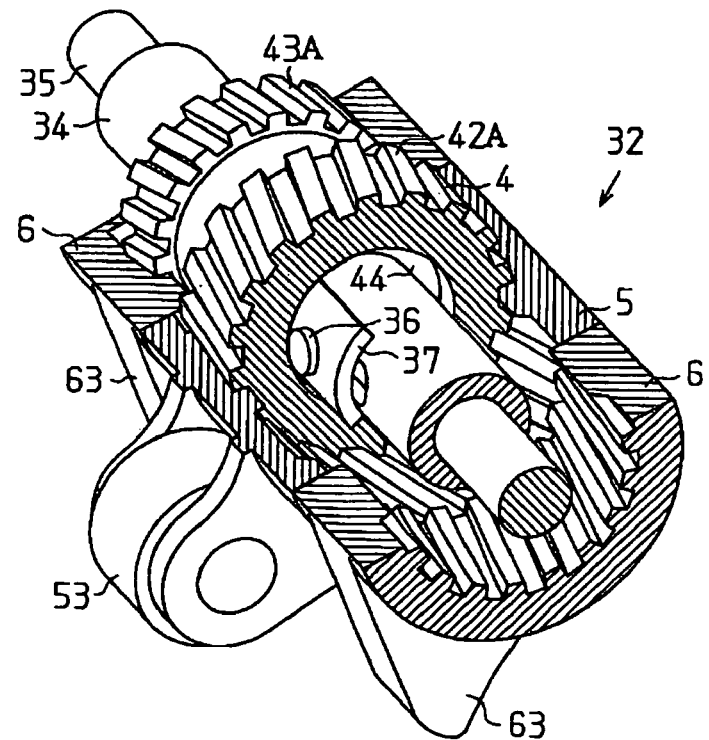
FIG. 13 is a perspective view showing the valve lift mechanism which constitutes the variable valve actuation mechanism of the first embodiment, with a part removed.

With reference to FIGS. 12 and 13, the operation mode of the valve lift mechanism 32 of the variable valve actuation mechanism 3 accompanying the rotational motion of the intake camshaft 25 will be explained below.

In FIG. 12, concerning the valve actuation mechanism main body 31, the perspective structure in a state where one portion of the slider gear 4, the input gear 5 and the output gear 6 is removed is shown.

In FIG. 13, concerning the valve actuation mechanism main body 31, the state where the slider gear 4, the input gear 5 and the output gear 6 have started to rotate from the state shown in FIG. 12.

In the valve actuation mechanism main body 31, the relative rotation of the slider gear 4 is allowed with respect to the rocker shaft 34 and the control shaft 35 (the slide shaft mechanism 33) by disposing the connect pin 36 and the bushing 37 in the pin groove 44 of the slider gear 4.

Owing to this, in the variable valve actuation mechanism 3, when the input gear 5 is pushed by the intake cam 25C of the intake camshaft 25, the slider gear 4 performs the rotational motion around the slide shaft mechanism 33 as well as the input gear 5. Moreover, the output gear 6 performs the rotational motion around the slide shaft mechanism 33 as well as the slider gear 4. That is, the slider gear 4, the input gear 5 and the output gear 6 integrally perform the rotational motion around the slide shaft mechanism 33. For example, the operation state of the valve actuation mechanism main body 31 is in the state shown in FIG. 12, in the case where the input gear 5 is pushed by the intake cam 25C, the operation state of the valve actuation mechanism main body 31 transfers to the state shown in FIG. 13 by means of the rotational motion of the slider gear 4, the input gear 5 and the output gear 6.

[5] "Operation Mode 2 of Variable Valve Actuation Mechanism"

Figure 14:
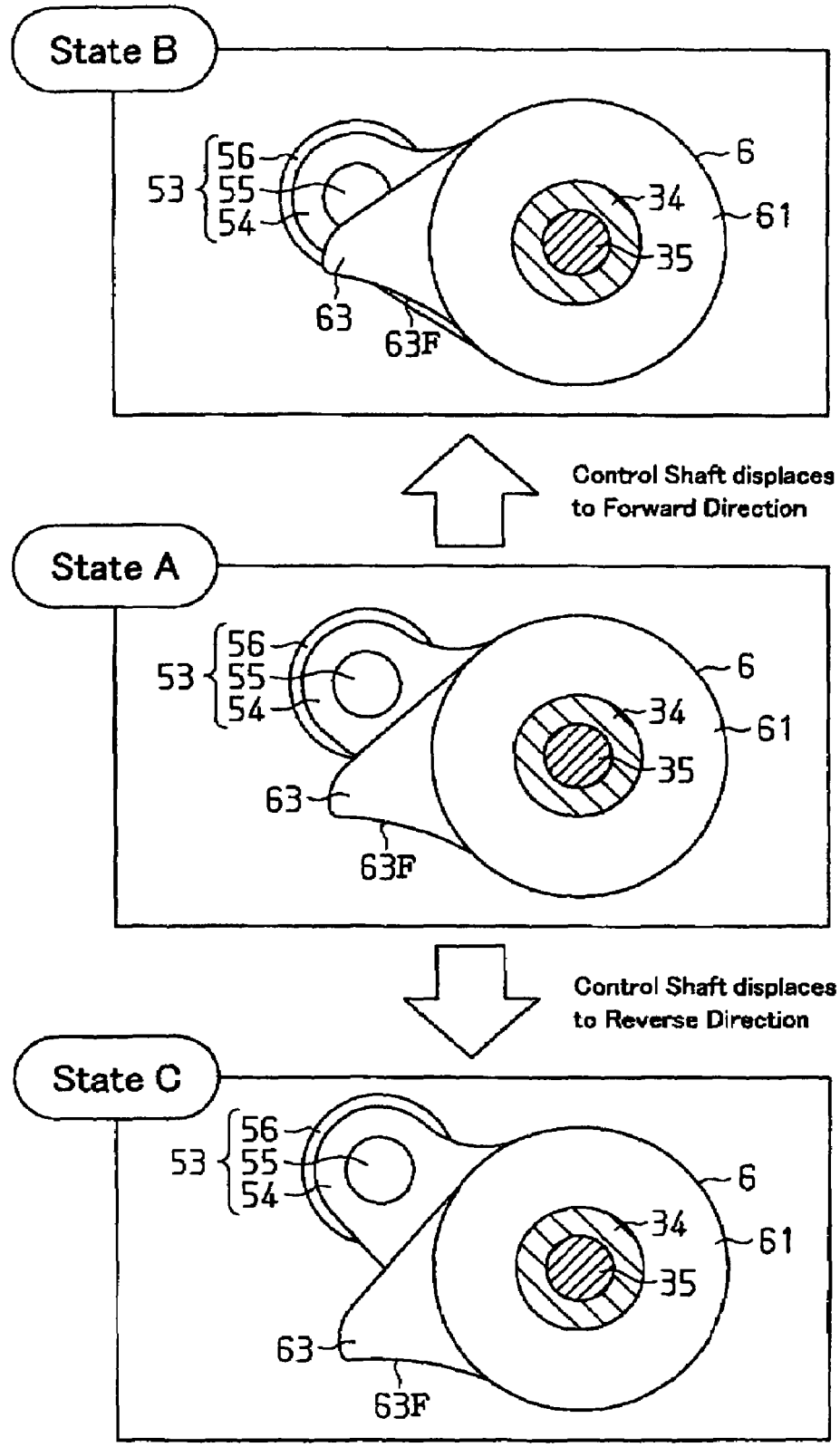
FIG. 14 is a side cross-sectional view taken along line DZ-DZ of FIG. 2.

With reference to FIG. 14, the operation mode of the valve lift mechanism 32 accompanying the linear motion of the control shaft 35 will be explained below. FIG. 14 shows the side face structure of the variable valve actuation mechanism 3 along line DZ-DZ of FIG. 2.

When in the valve lift mechanism 32, the relative positions of the slider gear 4 and the input and the output gears 5, 6 with respect to the axial direction is changed by the linear motion of the control shaft 35, the torsional force acting on the input gear 5 and the output gears 6 in the opposite direction with each other is given. Owing to this, since the input gear 5 and the output gears 6 relatively rotate, the relative rotational phase of the input gear 5 (the input arm 53) and the output gears 6 (the output arms 63) is changed. In the variable valve actuation mechanism 3, since the all of the slider gears 4 are fixed on the common one piece of the control shaft 35, the above-described relative rotational phase is changed in the all of the valve lift mechanism 32 accompanying the movement of the control shaft 35.

In the variable valve actuation mechanism 3, when a state A shown in FIG. 14 is made as the reference operation state, the valve lift mechanism 32 operates corresponding to the moving direction of the control shaft 35 as shown below:

(a) When the control shaft 35 is displaced from the state A to the forward direction F, the operation state of the valve lift mechanism 32 transfers from the state A to a state B. That is, the input arm 53 and the output arm 63 approach each other around the center line O by means of the relative rotation of the input gear 5 and the output gears 6.

(b) When the control shaft 35 is displaced from the state A to the reverse direction R, the operation state of the valve lift mechanism 32 transfers from the state A to the state C. Specifically, the input arm 53 and the output arm 63 are spaced from each other around the center line O by means of the relative rotation of the input gear 5 and the output gears 6.

[6] "Relationship between Operation of Variable Valve Actuation Mechanism and Valve Duration"

Figure 15:
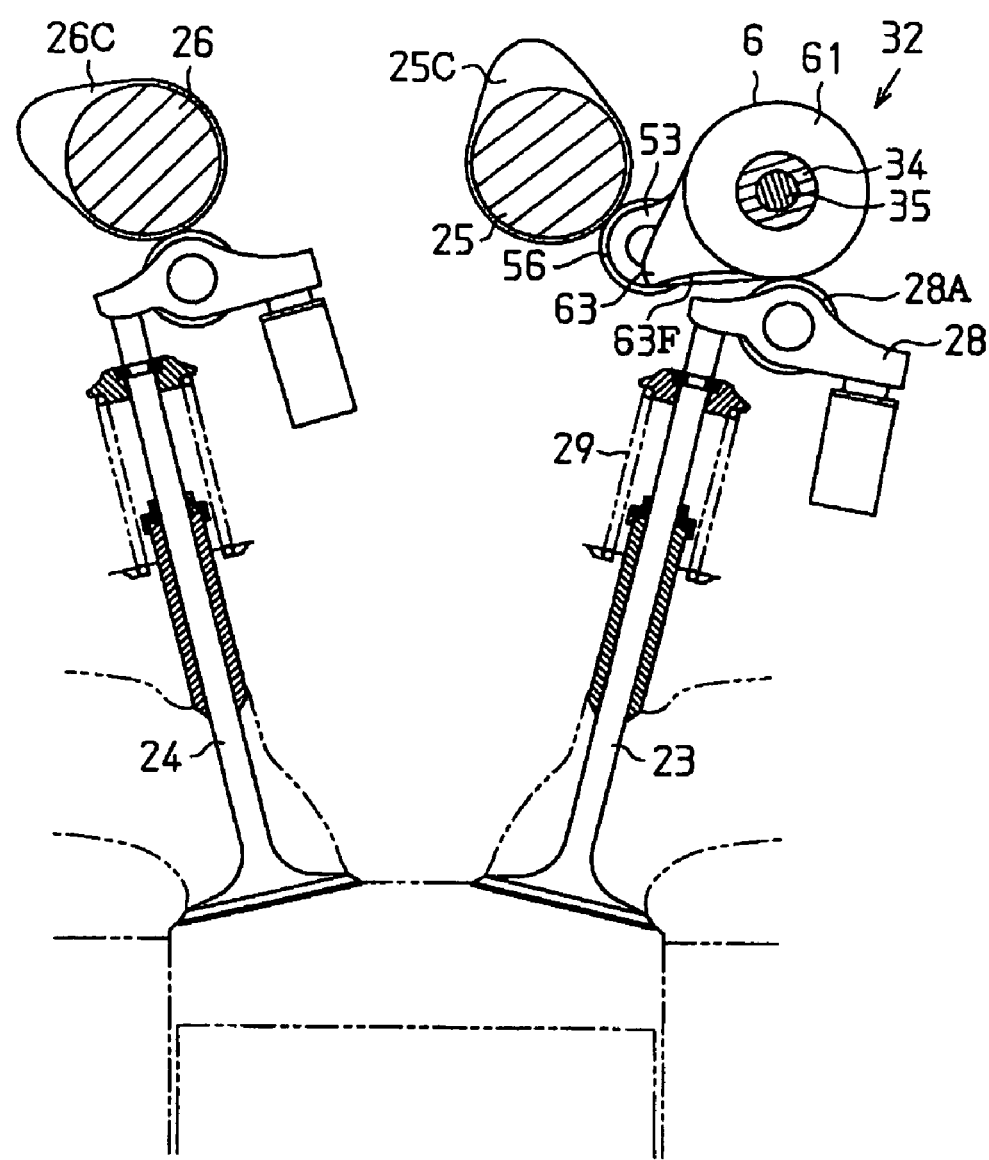
FIG. 15 is a cross-sectional view showing the periphery of the variable valve actuation mechanism of the variable valve engine of the first embodiment.

In FIG. 15, the cross-sectional structure on the periphery of the variable valve actuation mechanism 3 in the engine 1 is shown.

In the cylinder head 12, between intake camshaft 25 and the roller rocker arm 28, the valve lift mechanism 32 of the variable valve actuation mechanism 3 is disposed. Since the roller rocker arm 28 is urged toward the valve lift mechanism 32 by the valve spring 29 of the intake valve 23, it is maintained in a state where the roller 28A is always in contact with the output gear 6 of the valve lift mechanism 32. Since the input gear 5 is urged toward the intake camshaft 25 by the spring mounted between the cylinder head 12 and the input gear main body 51, it is maintained in a state where the roller 56 is always in contact with the intake cam 25C.

In the engine 1, when the roller 28A of the roller rocker arm 28 is in contact with the output gear main body 61 of the output gear 6, that is, when the roller 28A is not in contact with the output arm 63, the position of the roller rocker arm 28 is not changed from the reference position (the position where the intake valve 23 is maintained at the position nearest to the valve closing position), the intake valve 23 is maintained at the position nearest to the valve closing position. On the other hand, when the roller 28A is in contact with the output arm 63, since the roller rocker arm 28 is pushed down by means of the output arm 63, the intake valve 23 is opened. Since the amount that the roller rocker arm 28 is pushed down from the reference position is changed corresponding to the contact position of a cam surface 63F of the output arm 63 with respect to the roller 28A, the nearer to the distal end of the output arm 63 the contact position of the cam surface 63F with respect to the roller 28A approaches, the larger the displacement amount of the intake valve 23 becomes.

In the variable valve actuation mechanism 3, when the input arm 53 is in contact with the base circle of the intake cam 25C, the rotational phase of the output gears 6 is maintained at the reference phase (rotational phase at which the output arms 63 are not in contact with the roller 28A). On the other hand, when the input arm 53 is in contact with the cam nose of the intake cam 25C, the output arms 63 approach to the rollers 28A by the rotational phase of the output gears 6 changing by means of the rotational motion of the valve lift mechanism 32 around the rocker shaft 34 from the reference phase. Then, the intake valves 23 are opened by the output arms 63 being in contact with the rollers 28A by means of the changing of the rotational phase of the output gears 6. Since the changing amount of the rotational phase of the output gears 6 accompanying the rotational motion of the valve lift mechanism 32 changes corresponding to the contact position of the intake cam 25C with respect to the input arm 53, the closer to the distal end of the cam nose the contact position of the intake cam 25C with respect to the input arm 53 approaches, the closer to the roller 28A the distal end of the output arms 63 approaches.

From the procedure described above, in the engine 1, the pushing down period and the pushing down amount of the roller rocker arm 28 (the intake valve 23) by means of the output arm 63 at the time when the cam nose of the intake cam 25C is in contact with the input arm 53 changes corresponding to the distance between the input arm 53 and the output arm 63 around the rocker shaft 34 (the center line O). Therefore, it is possible to change the intake valve duration INCAM and the intake maximum valve lift amount INVL by changing the relative rotational phase between the input arm 53 and the output arms 63 by means of performing the displacement of the control shaft 35.

The intake air valve duration INCAM and the intake air maximum valve lift amount INVL change corresponding to the distance between the above-described input arm 53 and the output arms 63 as the followings:

(a) Since the shorter the distance between the input arm 53 and the output arms 63 around the center line O (for example, at the time when it transfers from the state A to the state B, which are shown in FIG. 14), the smaller the pushing down period and the pushing down amount of the roller rocker arm 28 by means of the output arm 63, the less the intake valve duration INCAM and the intake maximum valve lift amount INVL become.

(b) Since the longer the distance between the input arm 53 and the output arm 63 around the center line O (for example, at the time when it transfers from the state A to the state C, which are shown in FIG. 14), the larger the pushing down period and the pushing down amount of the roller rocker arm 28 by means of the output arm 63 becomes, the intake valve duration INCAM and the intake maximum valve-lift amount INVL increase.

<Overview of Rotary-to-Linear Actuator>

In the engine 1, the adjustment of the intake air amount is performed by means of changing the intake valve duration INCAM by means of the variable valve actuation mechanism 3. Therefore, since the intake valve duration INCAM is finely changed corresponding to the intake air amount to be targeted, it is required that the rotational motion is converted into a slight linear motion by precisely corresponding the angle (rotation angle) of the rotational motion which is inputted to the displacement amount of the linear motion (linear displacement amount) which is outputted.

Then, in the rotary-to-linear actuator 7 of the present embodiment, an actuator which is capable of satisfying the above-described requirement is configured by realizing the deceleration function and the function of the differential screw similar to the planetary gear mechanism by means of gears mating. That is, the rotational movement can be converted into the liner motion by larger deceleration ratio as well as establishing a one-to-one correspondence between the rotation angle and the linear displacement by utilizing the deceleration by means of the deceleration mechanism (planetary screw mechanism) configured with the combination of the sun shaft corresponding to the sun gear, the planetary shafts corresponding to the planetary gears and the ring shaft corresponding to the internal gear and the operation as the differential screw between the sun shaft and the planetary shaft.

In the case where the planetary gear mechanism is configured with bevel gear, the helix angle of these gears is set at the same value as well as the sun gear and the planetary gear are set as the bevel gear at the opposite direction with one another from the relationship between the rotational directions of the respective gears. Moreover, as an internal gear, a bevel gear having a helix angle having the same direction with the planetary gear is employed.

Therefore, in order to configure the deceleration mechanism (planetary screw mechanism) similar to the planetary gear mechanism by means of mating screws, it is considered that only the sun shaft may be set as the screw having a thread in the reverse direction as well as the pitches and lead angles of the screw of the sun shaft, the planetary shafts and the ring shaft may be set at the same size. However, in this planetary screw mechanism, since any one of components does not perform the thrust displacement relatively with respect to the other components, the respective components cannot be installed. Then, in the present embodiment, the present inventors have noted of the fact that the sun shaft or the ring shaft performs the thrust displacement by increasing and decreasing the lead angle of the sun shaft or the ring shaft while securing the mating of the screws in the above-described planetary screw mechanism, and the present inventors have configured the planetary screw mechanism based on this operation principle.

In general, in order to completely mate two screws, it is necessary to set the pitches of these screws at the same size with each other. Moreover, in the planetary screw mechanism, in order to make the lead angles of the sun shaft, the planetary shafts and the ring shaft all equal, the ratio of the effective diameters (effective screw diameter) of the sun shaft, the planetary shafts and the ring shaft is made correspond with the ratio of the number of threads of the sun shaft, the planetary shaft and the ring shaft.

Therefore, in the planetary screw mechanism, the conditions where the thrust displacement is not generated in any one of the components are as the following conditions (A)-(C):

(A) As for the sun shaft, the planetary shafts and the ring shaft, only the screw having the thread of the sun shaft is set in the reverse direction.

(B) As for the sun shaft, the planetary shafts and the ring shaft, the pitches of the respective screws are set at the same size.

(C) The ratio of the effective screw diameters between the sun shaft, the planetary shafts and the ring shaft and the ratio of the number of threads of the sun shaft, the planetary shafts and the ring shaft are set at the same ratio.

In contrast to this, in the case where the number of threads of the sun shaft or the ring shaft is increased or decreased by the number of threads of an integer from the above-described number of threads, the sun shaft or the ring shaft can be relatively thrust and displaced. Then, in the rotary-to-linear actuator 7 of the present embodiment, the rotational motion which is inputted can be converted into the linear motion and outputted it by configuring the rotary-to-linear conversion mechanism 8 corresponding to the planetary screw mechanism by reflecting the above-described thought. That is, in the present embodiment, the planetary screw mechanism (rotary-to-linear conversion mechanism 8) is configured so that it satisfies the following conditions (a)-(d):

(a) The sun shaft and the planetary shafts mate with each other by the screws in the reverse direction.

(b) The ring shaft and the planetary shafts mate with each other by screws in the same direction.

(c) The pitches of the screws of the sun shaft, the ring shaft and the planetary shafts are the same with one another.

(d) As for the relationship between the effective screw diameter and the number of threads of the sun shaft, the ring shaft and the planetary shafts, when the relationship in the case where any one of the sun shaft, the ring shaft and the planetary shaft does not perform the thrust displacement even when-the ring shaft is rotated is made the reference relationship, the number of screws of the sun shaft is larger or smaller than the number of threads in the reference relationship by the value of the integer.

In a planetary screw mechanism having the above-described configuration, the function as a differential screw is cooperatively realized by the working of the sun shaft and the planetary shaft as well as the deceleration function similar to the planetary gear mechanism is cooperatively realized by the working of the sun shaft, the ring shaft, and the planetary shaft. Owing to this, between the sun shaft and the ring shaft, the rotational motion is converted into a slight amount of the linear motion through a one-to-one correspondence between the rotation angle and the linear displacement amount.

<Structure of Rotary-to-Linear Actuator>

Figure 16:
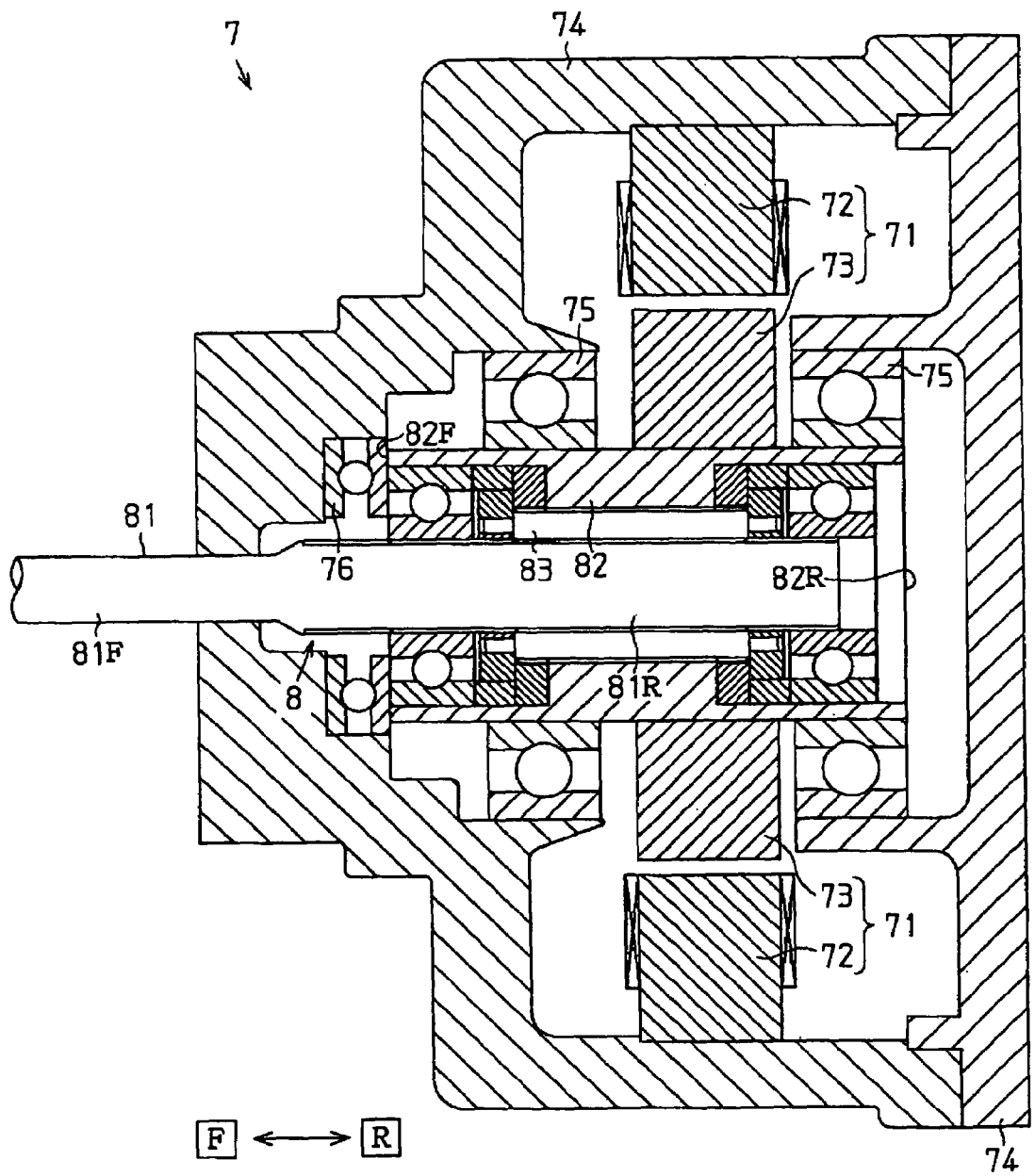
FIG. 16 is a cross-sectional view showing a rotary-to-linear actuator of the first embodiment, taken along the axis of a sun shaft.

With reference to FIG. 16, the structure of the rotary-to-linear actuator 7 will be explained below. FIG. 16 shows a cross-sectional structure of the rotary-to-linear actuator 7 along the axial direction.

In the rotary-to-linear actuator 7, the motor 71 and the rotary-to-linear conversion mechanism 8 is embedded in a housing 74. The motor 71 is made up of a stator 72 having a coil and a rotor 73 having a permanent magnet as a brushless motor.

The rotary-to-linear conversion mechanism 8 includes the combination of the sun shaft 81 (sun shaft) for functioning as an outputting shaft of the rotary-to-linear actuator 7, a ring shaft 82 (ring shaft) which integrally rotates with the rotor 73 and a plurality of planetary shafts 83 (planetary shafts) which are linearly moved by means of the rotation of the ring shaft 82.

The sun shaft 81 is connected to the control shaft 35 so that the center line of itself is matched with the center line O of the control shaft 35. That is, in the variable valve actuation mechanism 3, the control shaft 35 displaces to the forward direction F or the reverse direction R accompanying the linear motion of the sun shaft 81.

The rotary-to-linear actuator 7 is equipped with a radial bearing 75 for supporting the rotary-to-linear conversion mechanism 8 in the radial direction and a thrust bearing 76 for supporting the rotary-to-linear motion conversion mechanism 8 in the axial direction. The radial bearing 75 is disposed at the position surrounding the outer circumference of the ring shaft 82 and fixed on the housing 74. The thrust bearing 76 is disposed at the position for supporting the end face (a shaft front end face 82F) nearby the valve actuation mechanism main body 31 out of the end faces of the ring shaft 82 and fixed on the housing 74.

<Driving of Rotary-to-Linear Actuator>

The operation mode of the rotary-to-linear actuator 7 will be explained below. In the variable valve actuation mechanism 3, the control shaft 35 is driven in accordance with the order of [1] to [3]:

[1] The rotor 73 and the ring shaft 82 rotate by energizing the stator 72.

[2] The planetary shafts 83 rotate while revolving around the sun shaft 81 by means of rotating of ring shaft 82. That is, the planetary shafts 83 perform the planetary motion around the sun shaft 81.

[3] The sun shaft 81 linearly moves by means of the planetary motion of the planetary shafts 83. Moreover, the control shaft 35 linearly moves with the sun shaft 81.

In the rotary-to-linear actuator 7, the moving direction (forward direction F or reverse direction R) of the sun shaft 81 can be changed by switching the rotational direction of the motor 71. In the present embodiment, the direction at which the sun shaft 81 is pushed out from the rotary-to-linear conversion mechanism 8 and the forward direction F are matched. Moreover, the direction at which the sun shaft 81 is drawn into the rotary-to-linear conversion mechanism 8 and the reverse direction R are matched.

<Structure of Rotary-to-Linear Conversion Mechanism>

Figure 17:
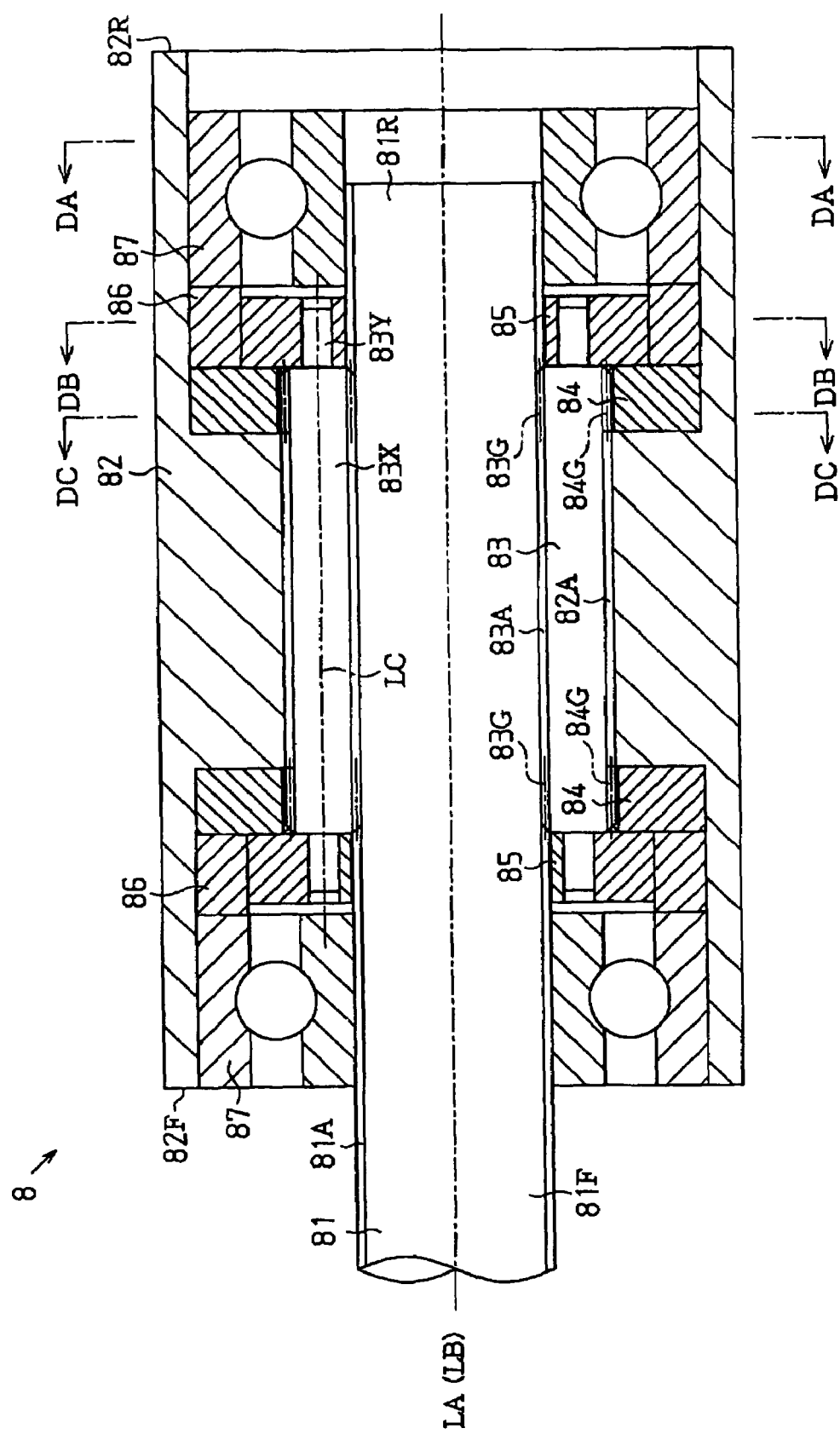
FIG. 17 is a cross-sectional view showing a rotary-to-linear conversion mechanism which constitutes the rotary-to-linear actuator of the first embodiment, taken along the taken along the axis of the sun shaft.

With reference to FIGS. 17-21, the detailed structure of the rotary-to-linear conversion mechanism 8 will be explained below. FIG. 17 shows the cross-sectional structure of the rotary-to-linear conversion mechanism 8 along the axial direction.

Figure 18:
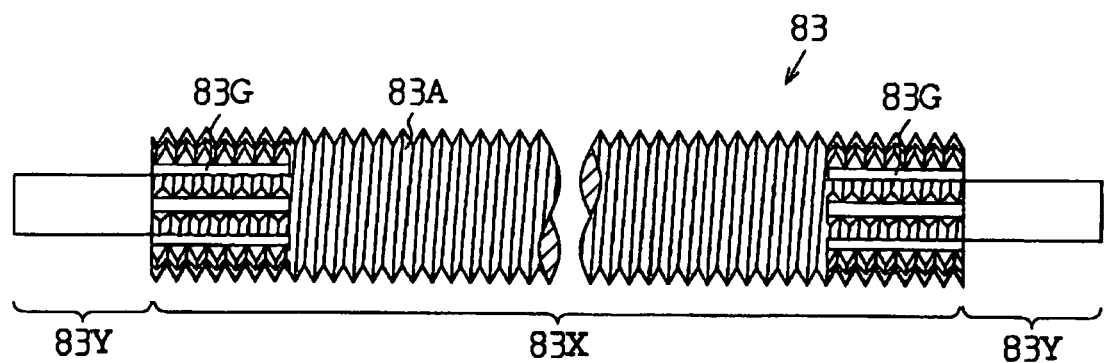
FIG. 18 is a front view showing a planetary shaft which constitutes the rotary-to-linear conversion mechanism of the first embodiment.

FIG. 18 shows the front elevation structure of the planetary shaft 83.

Figure 19:
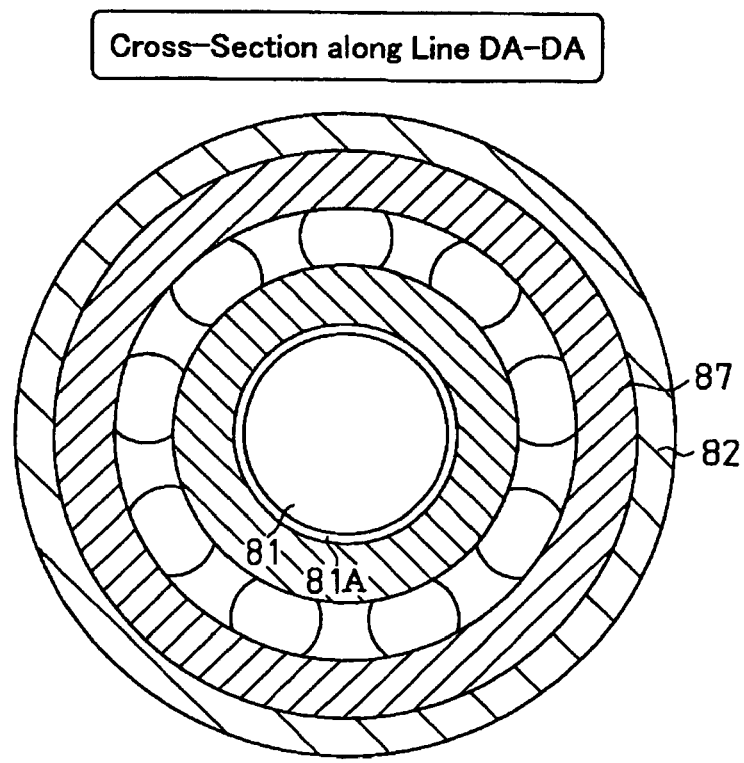
FIG. 19 is a cross-sectional view showing the rotary-to-linear conversion mechanism of the first embodiment taken on the line DA-DA of FIG. 17.

FIG. 19 shows the cross-sectional structure of the rotary-to-linear conversion mechanism 8 taken along line DA-DA of FIG. 17.

Figure 20:
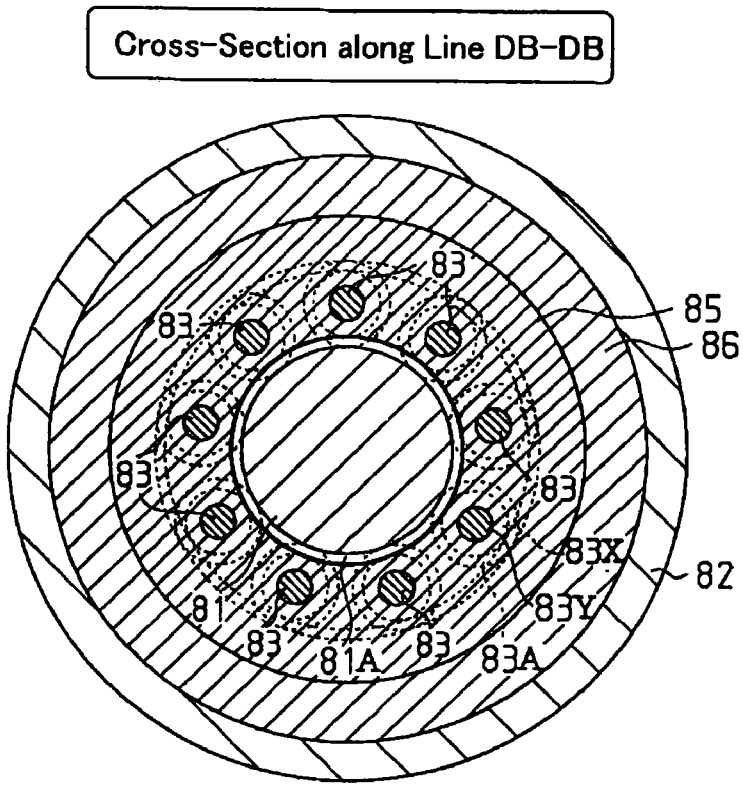
FIG. 20 is a cross-sectional view showing the rotary-to-linear conversion mechanism of the first embodiment taken on the line DB-DB of FIG. 17.

FIG. 20 shows the cross-sectional structure of the rotary-to-linear conversion mechanism 8 taken along line DB-DB of FIG. 17.

Figure 21:
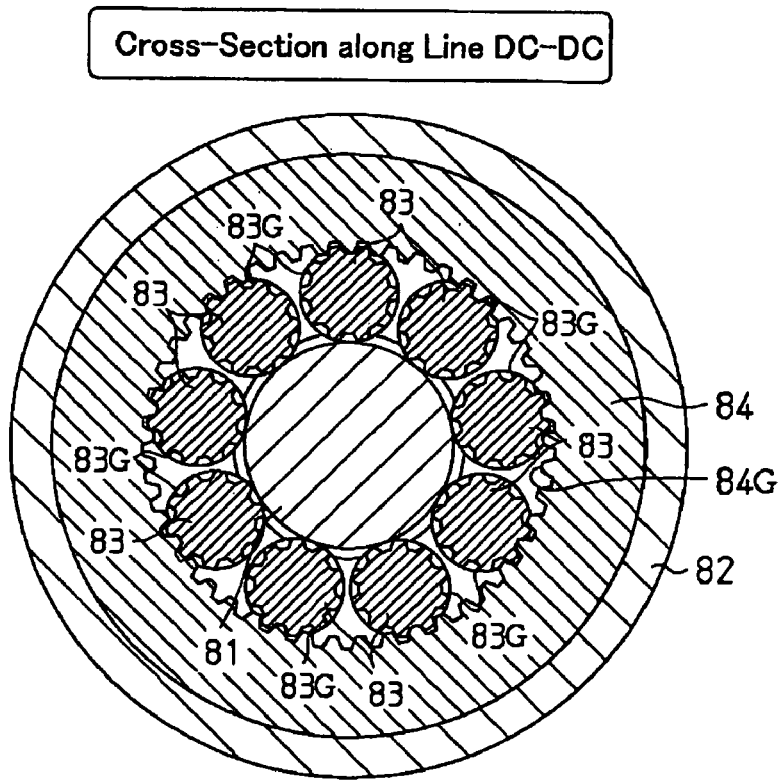
FIG. 21 is a cross-sectional view showing the rotary-to-linear conversion mechanism of the first embodiment taken on the line DC-DC of FIG. 17.

FIG. 21 shows the cross-sectional structure of the rotary-to-linear conversion mechanism 8 taken along line DC-DC of FIG. 17.

[1] "On the Installation of the Respective Components"

The sun shaft 81 is disposed interior of the ring shaft 82 in a state where it can be linearly moved but cannot be rotated. On the outer circumferential surface of the sun shaft 81, an external screw 81A which is mated with an external screw 83A of each planetary shaft 83 is formed. In the present embodiment, the right-hand screw having a plurality of threads as the external screw 81A is formed on the sun shaft 81.

As for the sun shaft 81, the distal end portion close to the valve actuation mechanism main body 31 is connected to the control shaft 35. Moreover, the length in the axial direction of the sun shaft 81 is larger than the length in the axial direction of the ring shaft 82.

The ring shaft 82 is disposed so that the center line LB of itself is matched with the center line LA of the sun shaft 81. Moreover, the ring shaft 82 is disposed within the housing 74 in a state where it cannot be linearly moved but can be rotated. On the inner circumferential surface of the ring shaft 82, an internal screw 82A which is mated with the external screw 83A of each planetary shaft 83 is formed. In the present embodiment, the left-handed screw having a plurality of threads is formed on the sun shaft 81 as the internal screw 82A.

On the inner circumferential surface of the ring shaft 82, a ring gear 84 is mounted. The ring gear 84 integrally rotates with the ring shaft 82 by fixing the ring gear 84 on the ring shaft 82. On the inner circumferential face of the ring gear 84, an internal gear 84G having spur teeth which is mated with an external gear 83G of each planetary shaft 83 is formed.

Between the sun shaft 81 and the ring shaft 82, a plurality of the planetary shafts 83 are disposed. In the present embodiment, the respective planetary shafts 83 are disposed at the equal interval around the center line LA as well as that nine pieces of the planetary shafts 83 are disposed around the sun shaft 81.

The planetary shafts 83 are disposed so that the center line LC of each planetary shaft 83 is in parallel to the center line LA of the sun shaft 81. Moreover, it is disposed within the ring shaft 82 in a state where it cannot be displaced in a thrust direction but can be rotated. The length in the axial direction of each planetary shaft 83 is set smaller than the length in the axial direction of the ring shaft 82.

Each planetary shaft 83 includes a mating portion 83X which is provided at the center in the axial direction and bearing portions 83Y each of which projects from an end face of the mating portion 83X toward the axial direction.

Each bearing portion 83Y is fitted into a retainer 85 in an annular shape which is disposed on the periphery of the sun shaft 81. Owing to this, the rotation of the planetary shafts 83 and the revolution of the planetary shafts 83 around the sun shaft 81 are allowed.

On the outer circumferential surface of the mating portion 83X, the external screw 83A is formed. Moreover, at each end portion of the axial direction, the external gear 83G of the spur teeth is integrally formed. The center line of the external gear 83G is matched with the center line LC of the planetary shaft 83. In the present embodiment, as the external screw 83A, the left-handed screw whose number of threads is different from that of the external screw 81A of the sun shaft 81 is formed on the mating portion 83X.

The external gear 83G is formed by machining the tooth profile of the spur tooth at both end portions of the mating portion 83X. Therefore, at the place where the external gear 83G is formed in the mating portion 83X, the thread ridge of the external screw 83A is segmented at an equal interval by means of tooth space of the external gear 83G around the center line LC.

The retainer 85 is supported by a bushing 86 which is fixed on the ring shaft 82 for functioning as a plain bearing. Moreover, the relative thrust displacement of the retainer 85 is regulated with respect to the ring shaft 82 by means of a radial bearing 87 which is fixed on the ring shaft 82. That is, it is disposed within the ring shaft 82 in a state where it can be rotated but cannot be thrust and displaced with respect to the sun shaft 81 and the ring shaft 82.

[2] "On Gear"

In each planetary shaft 83, the diameter of the reference pitch circle of the external screw 83A (effective screw diameter) and the diameter of the reference pitch circle of the external gear 83G are set in the same size. Moreover, the ratio of the number of teeth between the external gear 83G of the planetary shaft 83 and the internal gear 84G of the ring gear 84 is set at the same ratio with the ratio between the effective screw diameter between the external screw 83A of the planetary shaft 83 and the internal screw 82A of the ring shaft 82. Therefore, the ratio of the number of teeth between the external gear 83G and the internal gear 84G is a value equal to the ratio of the number of threads between the external screw 83A of each planetary shaft 83 and the internal screw 82A of the ring shaft 82.

Owing to this, the relationship of the revolving number of the ring shaft 82 and each planetary shaft 83 is precisely regulated by the ratio of the number of teeth between the external gear 83G and the internal gear 84G and corresponds to the relationship of the ratio of the effective screw diameter between the external screw 83A and the internal screw 82A which should originally exist. Moreover, as the external gear 83G and the internal gear 84G, the gear except for the spur gear (for example, a bevel gear whose helix angle of the tooth is less than or equal to a predetermined angle) can be also formed.

[3] "On the Mating of the Screws"

In the rotary-to-linear conversion mechanism 8, as for the external screw 81A of the sun shaft 81, the internal screw 82A of the ring shaft 82 and the external screw 83A of each planetary shaft 83, the pitches of the screws are set in the same size. The external screw 81A of the sun shaft 81 and the external screw 83A of each planetary shaft 83 are set in the reverse direction from the viewpoint of the rotation direction of the screws. The rotational direction of the screws of the internal screw of the ring shaft 82 and the external screw 83A of each planetary shaft 83 are set in the same direction.

As for the external screw 81A of the sun shaft 81, the internal screw 82A of the ring shaft 82 and the external screw 83A of each planetary shaft 83, these are formed so that the shape of the thread ridge is formed to be schematically isosceles triangle on the cross-sectional face along the respective center lines. That is, on the same cross-sectional face, the thread ridge is formed to be a shape of bilateral symmetry.

Owing to this, between the external screw 81A of the sun shaft 81 and the external screw 83A of each planetary shaft 83, the following mating is obtained. That is, at a plurality of positions at the interval of pitch of the screw with one another in the center line direction, the state where these are substantially in point-contact with each other although the rotation direction and the rotation angle of the sun shaft 81 and each planetary shaft 83 is always maintained. Moreover, also in the external screw 83A of each planetary shaft 83 and the internal screw 82A of the ring shaft 82, the state where these are in point-contact with each other is always maintained.

Then, in the case where the ring shaft 82 has relatively rotated with respect to the sun shaft 81, the planetary shafts 83 relatively rotate with respect to the sun shaft 81 and the ring shaft 82 without sliding each other by means of mating of the thread ridge by the external screw 83A of the respective planetary shaft 83 mating with the external screw 81A of the sun shaft 81 and the internal screw 82A of the ring shaft 82 as described above.

[4] "On the Number of Threads of Screw"

In the rotary-to-linear conversion mechanism 8, the number of the threads of the external screw 81A of the sun shaft 81 is set as follows: that is, as for the relationship between the effective screw diameter and the number of threads of the screws of the sun shaft 81, the ring shaft 82 and the planetary shafts 83, the relationship at the time when any one of the sun shaft 81, the ring shaft 82 and the planetary shafts 83 does not thrust and displace is assumed to be the reference relationship, even in the case where the ring shaft 82 has rotated, the number of threads of the external screw 81A of the sun shaft 81 is set as the number of threads which is larger or smaller than the number of threads in the reference relationship by the value of an integer. Hereinafter, one-example of the setting of the number of threads is shown.

The effective screw diameters of the sun shaft 81, the ring shaft 82 and each planetary shaft 83 are defined as follows:

"DA": the effective screw diameter of the sun shaft 81,

"DB": the effective screw diameter of the ring shaft 82, and

"DC": the effective screw diameter of the planetary shaft 83.

The number of threads of the sun shaft 81, the ring shaft 82 and each planetary shaft 83 is defined as follows:

"NA": the number of threads of the external screw 81A of the sun shaft 81, "NB": the number of threads of the internal screw 82A of the ring shaft 82, and "NC": the number of threads of the external screw 83A of the planetary shaft 83.

In the case where the ring shaft 82 has rotated, the relationship between the effective screw diameter and the number of threads (reference relationship) of the sun shaft 81, the ring shaft 82 and the planetary shafts 83 at which any one of the sun shaft 81, the ring shaft 82 and the planetary shafts 83 does not thrust and displace is represented by the equation of "DA:DB:BC=NA:NB:NC". For example, when the effective screw diameters of the respective screws are set as "DA=3, DB=1 and DC=5", the above-described reference relationship can be obtained by setting the numbers of threads of the respective screws as "NA=3, NB=1 and NC=5".

In the present embodiment, the number of threads (NA=4) obtained by adding one to the number of threads of the sun shaft 81 (NA=3) in the above-described reference relationship is actually set as the number of threads of the sun shaft 81. That is, the ratio of the effective screw diameter of the respective screws is set as the relationship of the equation of "DA:DB:DC=3:1:5" and the ratio of the number of threads is set as the relationship of the equation of "NA:NB:NC=4:1:5". The case where the number of threads of the external screw 81A of the sun shaft 81 is set larger than the number of threads in the reference relationship is exemplified, however, the number of threads of the external screw 81A of the sun shaft 81 can be also set smaller than the number of threads in the reference relationship.

In the rotary-to-linear conversion mechanism 8 of the above-described configuration, the function as a differential screw is realized by the sun shaft 81 and the planetary shafts 83 as well as that the deceleration function similar to the planetary gear mechanism is realized by the sun shaft 81, the ring shaft 82 and the planetary shafts 83 cooperatively working. Owing to this, between the sun shaft 81 and the ring shaft 82, the rotational motion is converted into the slight linear motion through a one-to-one correspondence between the rotation angle and the linear displacement amount.

<Operation of Rotary-to-Linear Conversion Mechanism>

Driving of the rotary-to-linear conversion mechanism 8 will be explained below.

When the ring shaft 82 rotates, each planetary shafts 83 rotate and revolve in the same direction with the rotation direction (forward rotation direction) of the ring shaft 82 in a state where the mating of the internal screw 82A of the ring shaft 82 and the external screw 83A of each planetary shaft 83, the mating of the external screw 83A of each planetary shaft 83 and the external screw 81A of the sun shaft 81 and the mating of the internal gear 84G of the ring gear 84 and the external gear 83G of each planetary shaft 83 are maintained. That is, each planetary shaft 83 performs the planetary motion around the sun shaft 81. At this time, accompanying the revolution of the planetary shafts 83, the retainer 85 also rotates in the same direction with the rotation direction of the ring shaft 82.

Here, it is assumed that the state where the retainer 85 is made impossible to be rotated, that is, the state where the planetary shafts 83 cannot revolve and the sun shaft 81 can rotate by itself. At this time, the planetary shafts 83 will thrust and displace to the tightening direction of the external screws 83A by means of the rotation to the forward rotation direction. On the other hand, the sun shaft 81 rotates to the reverse direction (reverse direction) of the rotation direction of the ring shaft 82 by means of the mating of the screw with the planetary shafts 83, thereby will thrust and displace to the reverse direction of the thrust and displacement direction of the planetary shafts 83.

In the rotary-to-linear conversion mechanism 8, since the number of threads of the external screw 81A is set as the number of threads obtained by adding one to the number of threads of the external screw 81A in the above-described reference relationship, the sun shaft 81 relatively thrust and displace with respect to the planetary shafts 83 by the rotation of the above-described sun shaft 81 to the reverse direction.

In the actual rotary-to-linear conversion mechanism 8, since the revolution of the planetary shafts 83 is made possible as well as the rotation of the sun shaft 81 is made impossible, the sun shaft 81 will thrust and displace without rotating by means of the planetary motion of the planetary shafts 83 accompanying rotation of the ring shaft 82.

<Relationship between Operation of Rotary-to-Linear Actuator and Valve Duration>

The relationship between the operation of the rotary-to-linear actuator and the valve duration will be explained below.

Hereinafter, the rotation direction of the rotor 73 at the time when the control shaft 35 moves to the forward direction F is made the forward direction RF, and the rotation direction of the rotor 73 at the time when the control shaft 35 moves to the reverse direction R is made reverse direction RR.

(a) At the time when the rotational phase of the rotor 73 is maintained by means of energizing the stator 72, since the position of the control shaft 35 is not changed, the valve duration and the maximum valve lift amount is maintained as the size at that time.

(b) At the time when the rotor 73 rotates to the forward rotation direction RF by energizing the stator 72, since the control shaft 35 displaces toward the forward direction F, the valve duration and the maximum valve lift amount becomes smaller than that before the rotational phase of the rotor 73 changes. At this time, the valve duration and the maximum valve lift amount become smaller by the portion corresponding to the rotation angle of the rotor 73 from the start of the rotation of the rotor 73 to the stop of it.

(c) At the time when the rotor 73 rotates to the inversed rotation direction RR by energizing the stator 72, since the control shaft 35 displaces toward the reverse direction R, the valve duration and the maximum valve lift amount become larger than that before the rotational phase of the rotor 73 changes. At this time, the valve duration and the maximum valve lift amount become larger by the portion corresponding to the rotation angle of the rotor 73 from the start of the rotation of the rotor 73 to the stop of it.

<Problem and Countermeasures of Rotary-to-Linear Actuator>

In the rotary-to-linear actuator 7, it is admitted that the abrasion of the external screw 81A of the sun shaft 81 and the external screws 83A of the planetary shafts 83 is promoted by the oscillation of the sun shaft 81. As a mechanism of promoting the abrasion, for example, the following case can be exemplified. In the sun shaft 81, when the site where it is positioned within the ring shaft 82 is made the shaft supporting portion 81R, and the site where it projects from the ring shaft 82 is made the shaft distal end portion 81F, the shaft distal end portion 81F may be oscillated by one portion of the shaft supporting portion 81R being support by means of the force acting to the rotary-to-linear actuator 7 from the external (for example, vibration of the engine 1). In this case, the abrasion of the external screw 81A and the external screw 83A is promoted by the external screw 81A of the sun shaft 81 rubbing against the external screws 83A of the planetary shafts 83. Moreover, in the case where the thrust load toward the reverse direction R is applied to the sun shaft 81 from the valve actuation mechanism main body 31, the oscillation area of the shaft distal end portion 81F supported by one portion of the shaft supporting portion 81R being support is particularly large, therefore, the abrasion of the external screw 81A and the external screws 83A is further promoted.

Then, in the rotary-to-linear actuator 7 of the present embodiment, the present inventors have noted the fact that the oscillation of the shaft distal end portion 81F is not easily occurred by drawing the sun shaft 81 away from the valve actuation mechanism main body 31, the thrust load toward the forward direction F is caused to act on the sun shaft 81 from the valve actuation mechanism main body 31.

Specifically, the above-described thrust load is applied to the sun shaft 81 via the control shaft 35 by configuring the variable valve actuation mechanism 3 so that it satisfies the following [condition 1]-[condition 3].

[Condition 1] The input spline 42A of the slider gear 4 is formed as a gear of right hand helix.

[Condition 2] The output spline 43A of the slider gear 4 is formed as a gear of left hand helix.

[Condition 3] The shaft second end portion 35R of the control shaft 35 and the sun shaft 81 are connected.

That is, the sun shaft 81 is drawn toward the valve actuation mechanism main body 31 by means of the control shaft 35 by setting the helix direction of the tooth trace of the slider gear 4 and the position of the rotary direct-actuator 7 so that the direction of the thrust load generated in the slider gear 4 by means of the force generated from the engine 1 and the direction to which the sun shaft 81 displaces toward the valve actuation mechanism main body 31 from the rotary-to-linear actuator 7 are matched.

Figure 22:
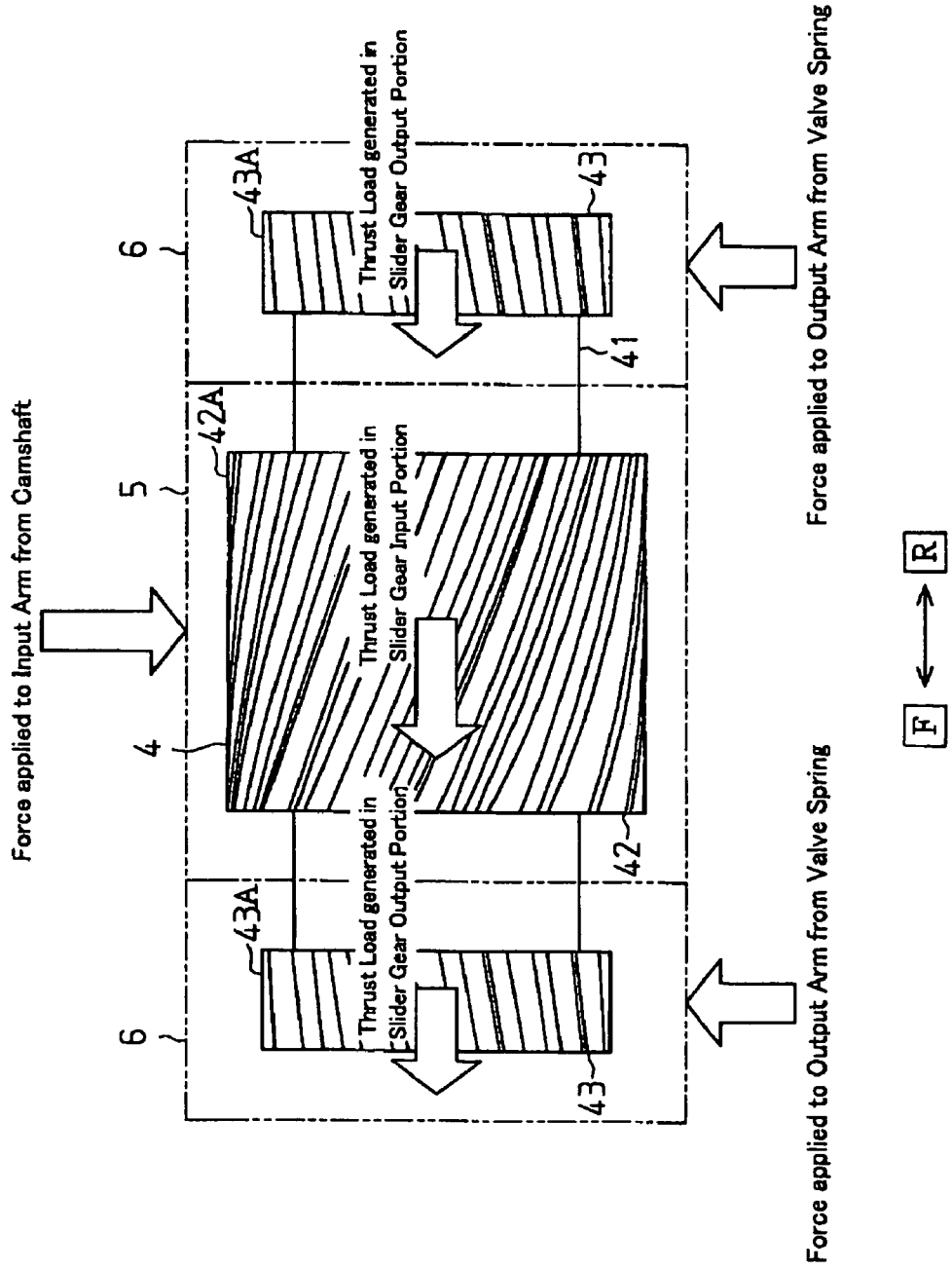
FIG. 22 is a front view showing a slider gear which constitutes the variable valve actuation mechanism of the first embodiment.

With reference to FIG. 22, the thrust load generated in the variable valve actuation mechanism 3 by means of the force generated from the engine 1 will be explained below.

In the variable valve actuation mechanism 3, since the force applied to the input arm 53 of the input gear 5 via the intake camshaft 25 is transmitted to the slider gear input portion 42 via the input gear main body 51, the thrust load acting in the forward direction F is generated in the slider gear input portion 42 by the relationship between the direction of the force applied to the input arm 53 and the helix direction of the tooth trace of the input spline 42A.

On the other hand, since the force applied to the output arm 63 of the output gear 6 via the valve spring 29 is transmitted to the slider gear output portion 43, the thrust load acting in the forward direction F is generated in the slider gear output portion 43 by the relationship between the direction of the force applied to the output arm 63 and the helix direction of the tooth trace of the output spline 43A.

Moreover, in the valve lift mechanism 32, since the force applied through the valve spring 29 toward the schematically reverse direction of that of the force applied to the input gear 5 through the intake camshaft 25 is applied to the output gear 6 as well as the helix direction of the input spline 42A and the helix direction of the output spline 43A are set in the opposite direction with each other, the directions of the thrust loads generated in the slider gear input portion 42 and the slider gear output portion 43 correspond.

In the variable valve actuation mechanism 3, since one or both of the above-described thrust load(s) is generated in at least one slider gear 4, the thrust load toward the forward direction F always acts on the control shaft 35. Owing to this, since the thrust load toward the forward direction F acts on the sun shaft 81 via the control shaft 35, the same thrust load always acts as the force to draw the sun shaft 81 from the rotary-to-linear actuator 7 toward the valve actuation mechanism main body 31. Moreover, in the present embodiment, the direct actuation shaft mechanism including the variable valve actuation mechanism 3 and the cylinder head 12 is made up. Moreover, the load applying portion including the intake camshaft 25 and the valve spring 29 is made up.

Advantages of Embodiment

As previously described in detail, according to a variable valve engine according to the first embodiment, the advantages listed below are obtained.

(1) In the engine 1 of the present embodiment, the variable valve actuation mechanism 3 is made up so that the direction of the thrust load generated in the slider gear 4 by means of the force from the engine 1 and the direction in which the sun shaft 81 displaces from the rotary-to-linear actuator 7 toward the valve actuation mechanism main body 31 are matched. Owing to this, since the sun shaft 81 is drawn toward the valve actuation mechanism main body 31 by means of control shaft 35, the oscillation of the sun shaft 81 can be suppressed. Moreover, the abrasion of the sun shaft 81 and the planetary shafts 83 can be reduced by means of the suppression of the oscillation.

(2) In the engine 1 of the present embodiment, the thrust load drawing the sun shaft 81 toward the valve actuation mechanism main body 31 is applied to the sun shaft 81, by setting the helix direction of the tooth trace of the slider gear 4 and the position of the rotary-to-linear actuator 7. Owing to this, the oscillation of the sun shaft 81 can be suppressed without providing the specific mechanism with respect to the variable valve actuation mechanism 3, therefore, the complication of the configuration and increase of the cost can be suppressed.

(3) In the engine 1, the configuration for supporting one portion of the sun shaft 81 by means of the cam carrier 27 can be employed. In this case, as above-described in the paragraph of (1), when the oscillation of the sun shaft 81 is not suppressed, in order that the abrasion between the cam carrier 27 and the sun shaft 81 causing the oscillation of the sun shaft 81 is reduced, it is required that a bearing is provided in the cam carrier 27. Considering from this point of view, in the engine 1 of the present embodiment, the abrasion between the cam carrier 27 and the sun shaft 81 is reduced by suppressing the oscillation of the sun shaft 81, the supporting structure of the above-described sun shaft 81 can be employed without providing a bearing in the cam carrier 27. Owing to this, the cost and the number of processes relating to the bearing can be reduced.

Second Embodiment

In the present embodiment, as a variable valve engine according to the present invention, a variable valve engine which can suppress the oscillation of the output shaft of the rotary-to-linear actuator will be explained below. The variable valve engine of the present embodiment includes a modification of the variable valve actuation mechanism of the above-described first embodiment.

<Structure of Variable Valve Actuation Mechanism>

In the engine 1 of the above-described first embodiment, the sun shaft 81 is drawn toward the valve actuation mechanism main body 31 via the control shaft 35 by configuring the variable valve actuation mechanism 3 so that the above-described [Condition 1]-[Condition 3] are satisfied.

In the engine 1 of the present embodiment, the sun shaft 81 is drawn toward the valve actuation mechanism main body 31 via the control shaft 35 by configuring the variable valve actuation mechanism 3 so that the following [Condition A]-[Condition C] are satisfied. The engine 1 of the present embodiment is different from the configuration of the engine 1 of the above-described first embodiment in this configuration, and except for it, the configuration similar to the above-described first embodiment is employed.

[Condition A] The input spline 42A of the slider gear 4 is formed as a left-hand helix gear.

[Condition B] The output spline 43A of the slider gear 4 is formed as a right-hand helix gear.

[Condition C] The shaft first end portion 35F of the control shaft 35 and the sun shaft 81 are connected.

Owing to this, since the direction of the thrust load generated in the slider gear 4 by means of the force from the engine 1 and the direction in which the sun shaft 81 displaces toward the valve actuation mechanism main body 31 from the rotary-to-linear actuator 7 are matched, the sun shaft 81 is drawn toward the valve actuation mechanism main body 31 via the control shaft 35.

Advantages of Embodiment

As described in detail up to this point, according to the variable valve engine according to the second embodiment of the present invention, the advantages similar to the advantages of the above-described (1)-(3) by the previously described first embodiment are obtained.

Third Embodiment

In the present embodiment, as a rotary-to-linear actuator according to the present invention, a rotary-to-linear actuator capable of suppressing the oscillation of the sun shaft will be explained below. The rotary-to-linear actuator of the present embodiment of the present invention is a modification of the rotary-to-linear actuator of the above-described first embodiment. Moreover, it can be applied to a linear motion shaft mechanism having a drive shaft which is capable of performing the linear motion.

<Structure of Rotary-to-Linear Actuator>

With reference to FIG. 23, the structure of a rotary-to-linear actuator 7 will be described below.

FIG. 23(A) shows the cross-sectional structure of the rotary-to-linear actuator 7 taken along the axial direction.

FIG. 23(B) shows the enlarged structure of the motor 71.

In the rotary-to-linear actuator 7 of the present embodiment, the oscillation of the shaft distal end portion 81F is suppressed by drawing the shaft distal end portion 81F toward the shaft supporting portion 81R by means of the thrust load applied to the ring shaft 82 from the motor 71. Concretely, it is made such that the above-described thrust load acts on the sun shaft 81 by applying the following configuration with respect to the rotary-to-linear actuator 7 of the above-described first embodiment. The rotary-to-linear actuator 7 of the present embodiment is different from the configuration of the rotary-to-linear actuator 7 of the above-described first embodiment in the following configuration, and except for that, it employs the configuration similar to the above-described first embodiment.

In the rotary-to-linear actuator 7, the position of the thrust bearing 76 is changed as the followings accompanying the employment of the configuration generating the above-described thrust load. Specifically, the thrust bearing 76 is disposed at the position where it supports the end face which is distanced farther from the valve actuation mechanism main body 31 (the shaft back end face 82R) comparing to the shaft front end face 82F out of the end faces of the ring shaft 82 and fixed on the housing 74.

In the motor 71, the stator 72 and the rotor 73 are opposed via the predetermined space. Specifically, the air gap 71A is formed between the portion where it opposes to the rotor 73 in the stator 72 (the stator opposing portion 72A) and the portion where it opposes to the stator 72 in the rotor 73 (the rotor opposing portion 73A).

In the present embodiment, the respective sites of the rotor 73 are defined as the followings based on the positioning relationship with the valve actuation mechanism main body 31.

The portion nearby the valve actuation mechanism main body 31 in the axial direction of the sun shaft 81 is defined as the rotor front face forming portion 73F (the first forming portion).

The portion positioned farther from the valve actuation mechanism main body 31 comparing to the rotor front face forming portion 73F in the axial direction of the sun shaft 81 is defined as the rotor back face forming portion 73R (the second forming portion).

The portion nearest to the valve actuation mechanism main body 31 in the axial direction of the sun shaft 81 is defined as the rotor front face 73G.

The portion farthest from the valve actuation mechanism main body 31 in the axial direction of the sun shaft 81 is defined as the rotor back face 73S.

The rotor front face forming portion 73F, including the rotor front face 73G, is made up. Specifically, in the axial direction of the sun shaft 81, the area from the rotor front face 73G to the intermediate portion of the rotor 73 corresponds to the rotor front face forming portion 73F. Moreover, the rotor back face forming portion 73R, including the rotor back face 73S, is made up. Specifically, in the axial direction of the sun shaft 81, the area from the rotor back face 73S to the intermediate portion of the rotor 73 corresponds to the rotor back face forming portion 73R.

In the motor 71, the structure in which the air gap 71A formed between the stator 72 and the rotor 73 becomes smaller as it approaches the rotor back face 73S from the rotor front face 73G is employed.

In the present embodiment, the forming of the above-described air gap 71A is realized by inclining the rotor opposing portion 73A toward the axial direction of the sun shaft 81 with respect to the stator opposing portion 72A. Concretely, the rotor 73 is shaped such that in which the rotor opposing portion 73A approaches the stator 72 from the rotor front face 73G toward the rotor back face 73S.

If it is assumed that the length of the air gap 71A (the distance between the stator opposing portion 72A and the rotor opposing portion 73A) is referred to as the gap length G, the gap length G between the stator 72 and the rotor back face forming portion 73R becomes smaller than the gap length G between the stator 72 and the rotor front face forming portion 73F. The gap length G becomes shorter from the rotor front face 73G toward the rotor back face 73S.

In the rotary-to-linear actuator 7, the magnetic force acting on the rotor back face forming portion 73R via the stator 72 becomes larger than the magnetic force acting on the rotor front face forming portion 73F via the stator 72 by applying the above-described structure to the motor 71. Owing to this, since the torque generated in the rotor back face forming portion 73R is always larger than the torque generated in the rotor front face forming portion 73F, the thrust load acting in the reverse direction R is generated in the rotor 73. Then, since this thrust load is transmitted to the sun shaft 81 via the ring shaft 82 and the planetary shafts 83, the shaft distal end portion 81F is drawn toward the shaft supporting portion 81R.

Advantages of Embodiment

As described in detail up to this point, according to the rotary-to-linear actuator according to the third embodiment, the advantages indicated in the followings are obtained.

(1) In the rotary-to-linear actuator 7 of the present embodiment, it is made that the thrust load acting in the reverse direction R is applied to the ring shaft 82 from the motor 71. Owing to this, since the shaft distal end portion 81F is drawn toward the shaft supporting portion 81R, the life of the rotary-to-linear actuator 7 is extended by suppressing the oscillation of the shaft distal end portion 81F.

Fourth Embodiment

In the present embodiment, as a rotary-to-linear actuator according to the present invention, a rotary-to-linear actuator capable of suppressing the oscillation of the sun shaft will be explained below. A rotary-to-linear actuator of the present embodiment is a modification of the rotary-to-linear actuator of the above-described third embodiment. Moreover, it can be applied to a linear motion shaft mechanism having a drive shaft which is capable of performing the linear motion.

<Structure of Rotary-to-Linear Actuator>

With reference to FIG. 24, the structure of the rotary-to-linear actuator 7 will be explained below.

FIG. 24(A) shows the cross-sectional structure of the rotary-to-linear actuator 7 taken along the axial direction.

FIG. 24(B) shows the enlarged structure of the motor 71.

In the rotary-to-linear actuator 7 of the present embodiment, similar to the above-described second embodiment, the oscillation of the shaft distal end portion 81F is suppressed by applying the thrust load acting in the reverse direction R to the ring shaft 82 from the motor 71 and drawing the shaft distal end portion 81F toward the shaft supporting portion 81R. Concretely, it is made such that the thrust load acting in the above-described reverse direction R acts on the sun shaft 81 by applying the change that will be explained hereinafter with respect to the rotary-to-linear actuator 7 of the above-described third embodiment. The rotary-to-linear actuator 7 of the present embodiment is different from the configuration of the rotary-to-linear actuator 7 of the above-described third embodiment in the following configuration, and except for that, it employs a configuration similar to the above-described third embodiment.

In the motor 71, the structure is employed in which the air gap 71A is formed between the stator opposing portion 72A and the rotor opposing portion 73A of the rotor back face forming portion 73R, and on the other hand, the air gap 71A between the stator opposing portion 72A and the rotor opposing portion 73A of the rotor front face forming portion 73F is not formed.

In the present embodiment, the forming of the above-described air gap 71A is realized by disposing the stator 72 and the rotor 73 at the position where the stator 72 and the rotor front face forming portion 73F are disposed at the positions where these are opposed. On the other hand, the stator 72 and the rotor front face forming portion 73F are disposed at the positions where these are not opposed. Concretely, the stator 72 is disposed at the position offset in the reverse direction R from a reference position of the stator 72 and the rotor 73, at which the stator 72 and the rotor front face forming portion 73F, the rotor back face forming portion 73R are opposed. The forming of the above-described air gap 71A is also realized by disposing the position where the rotor 73 is shifted to the forward direction F from the above-described reference position.

In the rotary-to-linear actuator 7, the magnetic force acting on the rotor back face forming portion 73R via the stator 72 becomes larger than the magnetic force acting on the rotor front face forming portion 73F via the stator 72 by applying the above-described structure to the motor 71. Owing to this, since the torque generated in the rotor back face forming portion 73R is always larger than the torque generated in the rotor front face forming portion 73F, the thrust load acting in the reverse direction R is generated in the rotor 73. Then, since this thrust load is transmitted to the sun shaft 81 via the ring shaft 82 and the planetary shafts 83, the shaft distal end portion 81F is drawn toward the shaft supporting portion 81R.

Advantages of Embodiment

As described in detail up to this point, according to the rotary-to-linear actuator according to the fourth embodiment, the advantages similar to the advantages of the above-described item (1) according to the previously described third embodiment are obtained.

Fifth Embodiment

In the present embodiment, as a rotary-to-linear actuator according to the present invention, a rotary-to-linear actuator capable of suppressing the oscillation of the sun shaft will be explained below. A rotary-to-linear actuator of the present embodiment is a modification of the rotary-to-linear actuator of the above-described third embodiment is changed. Moreover, it can be applied to a linear motion shaft mechanism having a drive shaft which is capable of performing the linear motion.

<Structure of Rotary-to-Linear Actuator>

With reference to FIG. 25, the structure of the rotary-to-linear actuator 7 will be explained below.

FIG. 25(A) shows the cross-sectional structure of the rotary-to-linear actuator 7 taken along the axial direction.

FIG. 25(B) shows the enlarged structure of the motor 71.

In the rotary-to-linear actuator 7 of the present embodiment, similar to the above-described second embodiment, the oscillation of the shaft distal end portion 81F is suppressed by applying the thrust load acting in the reverse direction R to the ring shaft 82 from the motor 71 and drawing the shaft distal end portion 81F toward the shaft supporting portion 81R. Concretely, it is made such that the thrust load acting in the above-described reverse direction R acts on the sun shaft 81 by applying the change that will be explained hereinafter with respect to the rotary-to-linear actuator 7 of the above-described third embodiment. The rotary-to-linear actuator 7 of the present embodiment is different from the configuration of the rotary-to-linear actuator 7 of the above-described third embodiment in the following configuration, and except for that, it employs a configuration similar to the above-described third embodiment.

In the motor 71, the structure is employed in which the air gap 71A is formed between the stator opposing portion 72A and the rotor opposing portion 73A of the rotor back face forming portion 73R, and on the other hand, the air gap 71A between the stator opposing portion 72A and the rotor opposing portion 73A of the rotor front face forming portion 73F is not formed.

In the present embodiment, it is assumed that the length in the axial direction of the sun shaft 81 in the stator 72 is the thickness TA, and the length in the axial direction of the sun shaft 81 in the rotor 73 is the thickness TB. The forming of the above-described air gap 71A is realized by setting the thickness TA of the stator 72 smaller than the thickness TB of the rotor 73. Concretely, the stator 72 is disposed at the position where whole of the stator opposing portion 72A is opposed to the rotor opposing portion 73A of the rotor back face forming portion 73R as well as the thickness TA of the stator 72 is set substantially the same with the thickness TB of the rotor back face forming portion 73R.

In the rotary-to-linear actuator 7, the magnetic force acting on the rotor back face forming portion 73R via the stator 72 becomes larger than the magnetic force acting on the rotor front face forming portion 73F via the stator 72 by applying the above-described structure to the motor 71. Owing to this, since the torque generated in the rotor back face forming portion 73R is always larger than the torque generated in the rotor front face forming portion 73F, the thrust load acting in the reverse direction R is generated in the rotor 73. Then, since this thrust load is transmitted to the sun shaft 81 via the ring shaft 82 and the planetary shafts 83, the shaft distal end portion 81F is drawn toward the shaft supporting portion 81R.

Advantages of Embodiment

As described in detail up to this point, according to the rotary-to-linear actuator according to the fifth embodiment, the advantages similar to the advantages of the above-described item (1) according to the previously described third embodiment are obtained.

Sixth Embodiment

In the present embodiment, as a rotary-to-linear actuator according to the present invention, a rotary-to-linear actuator capable of suppressing the oscillation of the sun shaft will be explained below. A rotary-to-linear actuator of the present embodiment is a modification of the rotary-to-linear actuator of the above-described third embodiment is changed. Moreover, it can be applied to a linear motion shaft mechanism having a drive shaft which is capable of performing the linear motion.

<Structure of Rotary-to-Linear Actuator>

With reference to FIGS. 26(A) and 26(B), the structure of the rotary-to-linear actuator 7 will be explained below.

FIG. 26(A) shows the cross-sectional structure of the rotary-to-linear actuator 7 taken along the axial direction.

FIG. 26(B) shows the enlarged structure of the motor 71.

In the rotary-to-linear actuator 7 of the present embodiment, similar to the above-described second embodiment, the oscillation of the shaft distal end portion 81F is suppressed by applying the thrust load acting in the reverse direction R to the ring shaft 82 from the motor 71 and drawing the shaft distal end portion 81F toward the shaft supporting portion 81R. Concretely, it is made such that the thrust load acting in the above-described reverse direction R acts on the sun shaft 81 by applying the change that will be explained hereinafter with respect to the rotary-to-linear actuator 7 of the above-described third embodiment. The rotary-to-linear actuator 7 of the present embodiment is different from the configuration of the rotary-to-linear actuator 7 of the above-described third embodiment in the following configuration, and except for that, it employs a configuration similar to the above-described third embodiment.

In the motor 71, the structure in which the magnetic force acting on the rotor back face forming portion 73R via the stator 72 is larger than the magnetic force acting on the rotor front face forming portion 73F via the stator 72 is employed.

In the present embodiment, the action of the above-described magnetic force is realized by providing the material having a high antimagnetic performance (the antimagnetic material 77) on the rotor opposing portion 73A of the rotor front face forming portion 73F. Concretely, the antimagnetic material is coated on the rotor opposing portion 73A of the rotor front face forming portion 73F. The action of the above-described magnetic force is also realized by mounting the antimagnetic material of a separate body from the rotor 73 on the rotor opposing portion 73A of the rotor front face forming portion 73F.

In the rotary-to-linear actuator 7, the magnetic force acting on the rotor back face forming portion 73R via the stator 72 becomes larger than the magnetic force acting on the rotor front face forming portion 73F via the stator 72 by applying the above-described structure to the motor 71. Owing to this, since the torque generated in the rotor back face forming portion 73R is always larger than the torque generated in the rotor front face forming portion 73F, the thrust load acting in the reverse direction R is generated in the rotor 73. Then, since this thrust load is transmitted to the sun shaft 81 via the ring shaft 82 and the planetary shafts 83, the shaft distal end portion 81F is drawn toward the shaft supporting portion 81R.

Advantages of Embodiment

As described in detail up to this point, according to the rotary-to-linear actuator according to the sixth embodiment, the advantages similar to the advantages of the above-described item (1) according to the previously described third embodiment are obtained.

Seventh Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described first embodiment is changed.

<Structures of Engine and Rotary-to-Linear Actuator>

Figure 28:
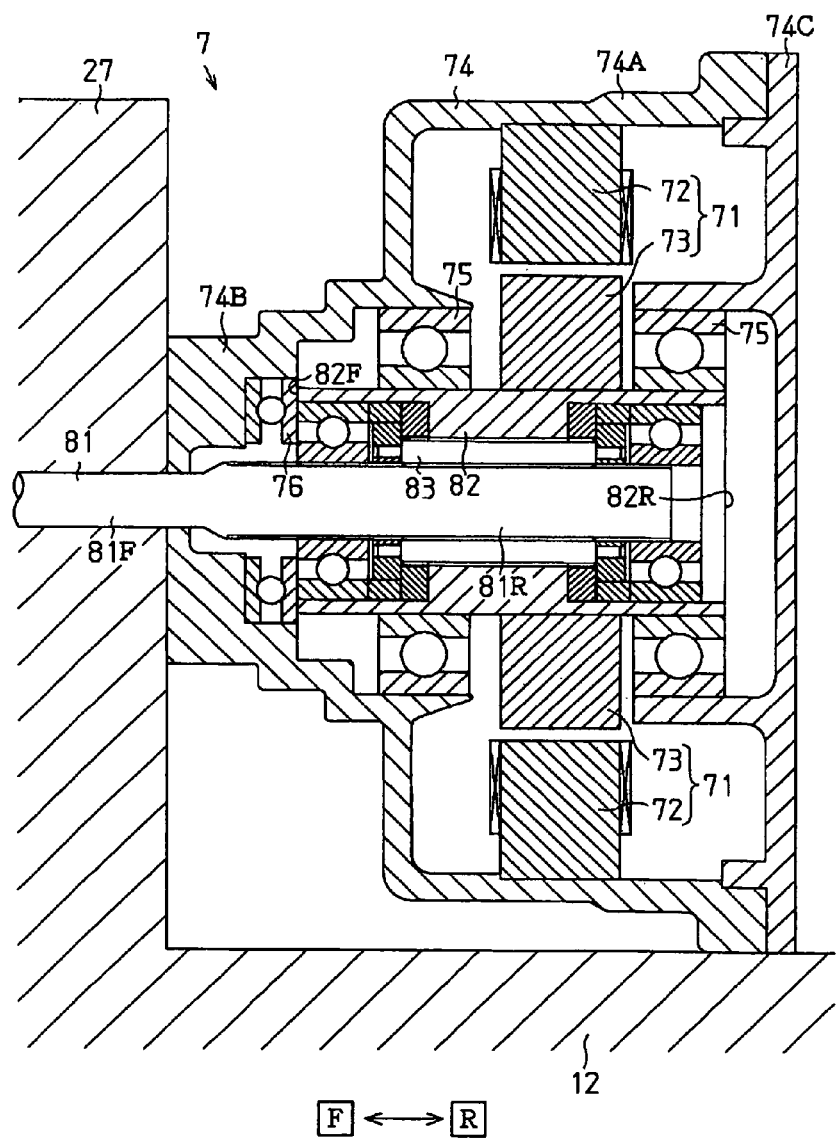
FIG. 28 is a cross-sectional view showing rotary-to-linear actuator of the seventh embodiment, taken along the axis of the sun shaft.

With reference to FIGS. 27 and 28, the structures of the engine 1 and the rotary-to-linear actuator 7 will be explained below.

FIG. 27 shows the plan structure of the cylinder head 12 of the engine 1.

FIG. 28 shows the cross-sectional structure of the rotary-to-linear actuator 7 taken along the axial direction.

In the rotary-to-linear actuator 7, in order to precisely perform the conversion from the rotational motion to the linear motion by the rotary-to-linear conversion mechanism, it is necessary to regulate the thrust displacement of the ring shaft 82. Then, the thrust displacement of the ring shaft 82 can be also regulated by receiving mainly the thrust load of the ring shaft 82 by the housing 74 (for example, the engine 1 of the above-described first embodiment), in this case, it is difficult to reduce the size of the actuator 7 since it is required that the thickness of the outer wall of the housing 74 is sufficiently secured because the thrust load of the ring shaft 82 is received.

Then, in the present embodiment, the load of the housing 74 for regulating the thrust displacement of the ring shaft 82 is reduced by making the engine 1 (the cylinder head 12) plays a roll for receiving mainly this thrust load as well as the thrust load for acting in a certain direction via the valve actuation mechanism main body 31 is applied to the ring shaft 82. Owing to this, since it is possible to reduce the thickness of the outer wall of the housing 74, the miniaturization of the rotary-to-linear actuator 7 can be realized while securing the appropriate operation of the rotary-to-linear conversion mechanism 8.

In the engine 1 of the present embodiment, the above-described advantages are obtained by applying the following [Additional configuration] to the engine 1 of the above-described first embodiment. The engine 1 of the present embodiment is different from the configuration of the engine 1 of the above-described first embodiment in the following configuration and except for that, it employs the configuration similar to the above-described first embodiment.

[Additional Configuration]

The outer wall for supporting the sun shaft 81 out of the outer wall 74A configuring the housing 74 (the front outer wall 74B) of the rotary-to-linear actuator 7 is fixed on the cam carrier 27 of the cylinder head 12.

In this way, in the engine 1, the thrust load is received by the cam carrier 27 of the cylinder head 12 as well as the helix direction of the tooth trace of the slider gear 4 and the position of the rotary-to-linear actuator 7 are set so that the ring shaft 82 is drawn toward the valve actuation mechanism main body 31 by means of the same thrust load of the control shaft 35.

Advantages of Embodiment

As described in detail up to this point, according to the variable valve engine according to the seventh embodiment, the advantages indicated in the followings are obtained.

(1) According to the engine 1 of the present embodiment, since it is possible to reduce the thickness of the outer wall of the housing 74, the miniaturization of the rotary-to-linear actuator 7 can be realized while securing an appropriate operation of the rotary-to-linear conversion mechanism 8.

Eighth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment is changed.

<Structures of Engine and Rotary-to-Linear Actuator>

Figure 29:
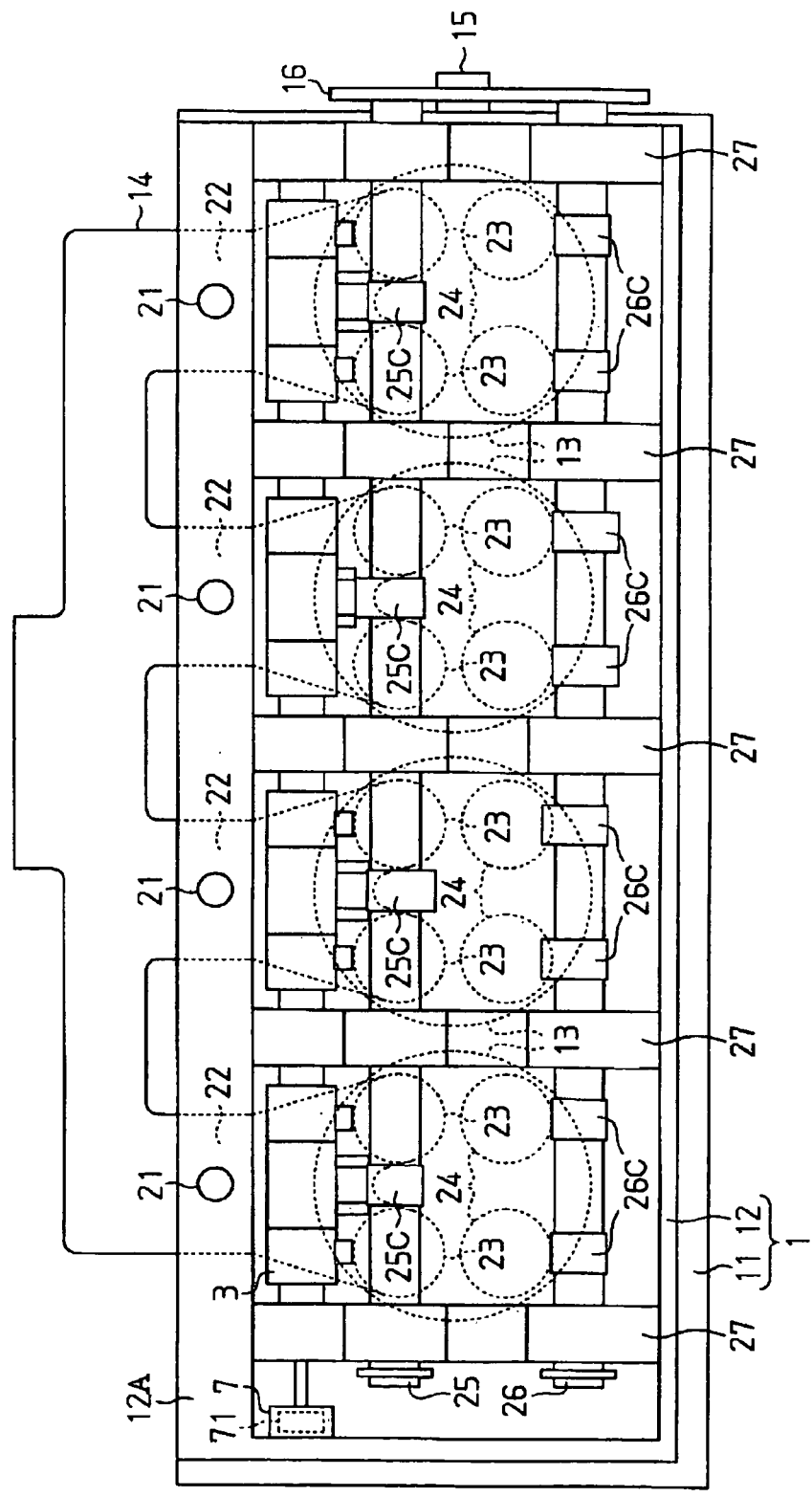
FIG. 29 is a diagram schematically showing a variable valve engine according to an eighth embodiment of the present invention.
Figure 30:
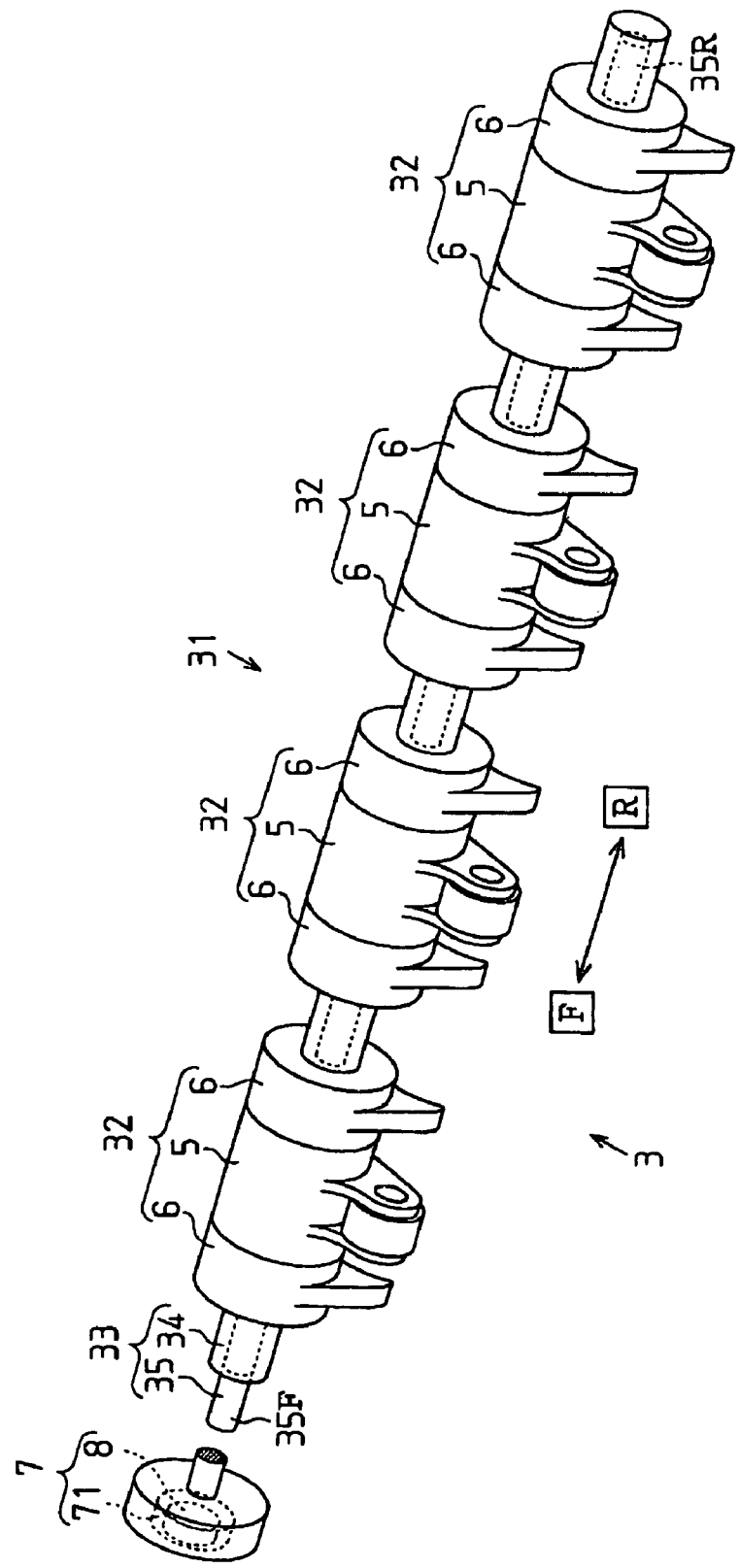
FIG. 30 is a perspective view showing its whole structure of the variable valve actuation mechanism of the eighth embodiment.
Figure 31:
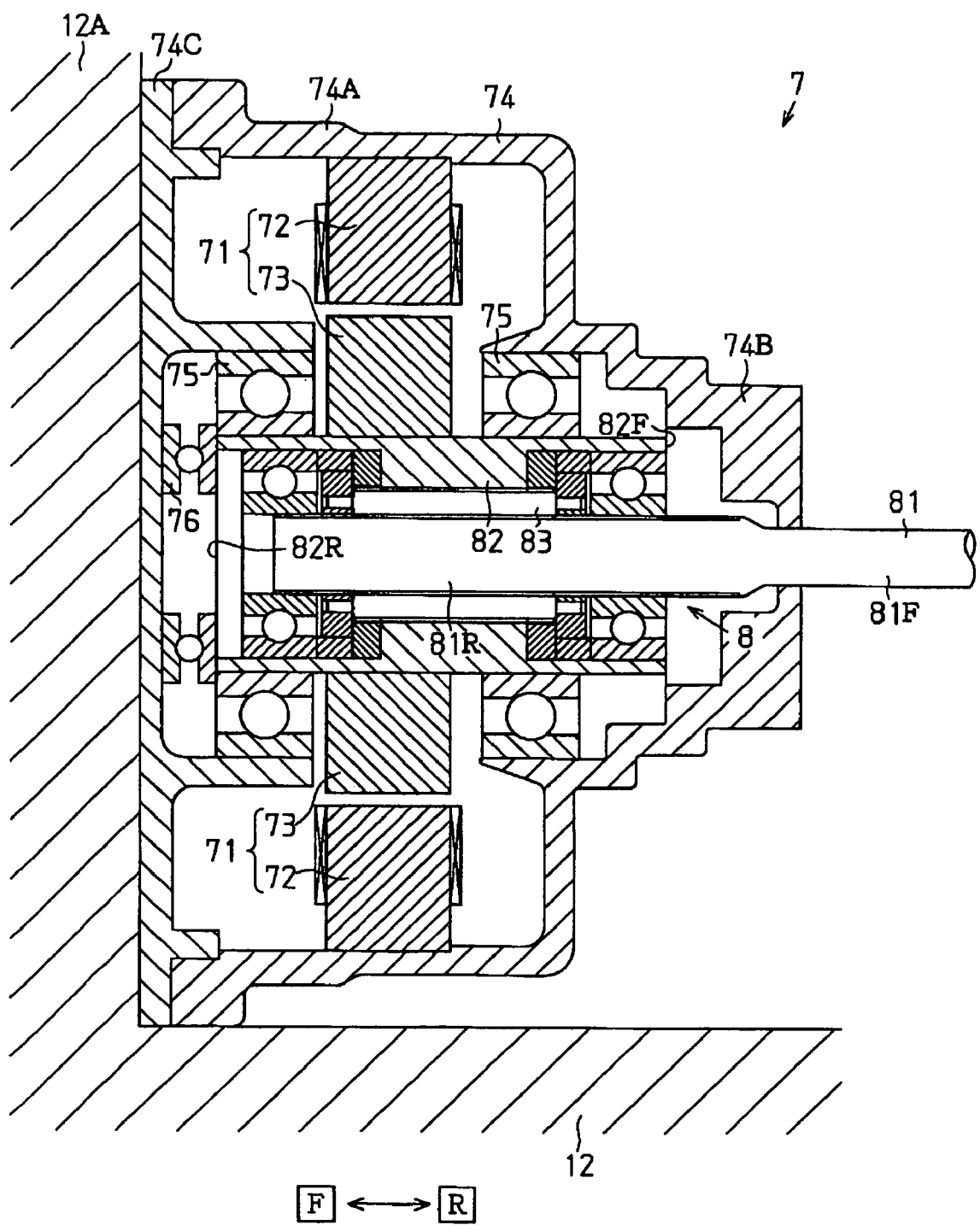
FIG. 31 is a cross-sectional view showing the rotary-to-linear actuator of the eighth embodiment, taken along the axis of a sun shaft.

With reference to FIGS. 29 to 31, the structures of the engine 1 and the rotary-to-linear actuator 7 will be explained below.

FIG. 29 shows the plan structure of the cylinder head 12 of the engine 1.

FIG. 30 shows the perspective structure of the variable valve actuation mechanism 3.

FIG. 31 shows the cross-sectional structure of the rotary-to-linear actuator 7 taken along the axial direction.

In the engine 1 of the above-described seventh embodiment, the variable valve actuation mechanism 3 in which the sun shaft 81 is connected to the shaft second end portion 35R is employed, however, in the engine 1 of the present embodiment, the variable valve actuation mechanism 3 in which the sun shaft 81 is connected to the shaft first end portion 35F is employed. Then, in the above-described engine 1, the miniaturization of the rotary-to-linear actuator 7 is realized while securing the appropriate operation of the rotary-to-linear conversion mechanism 8 by making the engine 1 (the cylinder head 12) play a roll-for mainly receiving this thrust load as well as by applying the thrust load for acting in a certain direction via the valve actuation mechanism main body 31 to the ring shaft 82.

In the present embodiment, the above-described advantages are obtained by applying the following [Additional configuration] to the engine 1 of the above-described seventh embodiment as well as one portion of the configuration in the engine 1 of the above-described seventh embodiment is changed according to the change of the position of the rotary-to-linear actuator 7 as shown in FIG. 29. The engine 1 of the present embodiment is different from the configuration of the engine 1 of the above-described seventh embodiment in these changes in the configuration, and except for that, it employs the configuration similar to the above-described first embodiment.

[Additional Configuration]

Out of the outer wall 74A configuring the housing 74 of the rotary-to-linear actuator 7, the outer wall (the back face outer wall 74C) opposing to the front outer wall 74B via the rotary-to-linear motion mechanism 8 is fixed on an outer wall 12A of the cylinder head 12. Concerning the thrust bearing 76 of the rotary-to-linear actuator 7, the ring shaft 82 is disposed at the position of supporting on the shaft back end face 82R and is fixed on the housing 74.

In this way, in the engine 1, the thrust load is received by the cam carrier 27 of the cylinder head 12 as well as the helix direction of the tooth trace of the slider gear 4 and the position of the rotary-to-linear actuator 7 are set so that ring shaft 82 is drawn in a direction away from the valve actuation mechanism main body 31 by means of the same thrust load of the control shaft 35.

Advantages of Embodiment

As described in detail up to this point, according to the variable valve engine according to the eighth embodiment, the advantages similar to the advantages of the above-described (1) according to the previously described seventh embodiment are obtained.

Ninth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment.

<Structures of Engine and Rotary-to-Linear Actuator>

Figure 32:
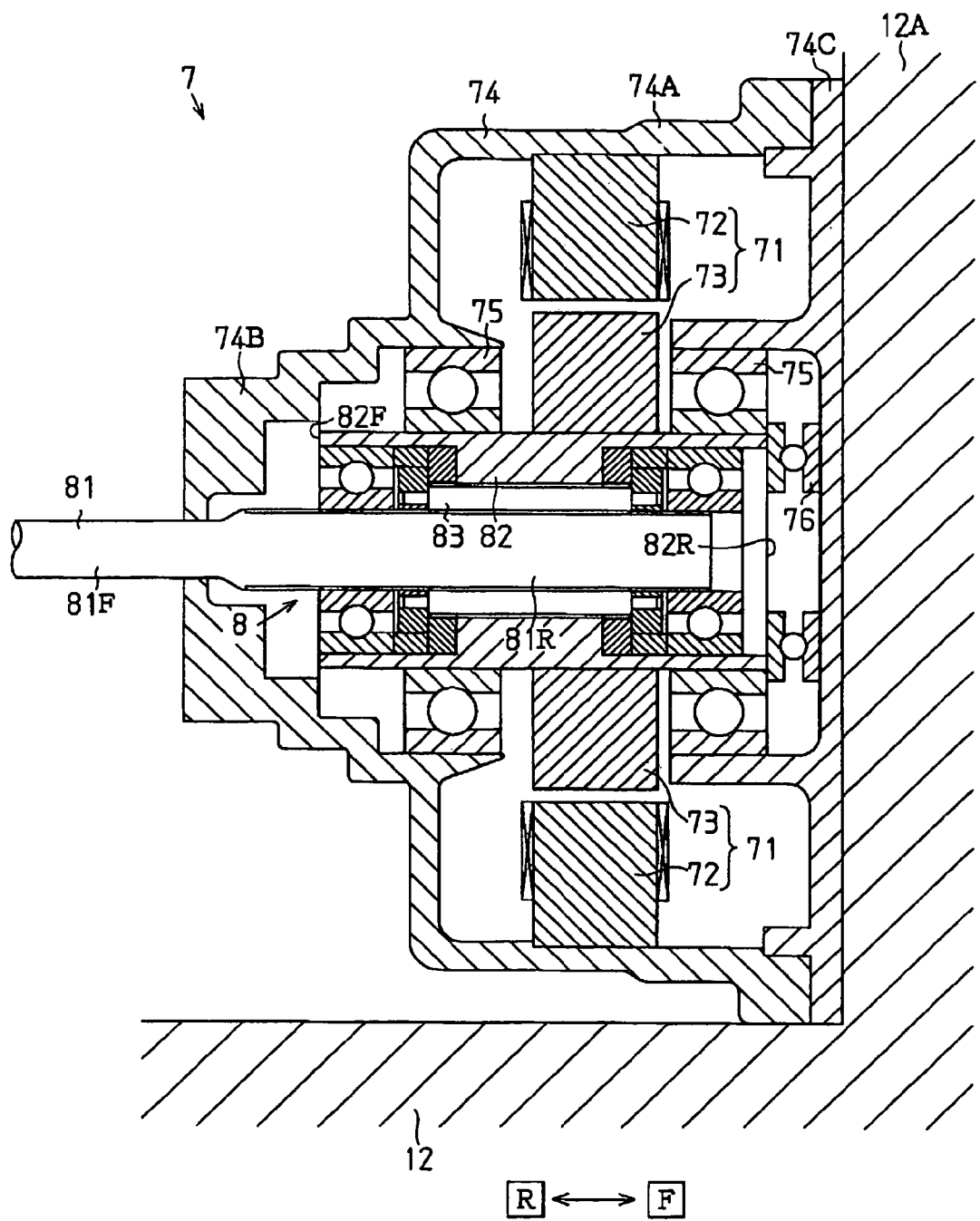
FIG. 32 is a cross-sectional view showing a rotary-to-linear actuator of a variable valve engine according to a ninth embodiment of the present invention, taken along the axis of a sun shaft.

With reference to FIG. 32, the structure of the engine 1 and the rotary-to-linear actuator 7 will be explained below. FIG. 32 shows the cross-sectional structure of the rotary-to-linear actuator 7 taken along the axial direction.

In the engine 1 of the above-described seventh embodiment, the variable valve actuation mechanism 3 in which the input spline 42A of the slider gear 4 is formed as a right hand helix gear and the output spline 43A of the slider gear 4 is formed as a left hand helix gear is employed. However, in the engine 1 of the present embodiment, the variable valve actuation mechanism 3 in which the input spline 42A of the slider gear 4 is formed as a left hand helix gear and the output spline 43A of the slider gear 4 is formed as a right hand helix gear is employed. In this engine 1, the miniaturization of the rotary-to-linear actuator 7 is realized while securing the appropriate operation of the rotary-to-linear conversion mechanism 8 by making the engine 1 (the cylinder head 12) play a roll for receiving mainly this thrust load as well as by applying the thrust load for acting in a certain direction via the valve actuation mechanism main body 31 to the ring shaft 82.

In the present embodiment, the above-described advantages are obtained by applying the following [Additional configuration] to the engine 1 of the above-described configuration. The engine 1 of the present embodiment is different from the configuration of the engine 1 of the above-described seventh embodiment in the above-described change, and except for that, it employs the configuration similar to the above-described seventh embodiment.

[Additional Configuration]

Concerning the housing 74 of the rotary-to-linear actuator 7, the back face outer wall 74C is fixed on the outer wall 12A of the cylinder head 12. Concerning the thrust bearing 76 of the rotary-to-linear actuator 7, the ring shaft 82 is disposed at the position for supporting on the shaft back end face 82R and fixed on the housing 74.

In this way, in the engine 1, the thrust load is received by the cam carrier 27 of the cylinder head 12 as well as the helix direction of the tooth trace of the slider gear 4 and the position of the rotary-to-linear actuator 7 are set so that the ring shaft 82 is pushed away from the valve actuation mechanism main body 31 by means of the thrust load of the control shaft 35.

Advantages of Embodiment

As described in detail up to this point, according to the variable valve engine according to the ninth embodiment, the advantages similar to the advantages of the above-described item (1) according to the previously described seventh embodiment are obtained.

Tenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described eighth embodiment.

<Structures of Engine and Rotary-to-Linear Actuator>

Figure 33:
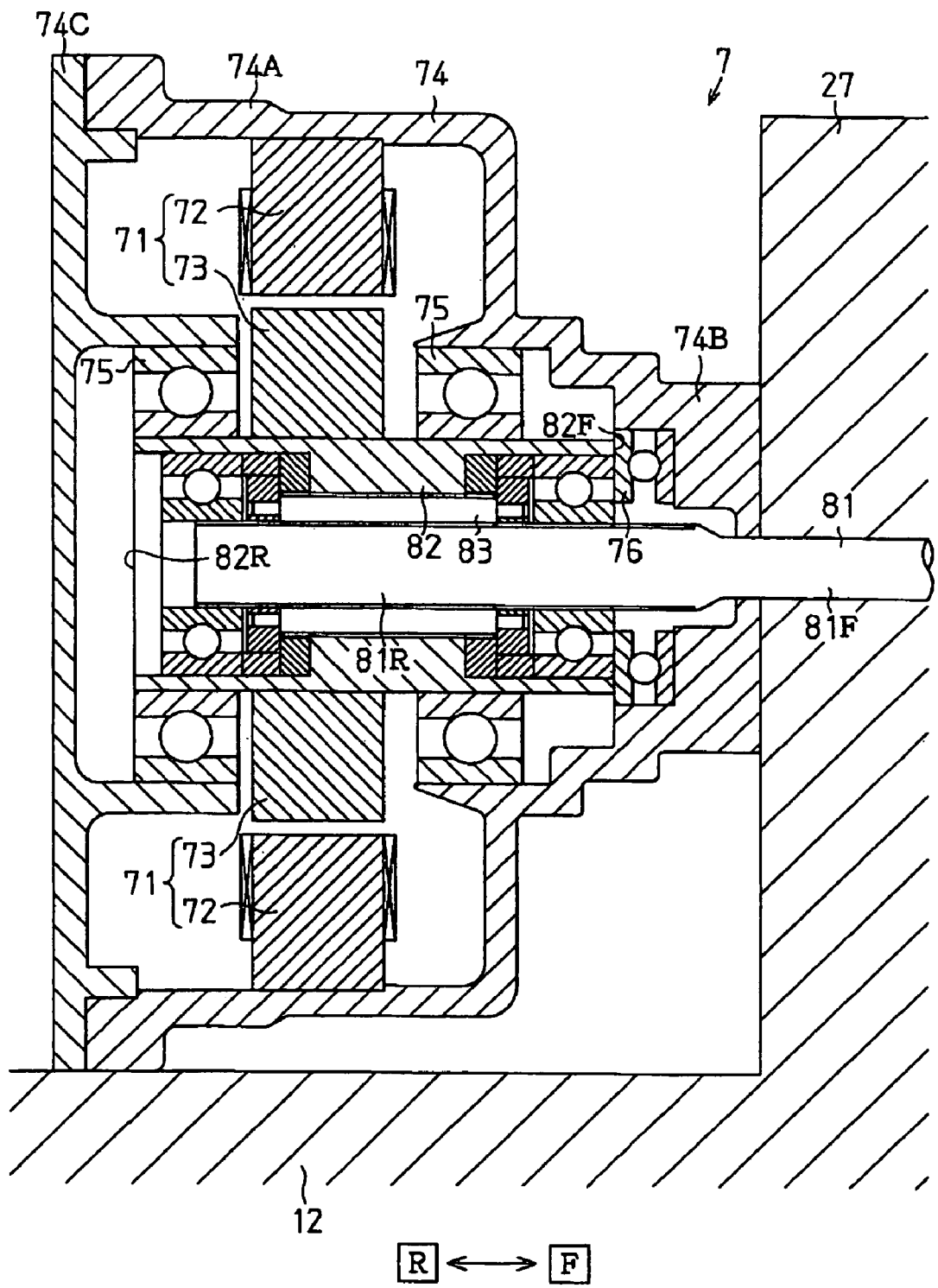
FIG. 33 is a cross-sectional view showing a rotary-to-linear actuator of a variable valve engine according to a tenth embodiment of the present invention, taken along the axis of a sun shaft.

With reference to FIG. 33, the structure of the engine 1 and the rotary-to-linear actuator 7 will be explained below.

FIG. 33 shows the cross-sectional structure of the rotary-to-linear actuator 7 taken along the axial direction.

In the engine 1 of the above-described eighth embodiment, the variable valve actuation mechanism 3 in which the input spline 42A of the slider gear 4 is formed as a right hand helix gear and the output spline 43A of the slider gear 4 is formed as a left hand helix gear is employed. However, in the engine 1 of the present embodiment, the variable valve actuation mechanism 3 in which the input spline 42A of the slider gear 4 is formed as a left hand helix gear and the output spline 43A of the slider gear 4 is formed as a right hand helix gear is employed. In this engine 1, the miniaturization of the rotary-to-linear actuator 7 is realized while securing the appropriate operation of the rotary-to-linear conversion mechanism 8 by making the engine 1 (the cylinder head 12) play a roll for receiving mainly this thrust load as well as by applying the thrust load for acting in a certain direction via the valve actuation mechanism main body 31 to the ring shaft 82.

In the present embodiment, the above-described advantages are obtained by applying the following [Additional configuration] to the engine 1 of the above-described configuration. The engine 1 of the present embodiment is different from the configuration of the engine 1 of the above-described eighth embodiment in the above-described change, and except for that, it employs the configuration similar to the above-described eighth embodiment.

[Additional Configuration]

Concerning the housing 74 of the rotary-to-linear actuator 7, the front outer wall 74B is fixed on the cam carrier 27 of the cylinder head 12. Concerning the thrust bearing 76 of the rotary-to-linear actuator 7, the thrust bearing 76 is disposed at the position for supporting on the shaft front end face 82F and is fixed on the housing 74.

In this-way, in the engine 1, the thrust load is received by the cam carrier 27 of the cylinder head 12 as well as the helix direction of the tooth trace of the slider gear 4 and the position of the rotary-to-linear actuator 7 are set so that the ring shaft 82 is drawn toward the valve actuation mechanism main body 31 by means of the thrust load of the control shaft 35.

Advantages of Embodiment

As described in detail up to this point, according to the variable valve engine according to the tenth embodiment, the advantages similar to the advantages of the above-described item (1) according to the previously described seventh embodiment are obtained.

Eleventh Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a rotary-to-linear actuator that is obtained by applying the following [Additional configuration] to the rotary-to-linear actuator of the above-described ninth embodiment.

[Additional Configuration]

As the motor 71 of the rotary-to-linear actuator 7, the motor 71 of the above-described third embodiment is employed. Specifically, the sun shaft 81 is pushed toward the back face outer wall 74C through the thrust load by applying the thrust load acting in the reverse direction R from the motor 71 to the ring shaft 82.

Advantages of Embodiment

As described in detail up to this point, according to the variable valve engine according to the eleventh embodiment, the advantages indicated in the followings are obtained.

(1) In the engine 1 of the present embodiment, the load of the housing 74 for regulating the thrust displacement of the ring shaft 82 is reduced by making the engine 1 (the cylinder head 12) play a roll for mainly receiving the thrust load as well as by applying the thrust load for acting in a certain direction through the motor 71 to the ring shaft 82. Owing to this, since the thickness of the outer wall of the housing 74 can be reduced, the miniaturization of the rotary-to-linear actuator 7 while securing the appropriate operation of the rotary-to-linear conversion mechanism 8 is realized.

Twelfth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a rotary-to-linear actuator that is obtained by applying the following [Additional configuration] to the rotary-to-linear actuator of the above-described ninth embodiment.

[Additional configuration] As the motor 71 of the rotary-to-linear actuator 7, the motor 71 of the above-described fourth embodiment is employed. Specifically, the sun shaft 81 is pushed toward the back face outer wall 74C through the thrust load by applying the thrust load acting in the reverse direction R from the motor 71 to the ring shaft 82.

Advantages of Embodiment

As described in detail up to this point, according to the variable valve engine according to the twelfth embodiment, the advantages similar to the advantages of the above-described item (1) according to the previously described eleventh embodiment are obtained.

Thirteenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment is obtained by applying the following (Additional configuration) to the rotary-to-linear actuator of the above-described ninth embodiment.

[Additional Configuration]

As the motor 71 of the rotary-to-linear actuator 7, the motor 71 of the above-described fifth embodiment is employed. Specifically, the sun shaft 81 is pushed toward the back face outer wall 74C through the thrust load by applying the thrust load acting in the reverse direction R from the motor 71 to the ring shaft 82.

Advantages of Embodiment

As described in detail up to this point, according to the variable valve engine according to the thirteenth embodiment, the advantages similar to the advantages of the above-described item (1) according to the previously described eleventh embodiment are obtained.

Fourteenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment is obtained by applying the following [Additional configuration] to the rotary-to-linear actuator of the above-described ninth embodiment.

[Additional Configuration]

As the motor 71 of the rotary-to-linear actuator 7, the motor 71 of the above-described sixth embodiment is employed. Specifically, the sun shaft 81 is pushed toward the back face outer wall 74C through the thrust load by applying the thrust load acting in the reverse direction R from the motor 71 to the ring shaft 82.

Advantages of Embodiment

As described in detail up to this point, according to the variable valve engine according to the fourteenth embodiment, the advantages similar to the advantages of the above-described item (1) according to the previously described eleventh embodiment are obtained.

Fifteenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment.

<Structure of Rotary-to-Linear Actuator>

With reference to FIGS. 34(A) and 34(B), the structure of the rotary-to-linear actuator 7 will be explained below. FIGS. 34(A) and 34(B) show the cross-sectional structure of the rotary-to-linear actuator 7 taken along the axial direction.

In the motor 71, the structure in which the air gap 71A formed between the stator 72 and the rotor 73 becomes smaller as it approaches the rotor front face 73G from the rotor back face 73S is employed.

In the present embodiment, the forming of the above-described air gap 71A is realized by inclining the rotor opposing portion 73A toward the axial direction of the sun shaft 81 with respect to the stator opposing portion 72A. Concretely, the rotor 73 is shaped such that the rotor opposing portion 73A approaches the stator 72 from the rotor back face 73S toward the rotor front face 73G. Owing to this, the gap length G between the stator 72 and the rotor front face forming portion 73F becomes smaller than the gap length G between the stator 72 and the rotor back face forming portion 73R. Moreover, the gap length G becomes smaller from the rotor back face 73S toward the rotor front face 73G.

In the rotary-to-linear actuator 7, the magnetic force acting on the rotor front face forming portion 73F via the stator 72 becomes larger than the magnetic force acting on the rotor back face forming portion 73R via the stator 72 by applying the above-described structure to the motor 71. Owing to this, since the torque generated in the rotor front face forming portion 73F is always larger than the torque generated in the rotor back face forming portion 73R, the thrust load acting in the forward direction F is generated in the rotor 73. Then, the ring shaft 82 is pushed toward the front outer wall 74B via the thrust load.

Advantages of Embodiment

As described in detail up to this point, according to the variable valve engine according to the fifteenth embodiment, the advantages indicated in the followings are obtained.

(1) In the engine 1 of the present embodiment, the load of the housing 74 for regulating the thrust displacement of the ring shaft 82 is reduced by making the engine 1 (the cylinder head 12) play a roll for mainly receiving the thrust load as well as by applying the thrust load for acting in a certain direction to the ring shaft 82 through the motor 71. Owing to this, since the thickness of the outer wall of the housing 74 can be set smaller, the miniaturization of the rotary-to-linear actuator 7 while securing the appropriate operation of the rotary-to-linear conversion mechanism 8.

Sixteenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment.

<Structure of Rotary-to-Linear Actuator>

With reference to FIGS. 35(A) and 35(B), the structure of the rotary-to-linear actuator 7 will be explained below.

FIGS. 35(A) and 35(B) show the cross-sectional structure of the rotary-to-linear actuator 7 taken along the axial direction.

In the motor 71, the structure is employed in which the air gap 71A is formed between the stator opposing portion 72A and the rotor opposing portion 73A of the rotor front face forming portion 73F. On the other hand, the air gap 71A between the stator opposing portion 72A and the rotor opposing portion 73A of the rotor back face forming portion 73R is not formed.

In the present embodiment, the forming of the above-described air gap 71A is realized by disposing the stator 72 and the rotor 73 at the position where the stator 72 and the rotor front face forming portion 73F are disposed at the positions where these are opposed, and on the other hand, the stator 72 and the rotor 73 are disposed at the position where the stator 72 and the rotor front back forming portion 73R are disposed at the positions where these are not opposed. Concretely, the stator 72 is disposed at the position offset in the forward direction F from a reference position of the stator 72 and the rotor 73, at which the stator 72 opposes the rotor front face forming portion 73F and the rotor back face forming portion 73R. The forming of the above-described air gap 71A is also realized by disposing the rotor 73 at a position offset in the reverse direction R from the above-described reference position.

In the rotary-to-linear actuator 7, the magnetic force acting on the rotor front face forming portion 73F via the stator 72 becomes larger than the magnetic force acting on the rotor back face forming portion 73R via the stator 72 by applying the above-described structure to the motor 71. Owing to this, since the torque generated in the rotor front face forming portion 73F is always larger than the torque generated in the rotor back face forming portion 73R, the thrust load acting in the forward direction F is generated in the rotor 73. Then, the ring shaft 82 is pushed toward the front outer wall 74B via the thrust load.

Advantages of Embodiment

As described in detail up to this point, according to the variable valve engine according to the sixteenth embodiment, the advantages similar to the advantages of the above-described item (1) according to the previously described fifteenth embodiment are obtained.

Seventeenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment.

<Structure of Rotary-to-Linear Actuator>

With reference to FIGS. 36(A) and 36(B), the structure of the rotary-to-linear actuator 7 will be explained below.

FIGS. 36(A) and 36(B) shows the cross-sectional structure of the rotary-to-linear actuator 7 taken along the axial direction.

In the motor 71, the structure is employed in which the air gap 71A is formed between the stator opposing portion 72A and the rotor opposing portion 73A of the rotor front face forming portion 73F. On the other hand, the air gap 71A between the stator opposing portion 72A and the rotor opposing portion 73A of the rotor back face forming portion 73R is not formed.

In the present embodiment, it is assumed that the length in the axial direction of the sun shaft 81 in the stator 72 is the thickness TA, and the length in the axial direction of the sun shaft 81 in the rotor 73 is the thickness TB. The forming of the above-described air gap 71A is realized by setting the thickness TA of the stator 72 smaller than the thickness TB of the rotor 73. Concretely, the stator 72 is disposed at the position where whole of the stator opposing portion 72A is opposed to the rotor opposing portion 73A of the rotor front face forming portion 73F as well as the thickness TA of the stator 72 is set substantially the same with the thickness TB of the rotor front face forming portion 73F.

In the rotary-to-linear actuator 7, the magnetic force acting on the rotor front face forming portion 73F via the stator 72 becomes larger than the magnetic force acting on the rotor back face forming portion 73R via the stator 72 by applying the above-described structure to the motor 71. Owing to this, since the torque generated in the rotor front face forming portion 73F is always larger than the torque generated in the rotor back face forming portion 73R, the thrust load acting in the forward direction F is generated in the rotor 73. Then, the ring shaft 82 is pushed toward the front outer wall 74B via the thrust load.

Advantages of Embodiment

As described in detail up to this point, according to the variable valve engine according to the seventeenth embodiment, the advantages similar to the advantages of the above-described item (1) according to the previously described fifteenth embodiment are obtained.

Eighteenth Embodiment

In the present embodiment, as a variable valve engine according to the present invention, a variable valve engine capable of realizing the miniaturization of a rotary-to-linear actuator while securing an appropriate operation of a rotary-to-linear conversion mechanism will be explained below. A variable valve engine of the present embodiment includes a modification of the rotary-to-linear actuator of the above-described seventh embodiment.

<Structure of Rotary-to-Linear Actuator>

With reference to FIGS. 37(A) and 37(B), the structure of the rotary-to-linear actuator 7 will be explained below. FIGS. 37(A) and 37(B) show the cross-sectional structure of the rotary-to-linear actuator 7 taken along the axial direction.

In the motor 71, the structure in which the magnetic force acting on the rotor front face forming portion 73F via the stator 72 is larger than the magnetic force acting on the rotor back face forming portion 73R via the stator 72 is employed.

In the present embodiment, the action of the above-described magnetic force is realized by providing the antimagnetic material 77 on the rotor opposing portion 73A of the rotor back face forming portion 73R. Concretely, the antimagnetic material 77 is coated on the rotor opposing portion 73A of the rotor back face forming portion 73R. The action of the above-described magnetic force is also realized by mounting the antimagnetic material of a separate body from the rotor 73 on the rotor opposing portion 73A of the rotor back face forming portion 73R.

In the rotary-to-linear actuator 7, the magnetic force acting on the rotor front face forming portion 73F via the stator 72 becomes larger than the magnetic force acting on the rotor back face forming portion 73R via the stator 72 by applying the above-described structure to the motor 71. Owing to this, since the torque generated in the rotor front face forming portion 73F is always larger than the torque generated in the rotor back face forming portion 73R, the thrust load acting in the forward direction F is generated in the rotor 73. Then, the ring shaft 82 is pushed toward the front outer wall 74B via the thrust load.

Advantages of Embodiment

As described in detail up to this point, according to the variable valve engine according to the eighteenth embodiment, the advantages similar to the advantages of the above-described item (1) according to the previously described fifteenth embodiment are obtained.

Other Embodiment

The factors which can be changed commonly to the respective above-described embodiments will be listed below.

In the respective above-described embodiments, as the rotary-to-linear conversion mechanism 8, a rotary-to-linear conversion mechanism having a structure utilizing the fact that the sun shaft 81 is thrust and displaced by setting the number of threads of the external screw 81A of the sun shaft 81 larger or smaller than the number of threads in the relationship of the reference by the value of the integer is employed, however, a rotary-to-linear conversion mechanism having a structure in which the sun shaft 81 is thrust and displaced based on the other operation principle can be employed. Specifically, the structure of the rotary-to-linear conversion mechanism 8 can be appropriately changed without being limited by the configurations exemplified in the respective above-described embodiments. To put is briefly, as long as rotational motion inputted is converted into the linear motion, and the output shaft is linearly moved, any rotary-to-linear conversion mechanism having an appropriate structure can be applied to a rotary-to-linear actuator.

In each of the above-described embodiments, the present invention is applied the variable valve actuation mechanism 3 for changing the valve duration and the maximum valve lift amount of the intake valve 23. However, the present invention may be also applied to the variable valve actuation mechanism 3 for changing the valve duration and the maximum valve lift amount of the exhaust valve 24.

In each of the above-described embodiments, the present invention is applied to a linear motion shaft mechanism which is made up including the variable valve actuation mechanism 3 and the cylinder head 12. However, the present invention may be also applied to other linear motion shaft mechanisms.

The invention claimed is:

1. A variable valve actuation mechanism comprising a valve actuation mechanism main body and a rotary-to-linear actuator, wherein the valve actuation mechanism main body changes a valve parameter of an engine valve, which is either an intake valve or an exhaust valve, through linear motion of a drive shaft along an axial direction, and wherein the rotary-to-linear actuator causes the drive shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, and a conversion mechanism that converts rotational motion of a motor to linear motion and causes the output shaft to move linearly along the axial direction, wherein the variable valve actuation mechanism:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein one of the input helical spline and the output helical spline is formed as a gear of left hand helix, and the other is formed as a gear of right hand helix, and wherein, when a moving direction of the control shaft in which relative rotation of the input gear and the output gear increases the difference of relative rotational phase between the input arm and the output arm is defined as a reference direction, a front end of the control shaft in the reference direction is connected to the output shaft of the actuator.

2. A variable valve actuation mechanism comprising a valve actuation mechanism main body and a rotary-to-linear actuator, wherein the valve actuation mechanism main body changes a valve parameter of an engine valve, which is either an intake valve or an exhaust valve, through linear motion of a drive shaft along an axial direction, and wherein the rotary-to-linear actuator causes the drive shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, and a conversion mechanism that converts rotational motion of a motor to linear motion and causes the output shaft to move linearly along the axial direction, wherein the variable valve actuation mechanism:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein the direction of a thrust load generated in the slider gear by power of the engine is the same as the direction in which the output shaft is displaced from the actuator toward the valve actuation mechanism main body.

3. A rotary-to-linear actuator applied to a linear motion shaft mechanism having a driveshaft, the drive shaft being linearly movable along an axial direction, wherein the actuator includes an output shaft for transmitting linear motion to the drive shaft, and a conversion mechanism that converts rotational motion of a motor to linear motion and causes the output shaft to move linearly along the axial direction, wherein the motor has a rotor that rotates integrally with a component of the conversion mechanism and a stator generating torque in the rotor, wherein the rotor includes a first forming portion and a second forming portion, the first forming portion being a portion close to the linear motion shaft mechanism in the axial direction of the output shaft, the second forming portion being a portion farther from the linear motion shaft mechanism in the axial direction of the output shaft than the first forming portion, and wherein the motor is constructed such that greater torque is generated in the second forming portion than in the first forming portion.

4. The actuator according to claim 3,
wherein the motor is constructed such that the stator does not face the first forming portion, and that the stator faces the second forming portion.

5. The actuator according to claim 3,
wherein the motor has a magnetic resistance material at a part of the first forming portion that faces the stator.

6. The actuator according to claim 3,
wherein the motor is constructed such that an air gap defined between the stator and the second forming portion is smaller than an air gap defined between the stator and the first forming portion.

7. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, a conversion mechanism that converts rotational motion to linear motion and causes the output shaft to move linearly along the axial direction, and a casing body incorporating the conversion mechanism, wherein the variable valve engine:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein one of the input helical spline and the output helical spline is formed as a gear of left hand helix, and the other is formed as a gear of right hand helix, and wherein, when a moving direction of the control shaft in which relative rotation of the input gear and the output gear increases the difference of relative rotational phase between the input arm and the output arm is defined as a reference direction, a front end of the control shaft in the reference direction is connected to the output shaft of the actuator, and wherein, among outer walls forming the casing body in the actuator, an outer wall supporting the output shaft is defined as a front face outer wall, the front face outer wall being fixed to a cylinder head.

8. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, a conversion mechanism that converts rotational motion to linear motion and causes the output shaft to move linearly along the axial direction, and a casing body incorporating the conversion mechanism, wherein the variable valve engine:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein one of the input helical spline and the output helical spline is formed as a gear of left hand helix, and the other is formed as a gear of right hand helix, and wherein, when a moving direction of the control shaft in which relative rotation of the input gear and the output gear decreases the difference of relative rotational phase between the input arm and the output arm is defined as a reference direction, a front end of the control shaft in the reference direction is connected to the output shaft of the actuator, and wherein, among outer walls forming the casing body in the actuator, an outer wall supporting the output shaft is defined as a front face outer wall, and an outer wall that faces front face outer wall with the conversion mechanism in between is defined as a back face outer wall, the back face outer wall being fixed to a cylinder head.

9. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, a conversion mechanism that converts rotational motion to linear motion and causes the output shaft to move linearly along the axial direction, and a casing body incorporating the conversion mechanism, wherein the variable valve engine:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein the direction of a thrust load generated in the slider gear by power of the engine is the same as the direction in which the output shaft is displaced from the actuator toward the valve actuation mechanism main body, wherein, among outer walls forming the casing body in the actuator, an outer wall supporting the output shaft is defined as a front face outer wall, the front face outer wall being fixed to a cylinder head.

10. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the valve actuation mechanism main body includes a control shaft functioning as the drive shaft, a slider gear that is displaced while being interlocked with the control shaft, an input gear, and an output gear, the input gear rotating the slide gear by torque transmitted from a camshaft of the engine valve, and the output gear causing the engine valve to move linearly along an axial direction through the rotation of the slider gear, wherein the slider gear has an input helical spline and an output helical spline, the input helical spline being engaged with a helical spline formed on the input gear, and the output helical spline being engaged with a helical spline formed on the output gear, wherein the helix direction of the tooth trace of the input helical spline is opposite to the helix direction of the tooth trace of the output helical spline, wherein the input gear includes a gear main body having the helical spline and an input arm that moves integrally with the gear main body when receiving torque of the camshaft, wherein the output gear includes a gear main body having the helical spline and an output arm that moves integrally with the gear main body by rotation of the slider gear, thereby causing the engine valve to move linearly, wherein the actuator includes an output shaft for transmitting linear motion to the control shaft, a conversion mechanism that converts rotational motion to linear motion and causes the output shaft to move linearly along the axial direction, and a casing body incorporating the conversion mechanism, wherein the variable valve engine:

changes the valve parameter in accordance with a difference of relative rotational phase between the input arm and the output arm about the control shaft;

changes the difference of relative rotational phase between the input arm and the output arm by changing relative positions of the slider gear and the input and output gears in the axial direction; and changes relative positions of the slider gear and the input and output gears in the axial direction through linear motion of the control shaft, wherein the direction of a thrust load generated in the slider gear by power of the engine is the same as the direction in which the control shaft is displaced from the valve actuation mechanism main body toward the actuator, and wherein, among outer walls forming the casing body in the actuator, an outer wall supporting the output shaft is defined as a front face outer wall, and an outer wall that faces front face outer wall with the conversion mechanism in between is defined as a back face outer wall, the back face outer wall being fixed to a cylinder head.

11. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the actuator includes an output shaft for transmitting linear motion to the drive shaft, a conversion mechanism that converts rotational motion of a motor to linear motion and causes the output shaft to move linearly along the axial direction, and a casing body incorporating the motor and the conversion mechanism, wherein the motor has a rotor that rotates integrally with a component of the conversion mechanism and a stator generating torque in the rotor, wherein the rotor includes a first forming portion that is a portion close to the valve actuation mechanism main body in the axial direction of the output shaft, and a second forming portion that is a portion farther from the valve actuation mechanism main body in the axial direction of the output shaft than the first forming portion, wherein the motor is constructed such that greater torque is generated in the first forming portion than in the second forming portion, and wherein, among outer walls forming the casing body in the actuator, an outer wall supporting the output shaft is defined as a front face outer wall, the front face outer wall being fixed to a cylinder head.

12. A variable valve engine comprising a variable valve actuation mechanism that changes a valve parameter of an engine valve that is one of an intake valve and an exhaust valve, wherein the variable valve actuation mechanism includes a valve actuation mechanism main body that changes a valve parameter of the valve through linear motion of a drive shaft along an axial direction, and a rotary-to-linear actuator that causes the output shaft to move linearly, wherein the actuator includes an output shaft for transmitting linear motion to the drive shaft, a conversion mechanism that converts rotational motion of a motor to linear motion and causes the output shaft to move linearly along the axial direction, and a casing body incorporating the motor and the conversion mechanism, wherein the motor has a rotor that rotates integrally with a component of the conversion mechanism and a stator generating torque in the rotor, wherein the rotor includes a first forming portion that is a portion close to the valve actuation mechanism main body in the axial direction of the output shaft, and a second forming portion that is a portion farther from the valve actuation mechanism main body in the axial direction of the output shaft than the first forming portion, wherein the motor is constructed such that greater torque is generated in the second forming portion than in the first forming portion, and wherein, among outer walls forming the casing body in the actuator, an outer wall supporting the output shaft is defined as a front face outer wall, and an outer wall that faces front face outer wall with the conversion mechanism in between is defined as a back face outer wall, the back face outer wall being fixed to a cylinder head.

13. A linear motion shaft mechanism comprising a drive shaft linearly movable along an axial direction, a mechanism main body supporting the drive shaft, and a rotary-to-linear actuator causing the drive shaft to move linearly, wherein the actuator includes an output shaft for transmitting linear motion to the drive shaft, a conversion mechanism that converts rotational motion of a motor to linear motion and causes the output shaft to move linearly along the axial direction, and a casing body incorporating the motor and the conversion mechanism, wherein the motor has a rotor that rotates integrally with a component of the conversion mechanism and a stator generating torque in the rotor, wherein the rotor includes a first forming portion that is a portion close to the drive shaft in the axial direction of the output shaft, and a second forming portion that is a portion farther from the drive shaft in the axial direction of the output shaft than the first forming portion, wherein the motor is constructed such that greater torque is generated in the first forming portion than in the second forming portion, and wherein, among outer walls forming the casing body in the actuator, an outer wall supporting the output shaft is defined as a front face outer wall, the front face outer wall being fixed to the mechanism main body.

14. A linear motion shaft mechanism comprising a drive shaft linearly movable along an axial direction, a mechanism main body supporting the drive shaft, and a rotary-to-linear actuator causing the drive shaft to move linearly, Pg,95 wherein the actuator includes an output shaft for transmitting linear motion to the drive shaft, a conversion mechanism that converts rotational motion of a motor to linear motion and causes the output shaft to move linearly along the axial direction, and a casing body incorporating the motor and the conversion mechanism, wherein the motor has a rotor that rotates integrally with a component of the conversion mechanism and a stator generating torque in the rotor, wherein the rotor includes a first forming portion that is a portion close to the drive shaft in the axial direction of the output shaft, and a second forming portion that is a portion farther from the drive shaft in the axial direction of the output shaft than the first forming portion, wherein the motor is constructed such that greater torque is generated in the second forming portion than in the first forming portion, and wherein, among outer walls forming the casing body in the actuator, an outer wall supporting the output shaft is defined as a front face outer wall, and an outer wall that faces front face outer wall with the conversion mechanism in between is defined as a back face outer wall, the back face outer wall being fixed to the mechanism main body.

* * * * *